US012718128B1

(12) United States Patent
George et al.

(10) Patent No.: US 12,718,128 B1
(45) Date of Patent: Aug. 25, 2026

(54) QUANTUM DOT DEVICES WITH ALTERNATING LAYOUTS AND SCREENING GATES

(71) Applicant: INTEL CORPORATION, Santa Clara, CA (US)

(72) Inventors: Hubert C. George, Portland, OR (US); Ravi Pillarisetty, Portland, OR (US); James S. Clarke, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 988 days.

(21) Appl. No.: 17/484,087

(22) Filed: Sep. 24, 2021

(51) Int. Cl.
*G06N 10/40* (2022.01)
*B82Y 30/00* (2011.01)

(52) U.S. Cl.
CPC .............. *G06N 10/40* (2022.01); *B82Y 30/00* (2013.01)

(58) Field of Classification Search
CPC ... G06N 10/00; H01L 29/66; H01L 29/42356; H01L 29/66977; H01L 29/785; H01L 29/7781; H01L 29/7783
See application file for complete search history.

(56) References Cited

U.S. PATENT DOCUMENTS 6,239,449 B1 * 5/2001 Fafard .................... H01L 31/09 257/17
6,333,516 B1 12/2001 Katoh et al.
2006/0275778 A1 * 12/2006 Wu .................. G01N 33/48721 977/924
2012/0074386 A1 3/2012 Rachmady et al.
2013/0264617 A1 10/2013 Joshi et al.
2019/0043950 A1 * 2/2019 George .................. H10D 64/27
2019/0198618 A1 * 6/2019 George .................. H10D 48/40

FOREIGN PATENT DOCUMENTS

WO WO-2018063270 A1 * 4/2018 ........... H01L 29/122
WO 2018143986 A1 8/2018

OTHER PUBLICATIONS

U.S. Appl. No. 16/328,615, filed Feb. 26, 2019, Quantum Dot Array Devices With Shared Gates.
U.S. Appl. No. 16/320,153, filed Jan. 24, 2019, Independent Double-Gate Quantum Dot Qubits.

(Continued)

*Primary Examiner* — Sharrief I Broome
*Assistant Examiner* — Journey F Sumlar
(74) *Attorney, Agent, or Firm* — Akona IP PC

(57) ABSTRACT

Quantum dot devices with alternating layouts of read devices associated with a single active row of qubits and, optionally, with one or more screening gates, are disclosed. An example quantum dot device with an alternating layout includes a first read device on one side of an active row, proximate a first portion of the active row, to detect/read quantum states of a first subset of qubits of the active row; and further includes a second read device on the other side of the active row, proximate a second portion of the active row, to detect/read quantum states of a second subset of qubits of the active row. Screening gates may be provided between various gates coupled to the read devices and the active row, to control electrostatics between the qubits of the active row and the read devices, and between different read devices.

26 Claims, 26 Drawing Sheets

(56) References Cited

OTHER PUBLICATIONS

U.S. Appl. No. 16/328,670, filed Feb. 26, 2019, Qubit-Detector Die Assemblies.
U.S. Appl. No. 16/329,706, filed Feb. 28, 2019, Single Electron Transistors (SETS) and Set-Based Qubit-Detector Arrangements.
"A Nanodamascene Process for Advanced Single-Electron Transistor Fabrication," Dubuc et al, IEEE Transactions on Nanotechnology, vol. 7, No. 1, Jan. 2008, pp. 68-73.
"A two-qubit logic gate in silicon," Veldhorst et al., Nature, vol. 526, Oct. 15, 2015, pp. 410-414.
"Gate-Defined Quantum Dots in Intrinsic Silicon," Angus et al., Nano Letters 2007, vol. 7, No. 7, 2051-2055, publication date Jun. 14, 2007, retrieved from http://pubs.acs.org on Mar. 31, 2009, 6 pages.
"Fast sensing of double-dot charge arrangement and spin state with an rf sensor quantum dot," Barthel et al, Materials Department, University of California, Santa Barbara, Jan. 16, 2014, 4 pages.
"Undoped accumulation-mode Si/SiGe quantum dots," Borselli et al, HRL Laboratories, LLC., Jul. 15, 2014, 4 pages.
"Spin Relaxation and Decoherence of Holes in Quantum Dots," Bulaev et al., Phys. Rev. Lett. 95, 076805, Aug. 11, 2005, 1 page.
"Fundamentals of Silicon Material Properties for Successful Exploitation of Strain Engineering in Modern CMOS Manufacturing," Chidambaram et al, IEE Transactions on Electron Devices, vol. 53, No. 5, May 2006, pp. 944-964.
"Ultrafast optical control of individual quantum dot spin qubits," De Greve et al, Reports on Progress in Physics, vol. 76, No. 9, Sep. 4, 2013, 2 pages.
"Fabrication and Characterization of Sidewall Defined Silicon-on-Insulator Single-Electron Transistor," Jung et al., IEEE Transactions on Nanotechnology, vol. 7, No. 5, Sep. 2008, pp. 544-550.
"How it's built: Micron/Intel3D NAND Micron Opens the Veil a Little," Moyer, Bryon, retrieved from https://www.eejournal.com/article/20160201-micron/ on Nov. 29, 2017, 9 pages.
"Investigation of Vertical Type Single-Electron Transistor with Sidewall Spacer Quantum Dot," Kim et al, Student Paper, Inter-University Semiconductor Research Center and School of Electrical Engineering and Computer Science, Seoul National University, ISDRS 2011, Dec. 7-9, 2011, ISDRS 2011—http://www.ece.umd.edu/ISDR2011, 2 pages.
"Platinum single-electron transistors with tunnel barriers made by atomic layer deposition", George et al., Department of Electrical Engineering, University of Notre Dame, Received Jul. 7, 2010:Published Nov. 5, 2010, 3 pages.
"Quantum computation with quantum dots," Loss et al , Physical Review A, vol. 57, No. 1, Jan. 1998, pp. 120-126.
"Ultrafast high-fidelity initialization of a quantum-dot spin qubit without magnetic fields," Mar et al., Phys. Rev. B 90 241303®, published Dec. 15, 2014, 1 page.
"Embracing the quantum limit in silicon computing," Morton et al, Macmillan Publishers, Nov. 17, 2011, vol. 479, Nature, pp. 345-353.
"A Reconfigurable Gate Architecture for Si/SiGe Quantum Dots," Zajac et al., Department of Physics, Princeton University; Department of Physics, University of California; Feb. 6, 2015, 5 pages.
"Radio frequency measurements of tunnel couplings and singlet-triplet spin states in Si:P quantum dots," House et al., Nature Communications, 6:884, DOI: 10.1038/ncomms 9848, Nov. 9, 2015, pp. 1-6.
"Detecting bit-flip errors in a logical qubit using stabilizer measurements," Riste et al., Nature Communications, 6:6983, DOI: 10.1038/ncomms7983, Apr. 29, 2015, pp. 1-6.
"Scalable gate architecture for densely packed semiconductor spin qubits," Zajac et al, Department of Physics, Princeton University; Sandia National Laboratories, retrieved [cond-mat.mes-hall] Jul. 24, 2016, 8 pages.
"Silicon CMOS architecture for a spin-based quantum computer," Veldhorst et al., Qutech, TU Delft, The Netherlands, Centre for Quantum Computation and Communication Technology, School of Electrical Engineering and Telecommunications, The University of New South Wales, NanoElectronics Group, MESA + Institute for Nanotechnology, University of Twente, The Netherlands, Oct. 2, 2016, 13 pages.
"Single-shot read-out of an individual electron spin in a quantum dot," Elzerman et al., Nature, vol. 430, Jul. 22, 2004, pp. 431-435.
"An addressable quantum dot qubit with fault-tolerant control-fidelity," Veldhorst et al., Nature Nanotechnology vol. 9, Dec. 2014, pp. 981-985.

* cited by examiner 146
152

146
152
154

146
154-2
152
154-1
176

134
182
110
140
146

134
184
110
140
146

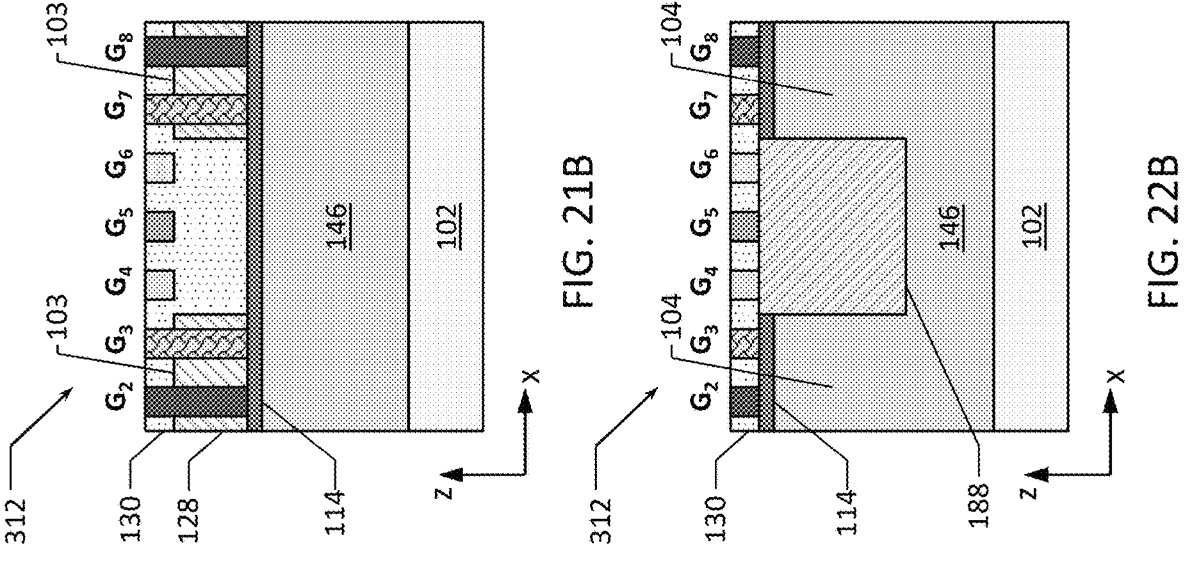
312
130
128
114
103
103
$G_2$
$G_3$
$G_4$
$G_5$
$G_6$
$G_7$
$G_8$
146
102
Z
X
FIG. 21B
312
130
114
188
104
104
146
102
FIG. 22B
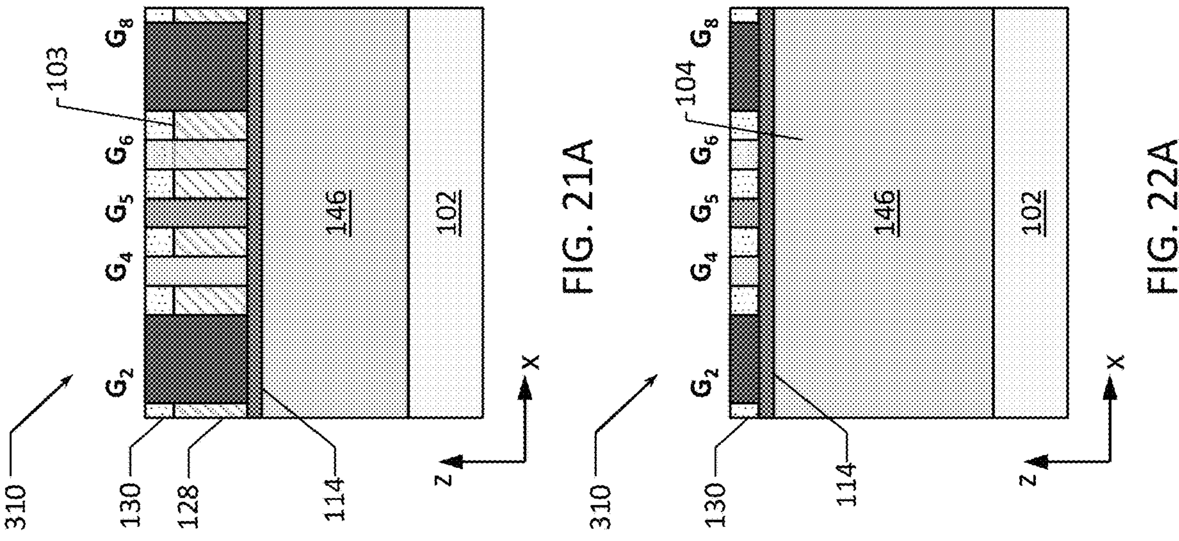
310
130
128
114
103
$G_2$
$G_4$
$G_5$
$G_6$
$G_8$
146
102
Z
X
FIG. 21A
310
130
114
104
146
102
FIG. 22A

QUANTUM DOT DEVICES WITH ALTERNATING LAYOUTS AND SCREENING GATES

BACKGROUND

Quantum computing refers to the field of research related to computation systems that use quantum-mechanical phenomena to manipulate data. These quantum-mechanical phenomena, such as superposition (in which a quantum variable can simultaneously exist in multiple different states) and entanglement (in which multiple quantum variables have related states irrespective of the distance between them in space or time), do not have analogs in the world of classical computing, and thus cannot be implemented with classical computing devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 21A-21B are cross-sectional views of a portion of an example quantum dot device with alternating layouts and side screening gates implemented using trenches, with cross-sections taken along, respectively, a quantum dot formation region and a side screening gate, respectively, in accordance with various embodiments.

FIGS. 22A-22B are cross-sectional views of a portion of an example quantum dot device with alternating layouts and side screening gates implemented using fins, with cross-sections taken along, respectively, a quantum dot formation region and a side screening gate, respectively, in accordance with various embodiments.

DETAILED DESCRIPTION

Overview

Figure 1:
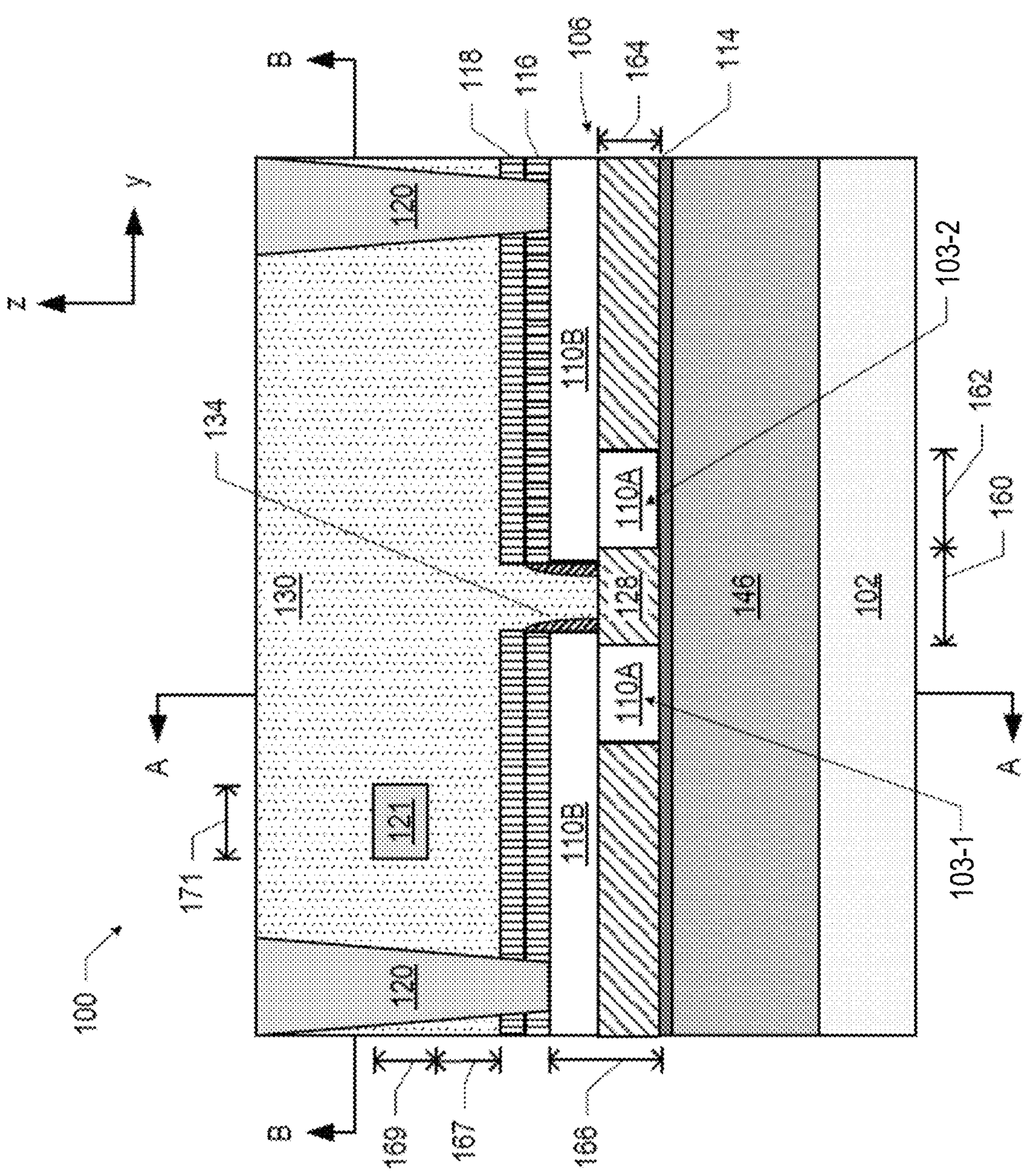
FIGS. 1-4 are cross-sectional views of an example quantum dot device with trenches, in accordance with various embodiments.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

For purposes of illustrating quantum dot devices with alternating layouts and screening gates, proposed herein, it might be useful to first understand phenomena that may come into play in quantum computing systems. The following foundational information may be viewed as a basis from which the present disclosure may be properly explained. Such information is offered for purposes of explanation only and, accordingly, should not be construed in any way to limit the broad scope of the present disclosure and its potential applications.

As briefly described above, quantum computing, or quantum information processing, refers to the field of research related to computation systems that use quantum-mechanical phenomena to store and manipulate data. Quantum computers use so-called quantum bits, referred to as qubits (both terms "bits" and "qubits" often interchangeably refer to the values that they hold as well as to the actual devices that store the values). Similar to a bit of a classical computer, at any given time, a qubit can be either 0 or 1. However, in contrast to a bit of a classical computer, a qubit can also be 0 and 1 at the same time, which is a result of superposition of quantum states—a uniquely quantum-mechanical phenomenon. The principle of quantum superposition asserts that any two or more quantum states can be added together, i.e., superposed, to produce another valid quantum state, and that any quantum state can be represented as a sum of two or more other distinct states. Quantum entanglement is another example of a unique quantum-mechanical phenomenon. Entanglement refers to groups of particles or quantum bits being generated or made to interact in such a way that the state of one particle becomes intertwined with that of the others. Furthermore, the quantum state of each qubit cannot be described independently. Instead, the quantum state is given for the group of entangled particles as a whole. For example, two entangled qubits may be represented by a superposition of 4 quantum states, and N entangled qubits are represented by a superposition of 2 quantum states. Entanglement also contributes to the unique nature of qubits in that input data to a quantum processor can be spread out among entangled qubits, allowing manipulation of that data to be spread out as well: providing input data to one qubit results in that data being shared to other qubits with which the first qubit is entangled. Yet another example of quantum-mechanical phenomena is sometimes described as a "collapse" because it asserts that when we observe (measure) qubits, we unavoidably change their properties in that, once observed, the qubits cease to be in a state of superposition or entanglement (i.e., by trying to ascertain anything about the particles, we collapse their state) and collapse to one of the $2^N$ quantum states.

Put simply, superposition postulates that a given qubit can be simultaneously in two states; entanglement postulates that two qubits can be related in that they are able to instantly coordinate their states irrespective of the distance between them in space and time so as to exist in a superposition of 4 states or in the case of N qubits in a superposition of $2^N$ quantum states; and collapse postulates that when one observes a qubit, one unavoidably changes the state of the qubit and its entanglement with other qubits. These unique phenomena make manipulation of data in quantum computers significantly different from that of classical computers (i.e., computers that use phenomena of classical physics).

Another challenge that is unique to quantum computers and does not arise in classical computers resides in protecting qubits from decoherence so that they can stay in their information-holding states long enough to perform the necessary calculations and read out the results. For this reason, qubits are often operated at cryogenic temperatures, typically just a few degrees Kelvin or even just a few millikelvin above absolute zero, because at cryogenic temperatures thermal energy is low enough to not cause spurious excitations, which is thought to help minimize qubit decoherence.

The foregoing illustrates that the ability to manipulate and read out quantum states, making quantum-mechanical phenomena visible and traceable, and the ability to deal with and improve on the fragility of quantum states of a qubit present unique challenges not found in classical computers. These challenges explain why so many current efforts of the industry and the academics continue to focus on a search for new and improved physical systems whose functionality could approach that expected of theoretically designed qubits. Physical systems for implementing qubits that have been explored until now include, e.g., semiconducting qubits including those that rely on formation of quantum dots (e.g., spin qubits and charge qubits), superconducting qubits (e.g., flux qubits or transmon qubits, the latter sometimes simply referred to as "transmons"), photon polarization qubits, single trapped ion qubits, etc. Devices implementing quantum dot qubits (referred to herein as "quantum dot devices") are particularly promising for large-scale qubit implementation.

In general, quantum dot devices enable formation of quantum dots to serve as quantum bits (i.e., as qubits) in a quantum computing device, as well as the control of these quantum dots to perform quantum logic operations. To that end, quantum dot devices implement multiple terminals, such as gate terminals of various types of gates (e.g., barrier gates, plunger gates, and accumulation gates) as well as terminals for making electrical contact with doped regions of a semiconductor material (which may be referred to as "source terminals" and "drain terminals"). DC bias control signals and alternating current (AC) pulses applied to various terminals may be used to control formation of quantum dots in such devices. Read devices such as single electron transistor (SET) detectors, provided proximate to quantum dot qubits, may then be used to detect states of various qubits. Typically, quantum dot devices include a first row of a quantum dot formation region (i.e., a row in which quantum dots may be formed) for forming quantum dots of various qubits (such a first row referred to as an "active row" and such quantum dots or qubits referred to as "active quantum dots" or "active qubits"), and a second row of a quantum dot formation region for forming quantum dots that are a part of a read device (e.g., an SET detector) corresponding to the active quantum dots of the first row (such a second row referred to as a "read row" and such quantum dots or qubits referred to as "read quantum dots" or "read qubits"). In conventional quantum dot devices, a single read device based on quantum dots formed along a single read row is used to detect states of the quantum dots of multiple active qubits of the active row. In such an arrangement, for each of the active row and the read row, a first and a second accumulation gates are provided over the opposite ends of the row, adjacent and electrically coupled to, respectively, a first and a second doped regions associated with the row. One of the first and second doped regions serves as a source region of the read device and the other one serves as a drain region of the read device. In contrast to such conventional implementations, quantum dot devices disclosed herein include read devices on different sides of an active row. A first read device (e.g., a first SET) may be provided on one side (e.g., on the right side) of an active row, proximate a first portion of the active row, to detect (read) quantum states of a first subset of one or more qubits of the active row. A second read device (e.g., a second SET) may be provided on the other side (e.g., on the left side) of the active row, proximate a second portion of the active row, to detect (read) quantum states of a second subset of one or more qubits of the active row. Additional read devices may be provided on the right and left sides of the active row. Such alternating layouts of the read devices (i.e., providing read devices associated with a given active row on different sides of the row) may be advantageous in terms of patterning and processing (e.g., may provide a more uniform distribution of features). Furthermore, in some further embodiments, side and/or center screening gates (i.e., one or more side screening gates or one or more central screening gates, or both one or more side screening gates and one or more central screening gates) may be provided between various gates coupled to the read devices and the active row, to control electrostatics between the qubits of the active row and the read devices, and between different read devices (e.g., between different read devices on one side of an active row). For example, different screening gates may be coupled to respective signal sources (e.g., voltage sources) and may be used to apply microwave pulses for qubit control and/or to control electrostatics so that source and drain regions of multiple read devices (e.g., of multiple SETs) formed on a given ride of the active row are sufficiently isolated from one another. Unlike previous approaches to quantum dot formation and manipulation, various embodiments of the quantum dot devices disclosed herein provide strong spatial localization of the quantum dots (and therefore good control over quantum dot interactions and manipulation), good scalability in the number of quantum dots included in the device, and/or design flexibility in making electrical connections to the quantum dot devices to integrate the quantum dot devices in larger computing devices. In particular, by implementing multiple read devices associated with an active row of qubits and by implementing side and/or center screening gates in a manner that allows independent control of these read devices and gates, great flexibility over qubit control and readout may be achieved. It should be noted that, because read devices, gate lines, and an active quantum dot formation region may be in different planes with respect to one another and with respect to a support structure (e.g., a substrate, a die, a wafer, or a chip) on which a quantum dot device is implemented, geometrical descriptions of these elements with respect to one another, e.g., descriptions of different read devices and/or gate lines being on different sides of an active row, are to be understood as descriptions of projections of these elements onto a plane that is substantially parallel to the support structure.

In various embodiments, quantum dot devices with alternating layouts and screening gates as described herein may be implemented as components associated with a quantum integrated circuit (IC). Such components may include those that are mounted on or embedded in a quantum IC, or those connected to a quantum IC. The quantum IC may be either analog or digital and may be used in a number of applications within or associated with quantum systems, such as e.g., quantum processors, quantum amplifiers, quantum sensors, etc., depending on the components associated with the IC. The IC may be employed as part of a chipset for executing one or more related functions in a quantum system.

In order to provide substantially lossless connectivity to, from, and between the qubits, some or all of the electrically conductive portions of quantum circuit assemblies described herein, in particular various gates and conductive vias described herein, as well as other components of quantum circuits, may be made from one or more superconductive materials. However, some or all of these electrically conductive portions could be made from electrically conductive materials which are not superconductive. In the following, unless specified otherwise, reference to an electrically conductive material implies that a superconductive material can be used, and vice versa. Furthermore, materials described herein as "superconductive/superconducting materials" may refer to materials, including alloys of materials, that exhibit superconducting behavior at typical qubit operating conditions (e.g., materials which exhibit superconducting behavior at very low temperatures at which qubits typically operate), but which may or may not exhibit such behavior at higher temperatures (e.g., at room temperatures). Examples of such materials include aluminum (Al), niobium (Nb), niobium nitride (NbN), titanium nitride (TiN), niobium titanium nitride (NbTiN), indium (In), and molybdenum rhenium (MoRe), all of which are particular types of superconductors at qubit operating temperatures, as well as their alloys.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

In the drawings, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined using e.g., scanning electron microscopy (SEM) images or transmission electron microscope (TEM) images. In such images of real structures, possible processing defects could also be visible, such as e.g., not-perfectly straight edges of materials, tapered vias or other openings, inadvertent rounding of corners or variations in thicknesses of different material layers, occasional screw, edge, or combination dislocations within the crystalline region, and/or occasional dislocation defects of single atoms or clusters of atoms. There may be other defects not listed here but that are common within the field of device fabrication.

In the following detailed description, various aspects of the illustrative implementations will be described using terms commonly employed by those skilled in the art to convey the substance of their work to others skilled in the art. For example, the terms "oxide," "carbide," "nitride," etc. refer to compounds containing, respectively, oxygen, carbon, nitrogen, etc.; the term "high-k dielectric" refers to a material having a higher dielectric constant than silicon oxide; the term "low-k dielectric" refers to a material having a lower dielectric constant than silicon oxide. The term "insulating" means "electrically insulating," the term "conducting" means "electrically conducting," unless otherwise specified. Furthermore, the term "connected" may be used to describe a direct electrical or magnetic connection between the things that are connected, without any intermediary devices, while the term "coupled" may be used to describe either a direct electrical or magnetic connection between the things that are connected, or an indirect connection through one or more passive or active intermediary devices. A first component described to be electrically coupled to a second component means that the first component is in conductive contact with the second component (i.e., that a conductive pathway is provided to route electrical signals/power between the first and second components). As used herein, a "magnet line" refers to a magnetic field-generating structure to influence (e.g., change, reset, scramble, or set) the spin states of quantum dots. One example of a magnet line, as discussed herein, is a conductive pathway that is proximate to an area of quantum dot formation and selectively conductive of a current pulse that generates a magnetic field to influence a spin state of a quantum dot in the area.

Furthermore, as used herein, terms indicating what may be considered an idealized behavior, such as e.g., "lossless" (or "low-loss") or "superconductive/superconducting," are intended to cover functionality that may not be exactly ideal but is within acceptable margins for a given application. For example, a certain level of loss, either in terms of nonzero electrical resistance or nonzero amount of spurious two-level systems (TLSs) may be acceptable such that the resulting materials and structures may still be referred to by these "idealized" terms. Specific values associated with an acceptable level of loss are expected to change over time as fabrication precision will improve and as fault-tolerant schemes may become more tolerant of higher losses, all of which are within the scope of the present disclosure.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C). The terms "substantially," "close," "approximately," "near," and "about," generally refer to being within +/−20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. The accompanying drawings are not necessarily drawn to scale. Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening layers.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Quantum Dot Formation Regions of Quantum Dot Devices

Quantum dot devices enable formation of quantum dots to serve as quantum bits (i.e., as qubits) in a quantum computing device, as well as formation of quantum dots to serve as a part of one or more SETs for reading/detecting states of said qubits. In particular, quantum dot devices described herein include rows of quantum dot formation regions—at least one row being a row of a quantum dot formation region where quantum dots for serving as qubits are formed, and at least one other row being a row of a quantum dot formation region where quantum dots for serving as a part of one or more SETs are formed.

In various embodiments, rows of quantum dot formation regions may be defined in different manners. In a first embodiment (where a quantum dot device may be referred to as a trench-based device), a row of a quantum dot formation region may be defined by an insulating material provided over a continuous quantum well stack, the insulating material including a trench corresponding to the row (i.e., multiple trenches if there are multiple rows of quantum dot formation regions), the trench extending toward the continuous quantum well stack, and portions of gate metals of different gates being at least partially in the trench. In such an embodiment, even though the quantum well stack is continuous along a portion of a plane, i.e., continuous in a two-dimensional plane, confinement of the quantum dot formation region to a row (i.e., confinement of the quantum dots formed in a region that is a row), i.e., confinement to substantially one direction, is achieved by the confinement to substantially one direction of the trench in the insulating material, the trench at least partially filled with one or more gate metals. Such embodiments are described below with reference to FIGS. 1-4. In a second embodiment (where a quantum dot device may be referred to as a fin-based device), a row of a quantum dot formation region may be defined by at least a portion of a quantum well stack being formed as a fin corresponding to the row (i.e., multiple fins if there are multiple rows of quantum dot formation regions), and portions of gate metals of different gates being over the fin. In such an embodiment, confinement of the quantum dot formation region to a row is achieved by the confining the quantum well stack to the fin. Thus, in contrast to the second embodiment, at least portions of the quantum well stack may not be horizontally continuous across different fins. Such embodiments are described below with reference to FIGS. 10-12. In various embodiments, the quantum dot devices disclosed herein may provide two-dimensional arrays of quantum dots (e.g., quantum dots 142) during operation, with the quantum dots constrained in "rows" by the quantum dot formation regions (e.g., quantum dot formation regions 111) and "columns" by the gates (e.g., gates 106/108), as discussed below. In some embodiments, individual ones of the gates (e.g., of the gates 106/108) may be shared between multiple quantum dot formation regions. Quantum dot devices with alternating layouts and screening gates as described herein may be implemented with said row of quantum dot formation regions defined by either one of these two embodiments.

Example Quantum Dot Devices with Trenches

One type of quantum dot devices includes devices having a base, a continuous quantum well layer extending over the base, an insulating material over the quantum well layer, one or more trenches in the insulating material, and one or more gates with gate metals at least partially disposed in the trenches. In such devices, the quantum well layer is not etched into fins, as in fin-based devices. A quantum dot formed in such a device may be constrained in the x-direction by the one or more gates, in the y-direction by the trench, and in the z-direction by the quantum well layer, as discussed in detail herein. Unlike previous approaches to quantum dot formation and manipulation, quantum dot devices with trenches provide strong spatial localization of the quantum dots (and therefore good control over quantum dot interactions and manipulation), good scalability in the number of quantum dots included in the device, and/or design flexibility in making electrical connections to the quantum dot devices to integrate the quantum dot devices in larger computing devices. Therefore, this type of a quantum dot device is described as a first example quantum dot device in which alternating layouts and screening gates as described herein may be implemented.

Figure 2:
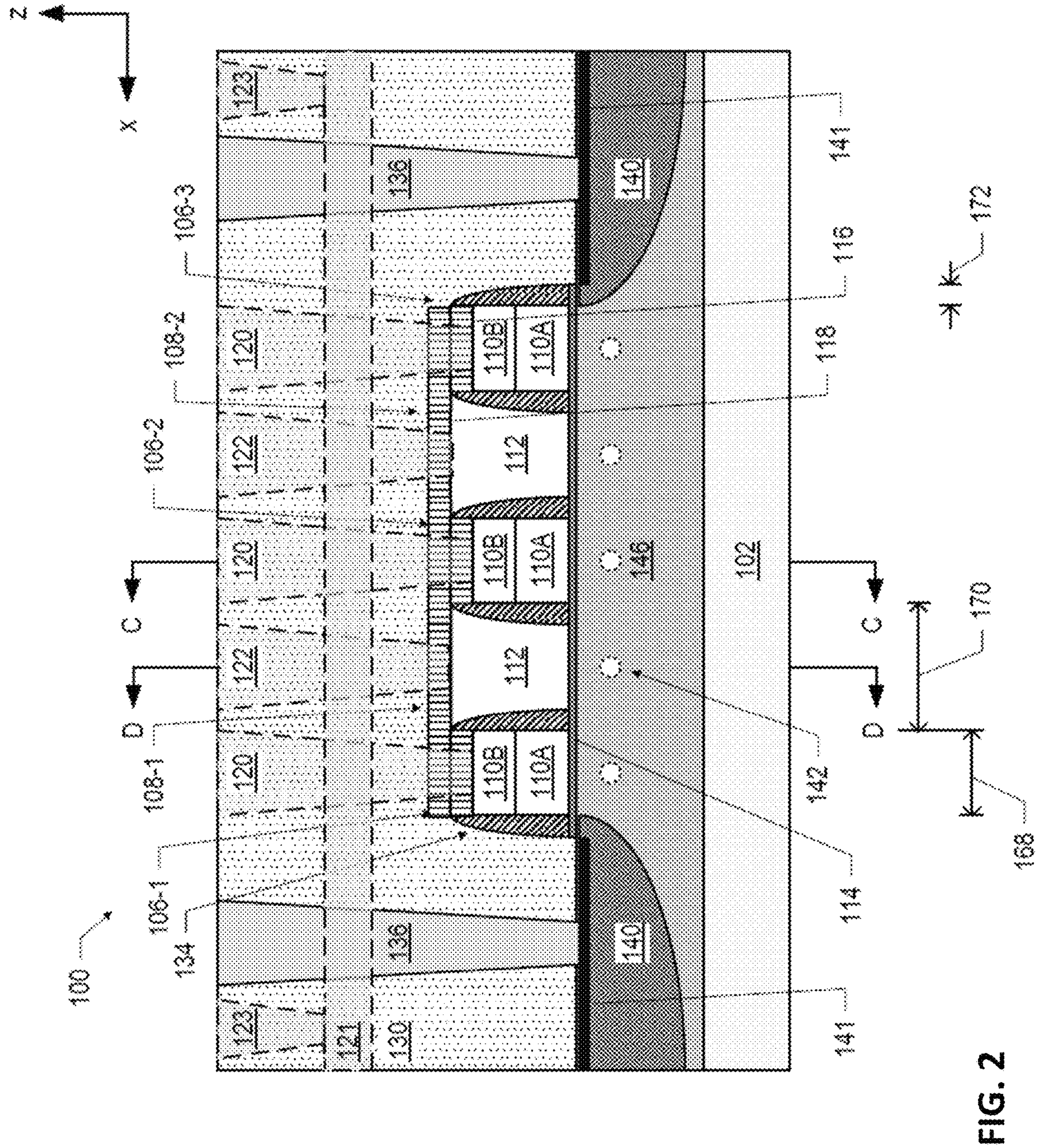
Figure 3:
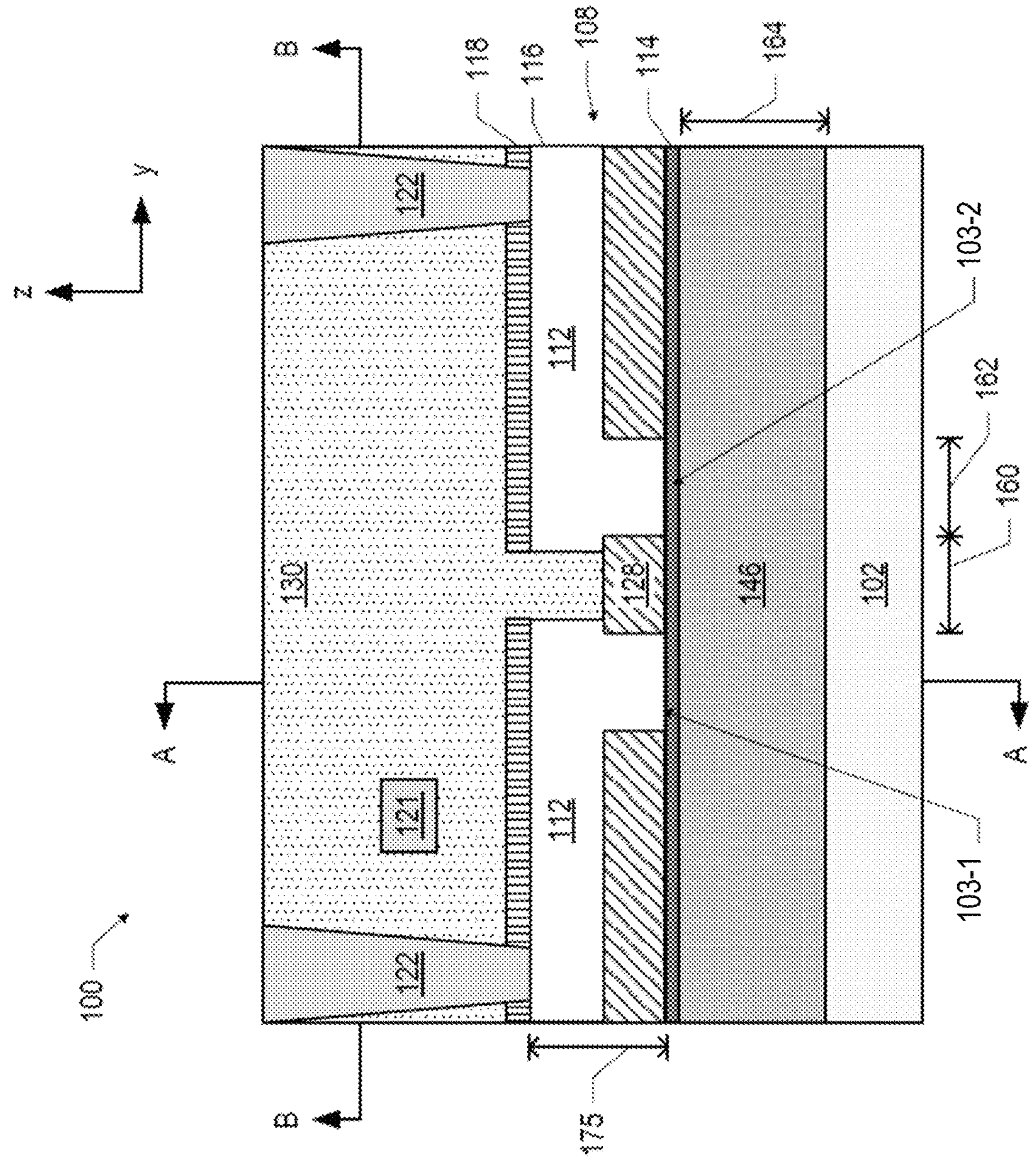
Figure 4:
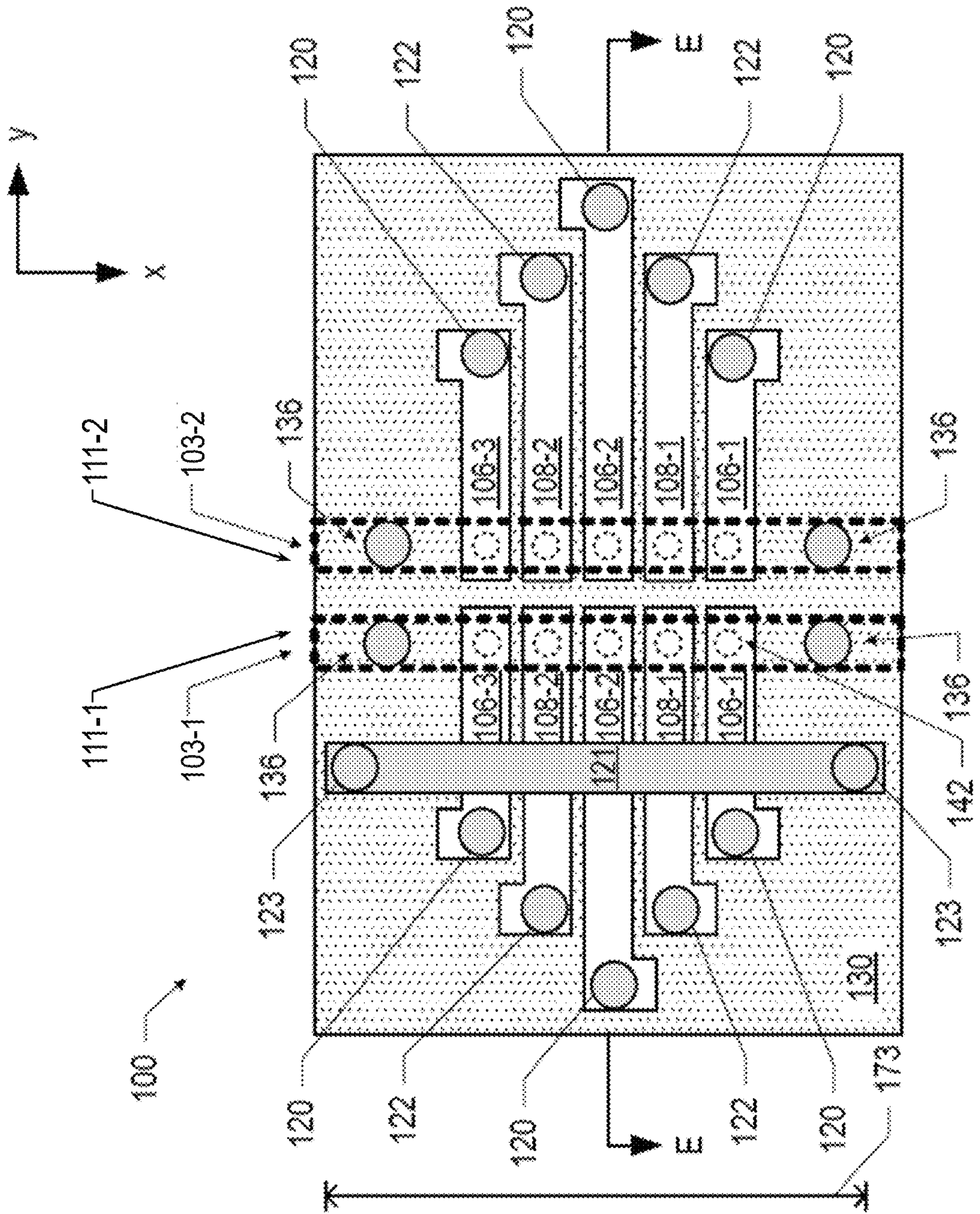

FIGS. 1-4 are cross-sectional views of a quantum dot device 100, in accordance with various embodiments. In particular, FIG. 2 illustrates the quantum dot device 100 taken along the section A-A of FIG. 1 (while FIG. 1 illustrates the quantum dot device 100 taken along the section C-C of FIG. 2), FIG. 3 illustrates the quantum dot device 100 taken along the section D-D of FIG. 2 (while FIG. 2 illustrates the quantum dot device 100 taken along the section A-A of FIG. 3), and FIG. 4 illustrates the quantum dot device 100 taken along the section B-B of FIG. 1 with a number of components not shown to more readily illustrate how the gates 106/108 and the magnet line 121 may be patterned (while FIG. 1 illustrates a quantum dot device 100 taken along the section E-E of FIG. 4). Although FIG. 1 indicates that the cross-section illustrated in FIG. 2 is taken through the trench 103-1, an analogous cross-section taken through the trench 103-2 may be identical, and thus the discussion of FIG. 2 refers generally to the "trench 103."

The quantum dot device 100 may include a quantum well stack 146 disposed on a base 102. An insulating material 128 may be disposed above the quantum well stack 146, and multiple trenches 103 in the insulating material 128 may extend toward the quantum well stack 146. In the embodiment illustrated in FIGS. 1-4, a gate dielectric 114 may be disposed between the quantum well stack 146 and the insulating material 128 so as to provide the "bottom" of the trenches 103. A number of examples of quantum well stacks 146 are discussed below with reference to FIGS. 5-7.

Although only two trenches, 103-1 and 103-2, are shown in FIGS. 1-4, this is simply for ease of illustration, and more than two trenches 103 may be included in the quantum dot device 100. In some embodiments, the total number of trenches 103 included in the quantum dot device 100 is an even number, with the trenches 103 organized into pairs including one active trench 103 and one read trench 103, as discussed in detail below. When the quantum dot device 100 includes more than two trenches 103, the trenches 103 may be arranged in pairs in a line (e.g., 2N trenches total may be arranged in a 1×2N line, or a 2×N line) or in pairs in a larger array (e.g., 2N trenches total may be arranged as a 4×N/2 array, a 6×N/3 array, etc.). As illustrated in FIGS. 1, 3, and 4, in some embodiments, multiple trenches 103 may be oriented substantially in parallel. The discussion herein will largely focus on a single pair of trenches 103 for ease of illustration, but all the teachings of the present disclosure apply to quantum dot devices 100 with more trenches 103. Further, the use of the term "trench" should not be interpreted to require that the insulating material 128 is deposited first and then a portion of that insulating material 128 is excavated to form the trench 103 prior to depositing material in the trench 103; in various embodiments, the insulating material 128 may be deposited before or after deposition of the material that will ultimately be disposed in the trench 103.

The quantum dot device 100 of FIGS. 1-4 may include multiple quantum dot formation regions 111 (labeled in FIG. 4), defined by the parallel trenches 103 in the insulating material 128 disposed on top of the quantum well stack 146. These quantum dot formation regions 111 may be portions of the quantum well stack 146 in which quantum dots 142 may form during operation. The quantum dot formation regions 111 may be arranged as multiple parallel rows defined by the trenches 103, and the gates 106/108 may each extend over multiple ones of the quantum dot formation regions 111.

The quantum well stack 146 may include a quantum well layer (not shown in FIGS. 1-4 but discussed below with reference to the quantum well layer 152 of FIGS. 5-7). The quantum well layer included in the quantum well stack 146 may be arranged normal to the z-direction, and may provide a layer in which a two-dimensional electron gas (2DEG) may form to enable the generation of one or more quantum dots during operation of the quantum dot device 100, as discussed in further detail below. The quantum well layer itself may provide a geometric constraint on the z-location of quantum dots in the quantum well stack 146. To control the x- and y-location of quantum dots in the quantum well stack 146, voltages may be applied to gates disposed at least partially in the trenches 103 above the quantum well stack 146 to adjust the energy profile along the trenches 103 in the x- and y-direction and thereby constrain the x- and y-location of quantum dots within quantum wells (discussed in detail below with reference to the gates 106/108). The dimensions of the trenches 103 may take any suitable values. For example, in some embodiments, the trenches 103 may each have a width 162 between about 5 nanometers and 50 nanometers. In some embodiments, the trenches 103 may each have a depth 164 between about 40 nanometers and 400 nanometers (e.g., between about 50 nanometers and 350 nanometers, or equal to about 100 nanometers). The insulating material 128 may be a dielectric material (e.g., an interlayer dielectric), such as silicon oxide. In some embodiments, the insulating material 128 may be a chemical vapor deposition (CVD) or flowable CVD oxide. In some embodiments, the trenches 103 may be spaced apart by a distance 160 between about 30 nanometers and 300 nanometers.

Multiple gates may be disposed at least partially in each of the trenches 103. In the embodiment illustrated in FIG. 2, three gates 106 and two gates 108 are shown as distributed at least partially in a single trench 103. This particular number of gates is simply illustrative, and any suitable number of gates may be used (in fact, each of FIGS. 20 and 23, showing various embodiments of quantum dot devices with alternating layouts and screening gates illustrates more than a total of five gates). Additionally, in some embodiments, multiple groups of gates (like the gates illustrated in FIG. 2) may be disposed at least partially in the trench 103.

As shown in FIG. 2, the gate 108-1 may be disposed between the gates 106-1 and 106-2, and the gate 108-2 may be disposed between the gates 106-2 and 106-3. Each of the gates 106/108 may include a gate dielectric 114; in the embodiment illustrated in FIG. 2, the gate dielectric 114 for all of the gates 106/108 is provided by a common layer of gate dielectric material disposed between the quantum well stack 146 and the insulating material 128. In other embodiments, the gate dielectric 114 for each of the gates 106/108 may be provided by separate portions of gate dielectric 114 (i.e., the gate dielectric 114 may not be continuous across multiple ones of the gates 106/108). In some embodiments, the gate dielectric 114 may be a multilayer gate dielectric (e.g., with multiple materials used to improve the interface between the trench 103 and the corresponding gate metal). The gate dielectric 114 may be, for example, silicon oxide, aluminum oxide, or a high-k dielectric, such as hafnium oxide. More generally, the gate dielectric 114 may include elements such as hafnium, silicon, oxygen, titanium, tantalum, lanthanum, aluminum, zirconium, barium, strontium, yttrium, lead, scandium, niobium, and zinc. Examples of materials that may be used in the gate dielectric 114 may include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, tantalum oxide, tantalum silicon oxide, lead scandium tantalum oxide, and lead zinc niobate. In some embodiments, an annealing process may be carried out on the gate dielectric 114 to improve the quality of the gate dielectric 114.

Each of the gates 106 may include a gate metal 110 (including multiple layers of gate metal) and a hardmask 116. In particular, a first gate metal layer 110A may be disposed in the trench 103, and a second gate metal layer 110B may be disposed above the gate metal 110-1 and above the insulating material 128, as shown. The hardmask 116 may be formed of silicon nitride, silicon carbide, or another suitable material. The gate metal 110 may be disposed between the hardmask 116 and the gate dielectric 114, and the gate dielectric 114 may be disposed between the gate metal 110 and the quantum well stack 146. As shown in FIG. 1, in some embodiments, the gate metal 110 of a gate 106 may extend over the insulating material 128 and into a trench 103 in the insulating material 128. Only one portion of the hardmask 116 is labeled in FIG. 2 for ease of illustration.

In some embodiments, the gate metal 110 may be a superconductor, such as aluminum, titanium nitride, or niobium titanium nitride; any of these materials may be included in the first gate metal layer 110A and/or the second gate metal layer 110B. In some embodiments, the first gate metal layer 110A may have a different material composition than the second gate metal layer 110B. For example, the first gate metal layer 110A may be titanium nitride, while the second gate metal layer 110B may be a material different from titanium nitride, or vice versa. In some embodiments, the first gate metal layer 110A and the second gate metal layer 110B may have the same material composition but a different microstructure. These different microstructures may arise, for example, by different deposition and/or patterning techniques used to form the first gate metal layer 110A and the second gate metal layer 110B. For example, in some embodiments, the first gate metal layer 110A may have a microstructure including columnar grains (e.g., when the first gate metal layer 110A is initially blanket-deposited and then etched as part of a subtractive patterning process), while the second gate metal layer 110B may not exhibit a columnar grain structure. In some embodiments, a seam delineating the interface between the top surface of the first gate metal layer 110A and the bottom surface of the second gate metal layer 110B may be present in the quantum dot device 100.

In some embodiments, the hardmask 116 may not be present in the quantum dot device 100 (e.g., a hardmask like the hardmask 116 may be removed during processing). The sides of the gate metal 110 may be substantially parallel, as shown in FIG. 2, and insulating spacers 134 may be disposed on the sides of the gate metal 110 and the hardmask 116 along the longitudinal axis of the trench 103. As illustrated in FIG. 2, the spacers 134 may be thicker closer to the quantum well stack 146 and thinner farther away from the quantum well stack 146. In some embodiments, the spacers 134 may have a convex shape. The spacers 134 may be formed of any suitable material, such as a carbon-doped oxide, silicon nitride, silicon oxide, or other carbides or nitrides (e.g., silicon carbide, silicon nitride doped with carbon, and silicon oxynitride). As illustrated in FIG. 1, no spacer material may be disposed between the gate metal 110 and the sidewalls of the trench 103 in the y-direction.

Each of the gates 108 may include a gate metal 112 and a hardmask 118. The hardmask 118 may be formed of silicon nitride, silicon carbide, or another suitable material. The gate metal 112 may be disposed between the hardmask 118 and the gate dielectric 114, and the gate dielectric 114 may be disposed between the gate metal 112 and the quantum well stack 146. As shown in FIG. 3, in some embodiments, the gate metal 112 of a gate 108 may extend over the insulating material 128 and into a trench 103 in the insulating material 128. In the embodiment illustrated in FIG. 2, the hardmask 118 may extend over the hardmask 116 (and over the gate metal 110 of the gates 106), while in other embodiments, the hardmask 118 may not extend over the gate metal 110. In the embodiment of FIGS. 1-3, the gate metal 112 of the gates 108 may be provided by a single continuous layer of material (and may not, for example, include multiple different layers of gate metal, as was discussed above with reference to the gate metal 110 of the gates 106). In other embodiments, however, the gate metal 112 of the gates 108 may include multiple layers of gate metal, e.g., multiple layers similar to the first gate metal layer 110A and the second gate metal layer 110B. In some embodiments, the gate metal 112 may be a different metal from the first gate metal layer 110A and/or the second gate metal layer 110B; in other embodiments, the gate metal 112 and the first gate metal layer 110A and/or the second gate metal layer 110B may have the same material composition. In some embodiments, the gate metal 112 may be a superconductor, such as aluminum, titanium nitride, or niobium titanium nitride. In some embodiments, the hardmask 118 may not be present in the quantum dot device 100 (e.g., a hardmask like the hardmask 118 may be removed during processing).

The gate 108-1 may extend between the proximate spacers 134 on the sides of the gate 106-1 and the gate 106-2 along the longitudinal axis of the trench 103, as shown in FIG. 2. In some embodiments, the gate metal 112 of the gate 108-1 may extend between the spacers 134 on the sides of the gate 106-1 and the gate 106-2 along the longitudinal axis of the trench 103. Thus, the gate metal 112 of the gate 108-1 may have a shape that is substantially complementary to the shape of the spacers 134, as shown in FIG. 2. Similarly, the gate 108-2 may extend between the proximate spacers 134 on the sides of the gate 106-2 and the gate 106-3 along the longitudinal axis of the trench 103. In some embodiments in which the gate dielectric 114 is not a layer shared commonly between the gates 108 and 106, but instead is separately deposited in the trench 103 between the spacers 134, the gate dielectric 114 may extend at least partially up the sides of the spacers 134 (and up the proximate sidewalls of the trench 103), and the gate metal 112 may extend between the portions of gate dielectric 114 on the spacers 134 (and the proximate sidewalls of the trench 103). As illustrated in FIG. 3, in some embodiments, no spacer material may be disposed between the gate metal 112 and the sidewalls of the trench 103 in the y-direction; in other embodiments (not shown in the present drawings), spacers 134 may also be disposed between the gate metal 112 and the sidewalls of the trench 103 in the y-direction.

The dimensions of the gates 106/108 may take any suitable values. For example, in some embodiments, the z-height 166 of the gate metal 110 in the trench 103 may be between about 80 nanometers and 400 nanometers (e.g., approximately about 200 nanometers); the z-height 175 of the gate metal 112 may be in about the same range. This z-height 166 of the gate metal 110 in the trench 103 may represent the sum of the z-height of the first gate metal layer 110A (e.g., between about 40 nanometers and 300 nanometers) and the thickness of the second gate metal layer 110B (e.g., between about 25 nanometers and 100 nanometers, or approximately 50 nanometers). In embodiments like the ones illustrated in FIGS. 1-3, the z-height 175 of the gate metal 112 may be greater than the z-height 166 of the gate metal 110 (as can be seen in, e.g., FIG. 2). In some embodiments, the length 168 of the gate metal 110 (i.e., in the x-direction) may be between about 20 nanometers and 50 nanometers (e.g., about 30 nanometers). Although all of the gates 106 are illustrated in the accompanying drawings as having the same length 168 of the gate metal 110, in some embodiments, the “outermost” gates 106 (e.g., the gates 106-1 and 106-3 of the embodiment illustrated in FIG. 2) may have a greater length 168 than the “inner” gates 106 (e.g., the gate 106-2 in the embodiment illustrated in FIG. 2). Such longer “outside” gates 106 may provide spatial separation between the doped regions 140 and the areas under the gates 108 and the inner gates 106 in which quantum dots 142 may form, and thus may reduce the perturbations to the potential energy landscape under the gates 108 and the inner gates 106 caused by the doped regions 140.

In some embodiments, the distance 170 between adjacent ones of the gates 106 (e.g., as measured from the gate metal 110 of one gate 106 to the gate metal 110 of an adjacent gate 106 in the x-direction, as illustrated in FIG. 2) may be between about 40 nanometers and 100 nanometers (e.g., about 50 nanometers). In some embodiments, the thickness 172 of the spacers 134 may be between about 1 nanometer and 10 nanometers (e.g., between about 3 nanometers and 5 nanometers, between about 4 nanometers and 6 nanometers, or between about 4 nanometers and 7 nanometers). The length of the gate metal 112 (i.e., in the x-direction) may depend on the dimensions of the gates 106 and the spacers 134, as illustrated in FIG. 2. As indicated in FIGS. 1 and 3, the gates 106/108 in one trench 103 may extend over the insulating material 128 between that trench 103 and an adjacent trench 103, but may be isolated from their counterpart gates by the intervening insulating material 130 and spacers 134.

As shown in FIG. 2, the gates 106 and 108 may be alternatingly arranged in the x-direction. During operation of the quantum dot device 100, voltages may be applied to the gates 106/108 to adjust the potential energy in the quantum well stack 146 to create quantum wells of varying depths in which quantum dots 142 may form. Only one quantum dot 142 is labeled with a reference numeral in FIGS. 2 and 4 for ease of illustration, but five are indicated as dotted circles below each trench 103. The location of the quantum dots 142 in FIGS. 2 and 4 is not intended to indicate a particular geometric positioning of the quantum dots 142. The spacers 134 (and the insulating material 128) may themselves provide "passive" barriers between quantum dots under the gates 106/108 in the quantum well stack 146, and the voltages applied to different ones of the gates 106/108 may adjust the potential energy under the gates 106/108 in the quantum well stack 146; decreasing the potential energy under a gate 106/108 may enable the formation of a quantum dot under that gate 106/108, while increasing the potential energy under a gate 106/108 may form a quantum barrier under that gate 106/108.

The quantum well stack 146 may include doped regions 140 that may serve as a reservoir of charge carriers for the quantum dot device 100. For example, an n-type doped region 140 may supply electrons for electron-type quantum dots 142, and a p-type doped region 140 may supply holes for hole-type quantum dots 142. In some embodiments, an interface material 141 may be disposed at a surface of a doped region 140, as shown. The interface material 141 may facilitate electrical coupling between a conductive contact (e.g., a conductive via 136, as discussed below) and the doped region 140. The interface material 141 may be any suitable metal-semiconductor ohmic contact material; for example, in embodiments in which the doped region 140 includes silicon, the interface material 141 may include nickel silicide, aluminum silicide, titanium silicide, molybdenum silicide, cobalt silicide, tungsten silicide, or platinum silicide. In some embodiments, the interface material 141 may be a non-silicide compound, such as titanium nitride. In some embodiments, the interface material 141 may be a metal (e.g., aluminum, tungsten, or indium).

The quantum dot devices 100 disclosed herein may be used to form electron-type or hole-type quantum dots 142. Note that the polarity of the voltages applied to the gates 106/108 to form quantum wells/barriers depends on the charge carriers used in the quantum dot device 100. In embodiments in which the charge carriers are electrons (and thus the quantum dots 142 are electron-type quantum dots), amply negative voltages applied to a gate 106/108 may increase the potential barrier under the gate 106/108, and amply positive voltages applied to a gate 106/108 may decrease the potential barrier under the gate 106/108 (thereby forming a potential well in which an electron-type quantum dot 142 may form). In embodiments in which the charge carriers are holes (and thus the quantum dots 142 are hole-type quantum dots), amply positive voltages applied to a gate 106/108 may increase the potential barrier under the gate 106/108, and amply negative voltages applied to a gate 106 and 108 may decrease the potential barrier under the gate 106/108 (thereby forming a potential well in which a hole-type quantum dot 142 may form). The quantum dot devices 100 disclosed herein may be used to form electron-type or hole-type quantum dots.

Voltages may be applied to each of the gates 106 and 108 separately to adjust the potential energy in the quantum well stack 146 under the gates 106 and 108, and thereby control the formation of quantum dots 142 under each of the gates 106 and 108. Additionally, the relative potential energy profiles under different ones of the gates 106 and 108 allow the quantum dot device 100 to tune the potential interaction between quantum dots 142 under adjacent gates. For example, if two adjacent quantum dots 142 (e.g., one quantum dot 142 under a gate 106 and another quantum dot 142 under an adjacent gate 108) are separated by only a short potential barrier, the two quantum dots 142 may interact more strongly than if they were separated by a taller potential barrier. Since the depth of the potential wells/height of the potential barriers under each gate 106/108 may be adjusted by adjusting the voltages on the respective gates 106/108, the differences in potential between adjacent gates 106/108 may be adjusted, and thus the interaction tuned.

In some applications, the gates 108 may be used as plunger gates to enable the formation of quantum dots 142 under the gates 108, while the gates 106 may be used as barrier gates to adjust the potential barrier between quantum dots 142 formed under adjacent gates 108. In other applications, the gates 108 may be used as barrier gates, while the gates 106 are used as plunger gates. In other applications, quantum dots 142 may be formed under all of the gates 106 and 108, or under any desired subset of the gates 106 and 108.

Conductive vias and lines may make contact with the gates 106/108, and to the doped regions 140, to enable electrical connection to the gates 106/108 and the doped regions 140 to be made in desired locations. As shown in FIGS. 1-4, the gates 106 may extend both "vertically" and "horizontally" away from the quantum well stack 146, and conductive vias 120 may contact the gates 106 (and are drawn in dashed lines in FIG. 2 to indicate their location behind the plane of the drawing). The conductive vias 120 may extend through the hardmask 116 and the hardmask 118 to contact the gate metal 110 of the gates 106. The gates 108 may similarly extend away from the quantum well stack 146, and conductive vias 122 may contact the gates 108 (also drawn in dashed lines in FIG. 2 to indicate their location behind the plane of the drawing). The conductive vias 122 may extend through the hardmask 118 to contact the gate metal 112 of the gates 108. Conductive vias 136 may contact the interface material 141 and may thereby make electrical contact with the doped regions 140. The quantum dot device 100 may include further conductive vias and/or lines (not shown) to make electrical contact to the gates 106/108 and/or the doped regions 140, as desired. The conductive vias and lines included in a quantum dot device 100 may include any suitable materials, such as copper, tungsten (deposited, e.g., by CVD), or a superconductor (e.g., aluminum, tin, titanium nitride, niobium titanium nitride, tantalum, niobium, or other niobium compounds such as niobium tin and niobium germanium).

During operation, a bias voltage may be applied to the doped regions 140 (e.g., via the conductive vias 136 and the interface material 141) to cause current to flow through the doped regions 140 and through a quantum well layer of the quantum well stack 146 (discussed in further detail below with reference to FIGS. 5-7). When the doped regions 140 are doped with an n-type material, this voltage may be positive; when the doped regions 140 are doped with a p-type material, this voltage may be negative. The magnitude of this bias voltage may take any suitable value (e.g., between about 0.25 volts and 2 volts).

In some embodiments, the quantum dot device 100 may include one or more magnet lines 121. For example, a single magnet line 121 is illustrated in FIGS. 1-4, proximate to the trench 103-1. The magnet line 121 may be formed of a conductive material and may be used to conduct current pulses that generate magnetic fields to influence the spin states of one or more of the quantum dots 142 that may form in the quantum well stack 146. In some embodiments, the magnet line 121 may conduct a pulse to reset (or "scramble") nuclear and/or quantum dot spins. In some embodiments, the magnet line 121 may conduct a pulse to initialize an electron in a quantum dot in a particular spin state. In some embodiments, the magnet line 121 may conduct current to provide a continuous, oscillating magnetic field to which the spin of a qubit may couple. The magnet line 121 may provide any suitable combination of these embodiments, or any other appropriate functionality.

In some embodiments, the magnet line 121 may be formed of copper. In some embodiments, the magnet line 121 may be formed of a superconductor, such as aluminum. The magnet line 121 illustrated in FIGS. 1-4 is non-coplanar with the trenches 103, and is also non-coplanar with the gates 106/108. In some embodiments, the magnet line 121 may be spaced apart from the gates 106/108, in the direction of the z-axis of the example coordinate system shown, by a distance 167. The distance 167 may take any suitable value (e.g., based on the desired strength of magnetic field interaction with particular quantum dots 142); in some embodiments, the distance 167 may be between about 25 nanometers and 1 micron (e.g., between about 50 nanometers and 200 nanometers).

In some embodiments, the magnet line 121 may be formed of a magnetic material. For example, a magnetic material (such as cobalt) may be deposited in a trench in the insulating material 130 to provide a permanent magnetic field in the quantum dot device 100.

The magnet line 121 may have any suitable dimensions. For example, the magnet line 121 may have a thickness 169 between about 25 nanometers and 100 nanometers. The magnet line 121 may have a width 171 between about 25 nanometers and 100 nanometers. In some embodiments, the width 171 and thickness 169 of a magnet line 121 may be substantially equal to, respectively, the width and thickness of other conductive lines in the quantum dot device 100 (not shown) used to provide electrical interconnects, as known in the art. The magnet line 121 may have a length 173 that may depend on the number and dimensions of the gates 106/108 that are to form quantum dots 142 with which the magnet line 121 is to interact. The magnet line 121 illustrated in FIGS. 1-4 is substantially linear, but this need not be the case; in general, the magnet lines 121 of the quantum dot devices 100 may take any suitable shape. In other embodiments, micro-magnets may be used instead or in addition to the magnet line 121. Conductive vias 123 may contact the magnet line 121.

The conductive vias 120, 122, 136, and 123 may be electrically isolated from each other by an insulating material 130. The insulating material 130 may be any suitable material, such as an interlayer dielectric (ILD). Examples of the insulating material 130 may include silicon oxide, silicon nitride, aluminum oxide, carbon-doped oxide, and/or silicon oxynitride. As known in the art of IC manufacturing, conductive vias and lines may be formed in an iterative process in which layers of structures are formed on top of each other. In some embodiments, the conductive vias 120/122/136/123 may have a width that is about 20 nanometers or greater at their widest point (e.g., about 30 nanometers), and a pitch of about 80 nanometers or greater (e.g., about 100 nanometers). In some embodiments, conductive lines (not shown) included in the quantum dot device 100 may have a width that is about 100 nanometers or greater, and a pitch of about 100 nanometers or greater. The particular arrangement of conductive vias shown in FIGS. 1-4 is simply illustrative, and any electrical routing arrangement may be implemented.

As discussed above, the structure of the trench 103-1 may be the same as the structure of the trench 103-2; similarly, the construction of gates 106/108 in and around the trench 103-1 may be the same as the construction of gates 106/108 in and around the trench 103-2. The gates 106/108 associated with the trench 103-1 may be mirrored by corresponding gates 106/108 associated with the parallel trench 103-2, and the insulating material 130 may separate the gates 106/108 associated with the different trenches 103-1 and 103-2. In particular, quantum dots 142 formed in the quantum well stack 146 under the trench 103-1 (under the gates 106/108) may have counterpart quantum dots 142 in the quantum well stack 146 under the trench 103-2 (under the corresponding gates 106/108). In some embodiments, the quantum dots 142 under the trench 103-1 may be used as "active" quantum dots in the sense that these quantum dots 142 act as qubits and are controlled (e.g., by voltages applied to the gates 106/108 associated with the trench 103-1) to perform quantum computations. The quantum dots 142 associated with the trench 103-2 may be used as "read" quantum dots in the sense that these quantum dots 142 may sense the quantum state of the quantum dots 142 under the trench 103-1 by detecting the electric field generated by the charge in the quantum dots 142 under the trench 103-1, and may convert the quantum state of the quantum dots 142 under the trench 103-1 into electrical signals that may be detected by the gates 106/108 associated with the trench 103-2. Each quantum dot 142 under the trench 103-1 may be read by its corresponding quantum dot 142 under the trench 103-2. Thus, the quantum dot device 100 enables both quantum computation and the ability to read the results of a quantum computation.

As discussed above, the quantum well stack 146 may include a quantum well layer in which a 2DEG may form during operation of the quantum dot device 100. The quantum well stack 146 may take any of a number of forms, several of which are illustrated in FIGS. 5-7. The various layers in the quantum well stacks 146 discussed below may be grown on the base 102 (e.g., using epitaxial processes).

Although the singular term "layer" may be used to refer to various components of the quantum well stacks 146 of FIGS. 5-7, any of the layers discussed below may include multiple materials arranged in any suitable manner. In embodiments in which a quantum well stack 146 includes layers other than a quantum well layer 152, layers other than the quantum well layer 152 in a quantum well stack 146 may have higher threshold voltages for conduction than the quantum well layer 152 so that when the quantum well layer 152 is biased at its threshold voltages, the quantum well layer 152 conducts and the other layers of the quantum well stack 146 do not. This may avoid parallel conduction in both the quantum well layer 152 and the other layers, and thus avoid compromising the strong mobility of the quantum well layer 152 with conduction in layers having inferior mobility. In some embodiments, silicon used in a quantum well stack 146 (e.g., in a quantum well layer 152) may be grown from precursors enriched with the 28Si isotope. In some embodiments, germanium used in a quantum well stack 146 (e.g., in a quantum well layer 152) may be grown from precursors enriched with the 70Ge, 72Ge, or 74Ge isotope.

Figures 5, 6, 7, 8, 9:
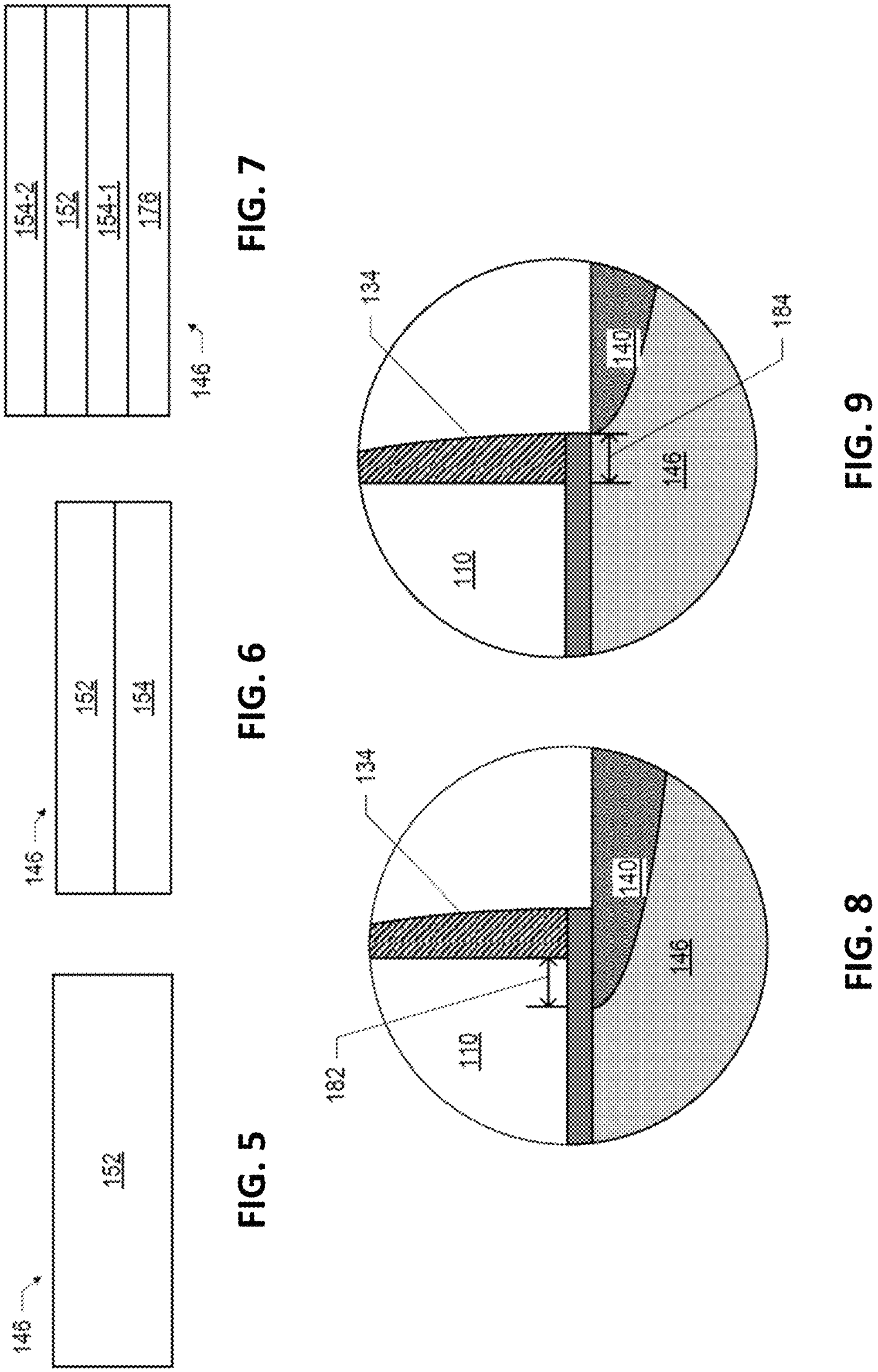
FIGS. 5-7 are cross-sectional views of various examples of quantum well stacks that may be used in a quantum dot device with either trenches or fins, in accordance with various embodiments.
FIGS. 8-9 illustrate detail views of various embodiments of a doped region in a quantum dot device with either trenches or fins, in accordance with various embodiments.

FIG. 5 is a cross-sectional view of a quantum well stack 146 including only a quantum well layer 152. The quantum well layer 152 may be disposed on the base 102, and may be formed of a material such that, during operation of the quantum dot device 100, a 2DEG may form in the quantum well layer 152 proximate to the upper surface of the quantum well layer 152. The gate dielectric 114 of the gates 106/108 may be disposed on the upper surface of the quantum well layer 152. In some embodiments, the quantum well layer 152 of FIG. 5 may be formed of intrinsic silicon, and the gate dielectric 114 may be formed of silicon oxide; in such an arrangement, during use of the quantum dot device 100, a 2DEG may form in the intrinsic silicon at the interface between the intrinsic silicon and the silicon oxide. Embodiments in which the quantum well layer 152 of FIG. 5 is formed of intrinsic silicon may be particularly advantageous for electron-type quantum dot devices 100. In some embodiments, the quantum well layer 152 of FIG. 5 may be formed of intrinsic germanium, and the gate dielectric 114 may be formed of germanium oxide; in such an arrangement, during use of the quantum dot device 100, a two-dimensional hole gas (2DHG) may form in the intrinsic germanium at the interface between the intrinsic germanium and the germanium oxide. Such embodiments may be particularly advantageous for hole-type quantum dot devices 100. In some embodiments, the quantum well layer 152 may be strained, while in other embodiments, the quantum well layer 152 may not be strained. The thicknesses (i.e., z-heights) of the layers in the quantum well stack 146 of FIG. 5 may take any suitable values. For example, in some embodiments, the thickness of the quantum well layer 152 (e.g., intrinsic silicon or germanium) may be between about 0.8 microns and 1.2 microns.

FIG. 6 is a cross-sectional view of a quantum well stack 146 including a quantum well layer 152 and a barrier layer 154. The quantum well stack 146 may be disposed on the base 102 (e.g., as discussed above with reference to FIG. 6) such that the barrier layer 154 is disposed between the quantum well layer 152 and the base 102. The barrier layer 154 may provide a potential barrier between the quantum well layer 152 and the base 102. As discussed above with reference to FIG. 5, the quantum well layer 152 of FIG. 6 may be formed of a material such that, during operation of the quantum dot device 100, a 2DEG may form in the quantum well layer 152 proximate to the upper surface of the quantum well layer 152. For example, in some embodiments in which the base 102 is formed of silicon, the quantum well layer 152 of FIG. 6 may be formed of silicon, and the barrier layer 154 may be formed of silicon germanium. The germanium content of this silicon germanium may be about 20-80% (e.g., about 30%). In some embodiments in which the quantum well layer 152 is formed of germanium, the barrier layer 154 may be formed of silicon germanium, e.g., with a germanium content of about 20-80% (e.g., about 70%). The thicknesses (i.e., z-heights) of the layers in the quantum well stack 146 of FIG. 6 may take any suitable values. For example, in some embodiments, the thickness of the barrier layer 154 (e.g., silicon germanium) may be between about 0 nanometers and 400 nanometers. In some embodiments, the thickness of the quantum well layer 152 (e.g., silicon or germanium) may be between about 5 nanometers and 30 nanometers.

FIG. 7 is a cross-sectional view of a quantum well stack 146 including a quantum well layer 152 and a barrier layer 154-1, as well as a buffer layer 176 and an additional barrier layer 154-2. The quantum well stack 146 may be disposed on the base 102 such that the buffer layer 176 is disposed between the barrier layer 154-1 and the base 102. The buffer layer 176 may be formed of the same material as the barrier layer 154, and may be present to trap defects that form in this material as it is grown on the base 102. In some embodiments, the buffer layer 176 may be grown under different conditions (e.g., deposition temperature or growth rate) from the barrier layer 154-1. In particular, the barrier layer 154-1 may be grown under conditions that achieve fewer defects than the buffer layer 176. In some embodiments in which the buffer layer 176 includes silicon germanium, the silicon germanium of the buffer layer 176 may have a germanium content that varies from the base 102 to the barrier layer 154-1; for example, the silicon germanium of the buffer layer 176 may have a germanium content that varies from zero percent at the silicon base 102 to a nonzero percent (e.g., about 30%) at the barrier layer 154-1. The thicknesses (i.e., z-heights) of the layers in the quantum well stack 146 of FIG. 7 may take any suitable values. For example, in some embodiments, the thickness of the buffer layer 176 (e.g., silicon germanium) may be between about 0.3 microns and 4 microns (e.g., between about 0.3 microns and 2 microns, or about 0.5 microns). In some embodiments, the thickness of the barrier layer 154-1 (e.g., silicon germanium) may be between about 0 nanometers and 400 nanometers. In some embodiments, the thickness of the quantum well layer 152 (e.g., silicon or germanium) may be between about 5 nanometers and 30 nanometers (e.g., about 10 nanometers). The barrier layer 154-2, like the barrier layer 154-1, may provide a potential energy barrier around the quantum well layer 152, and may take the form of any of the embodiments of the barrier layer 154-1. In some embodiments, the thickness of the barrier layer 154-2 (e.g., silicon germanium) may be between about 25 nanometers and 75 nanometers (e.g., about 32 nanometers).

As discussed above with reference to FIG. 6, the quantum well layer 152 of FIG. 7 may be formed of a material such that, during operation of the quantum dot device 100, a 2DEG may form in the quantum well layer 152 proximate to the upper surface of the quantum well layer 152. For example, in some embodiments in which the base 102 is formed of silicon, the quantum well layer 152 of FIG. 7 may be formed of silicon, and the barrier layer 154-1 and the buffer layer 176 may be formed of silicon germanium. In some such embodiments, the silicon germanium of the buffer layer 176 may have a germanium content that varies from the base 102 to the barrier layer 154-1; for example, the silicon germanium of the buffer layer 176 may have a germanium content that varies from zero percent at the silicon base 102 to a nonzero percent (e.g., about 30%) at the barrier layer 154-1. In other embodiments, the buffer layer 176 may have a germanium content about equal to the germanium content of the barrier layer 154-1 but may be thicker than the barrier layer 154-1 so as to absorb the defects that arise during growth.

In some embodiments, the quantum well layer 152 of FIG. 7 may be formed of germanium, and the buffer layer 176 and the barrier layer 154-1 may be formed of silicon germanium. In some such embodiments, the silicon germanium of the buffer layer 176 may have a germanium content that varies from the base 102 to the barrier layer 154-1; for example, the silicon germanium of the buffer layer 176 may have a germanium content that varies from zero percent at the base 102 to a nonzero percent (e.g., about 70%) at the barrier layer 154-1. The barrier layer 154-1 may in turn have a germanium content equal to the nonzero percent. In other embodiments, the buffer layer 176 may have a germanium content about equal to the germanium content of the barrier layer 154-1 but may be thicker than the barrier layer 154-1 so as to absorb the defects that arise during growth. In some embodiments of the quantum well stack 146 of FIG. 7, the buffer layer 176 and/or the barrier layer 154-2 may be omitted.

The outer spacers 134 on the outer gates 106, shown, e.g., in FIG. 2, may provide a doping boundary, limiting diffusion of the dopant from the doped regions 140 into the area under the gates 106/108. In some embodiments, the doped regions 140 may extend past the outer spacers 134 and under the outer gates 106. For example, as illustrated in FIG. 8, the doped region 140 may extend past the outer spacers 134 and under the outer gates 106 by a distance 182 between about 0 nanometers and 10 nanometers. In some embodiments, the doped regions 140 may not extend past the outer spacers 134 toward the outer gates 106, but may instead "terminate" under the outer spacers 134. For example, as illustrated in FIG. 9, the doped regions 140 may be spaced away from the interface between the outer spacers 134 and the outer gates 106 by a distance 184 between about 0 nanometers and 10 nanometers. The interface material 141 is omitted from FIGS. 8 and 9 for ease of illustration.

Example Quantum Dot Devices with Fins

Another type of quantum dot devices includes devices having a base, a fin extending away from the base, where the fin includes a quantum well layer, and one or more gates disposed on the fin. A quantum dot formed in such a device may be constrained in the x-direction by the one or more gates, in the y-direction by the fin, and in the z-direction by the quantum well layer, as discussed in detail herein. Similar to the quantum dot devices with trenches, described above, and unlike previous approaches to quantum dot formation and manipulation, quantum dot devices with fins provide strong spatial localization of the quantum dots (and therefore good control over quantum dot interactions and manipulation), good scalability in the number of quantum dots included in the device, and/or design flexibility in making electrical connections to the quantum dot devices to integrate the quantum dot devices in larger computing devices. Therefore, this type of a quantum dot device is described as another example quantum dot device in which alternating layouts and screening gates as described herein may be implemented.

Figure 10:
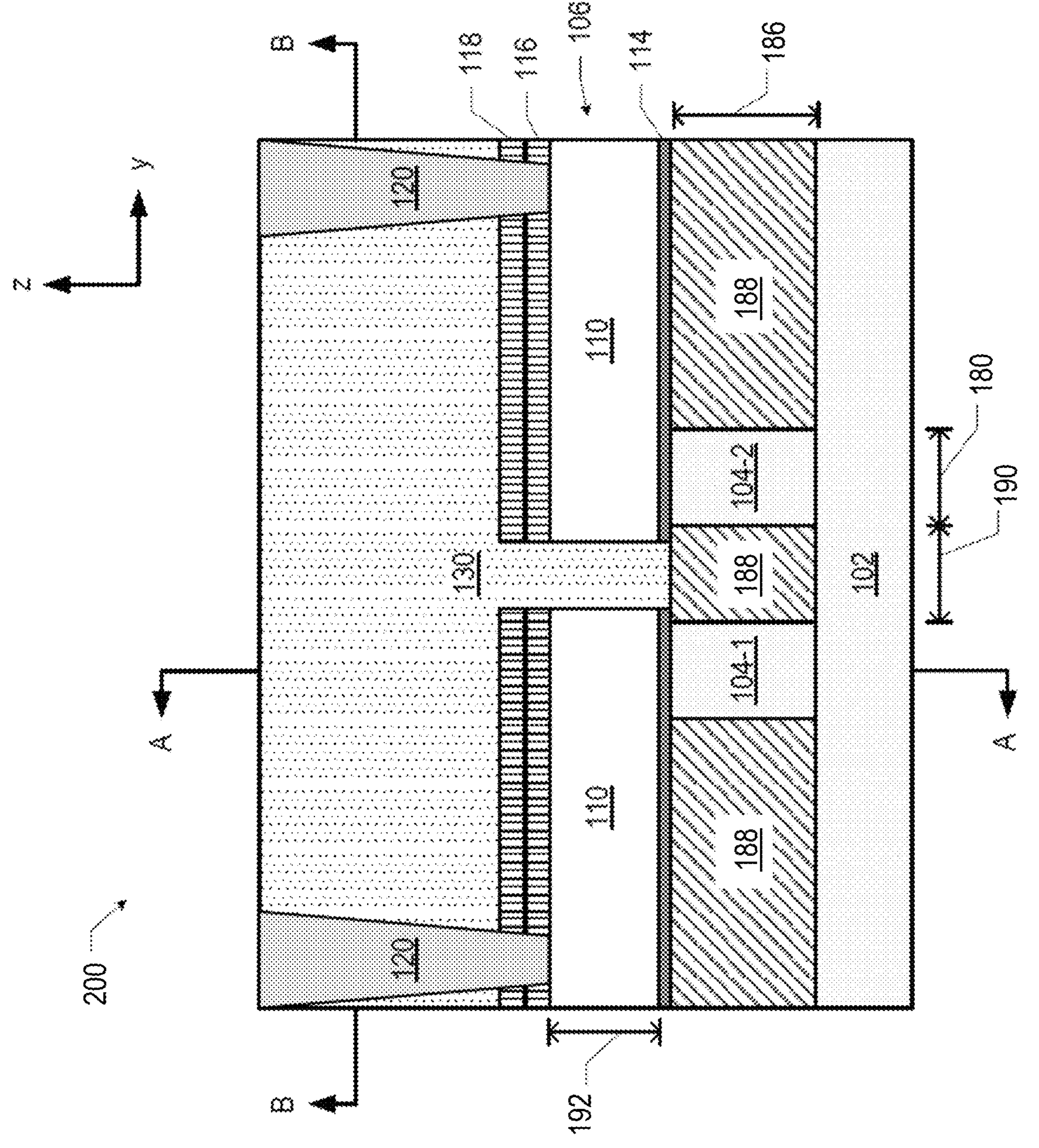
FIGS. 10-12 are cross-sectional and top-down views of an example quantum dot device with fins, according to some embodiments of the present disclosure.
Figure 11:
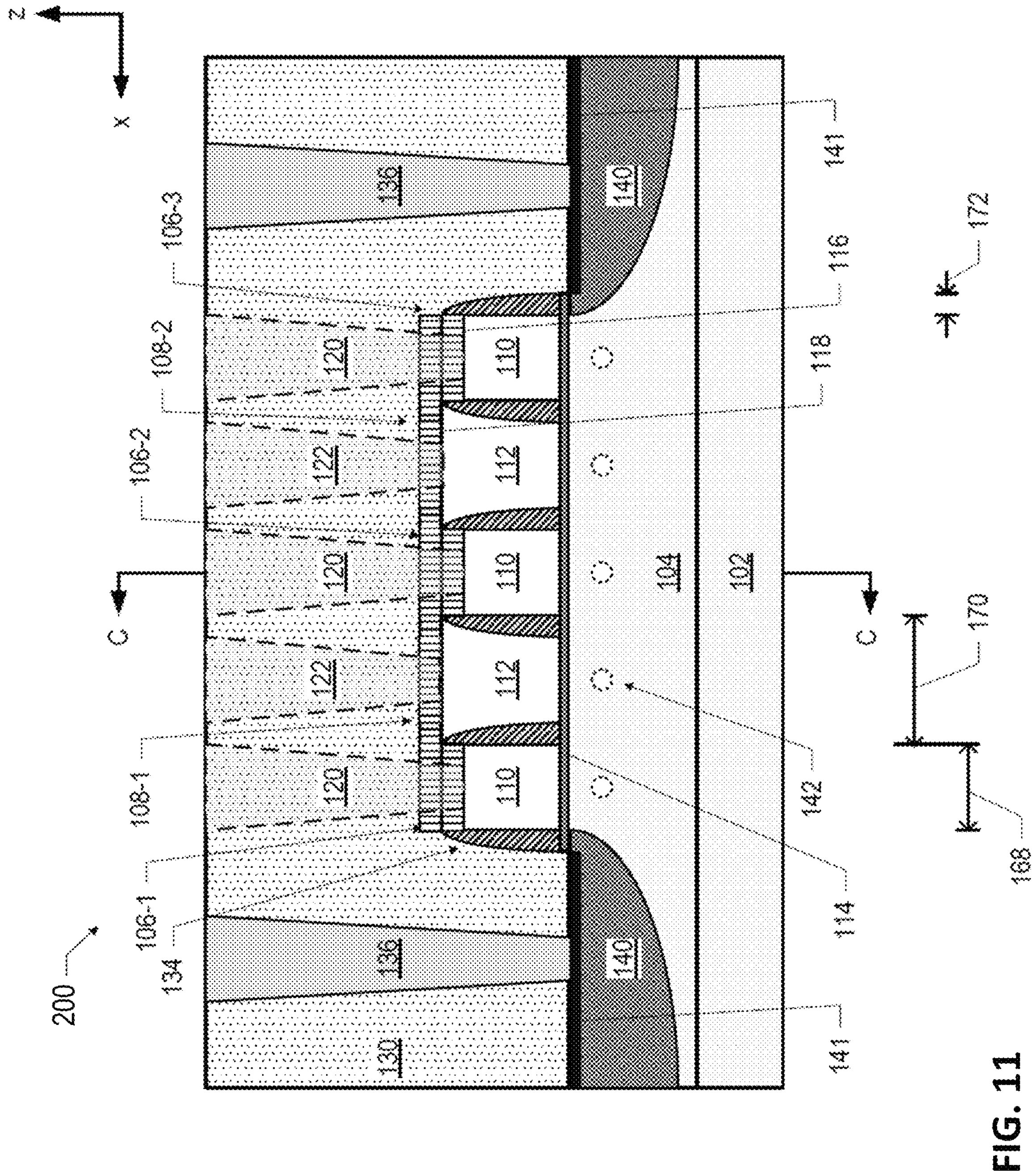
Figure 12:
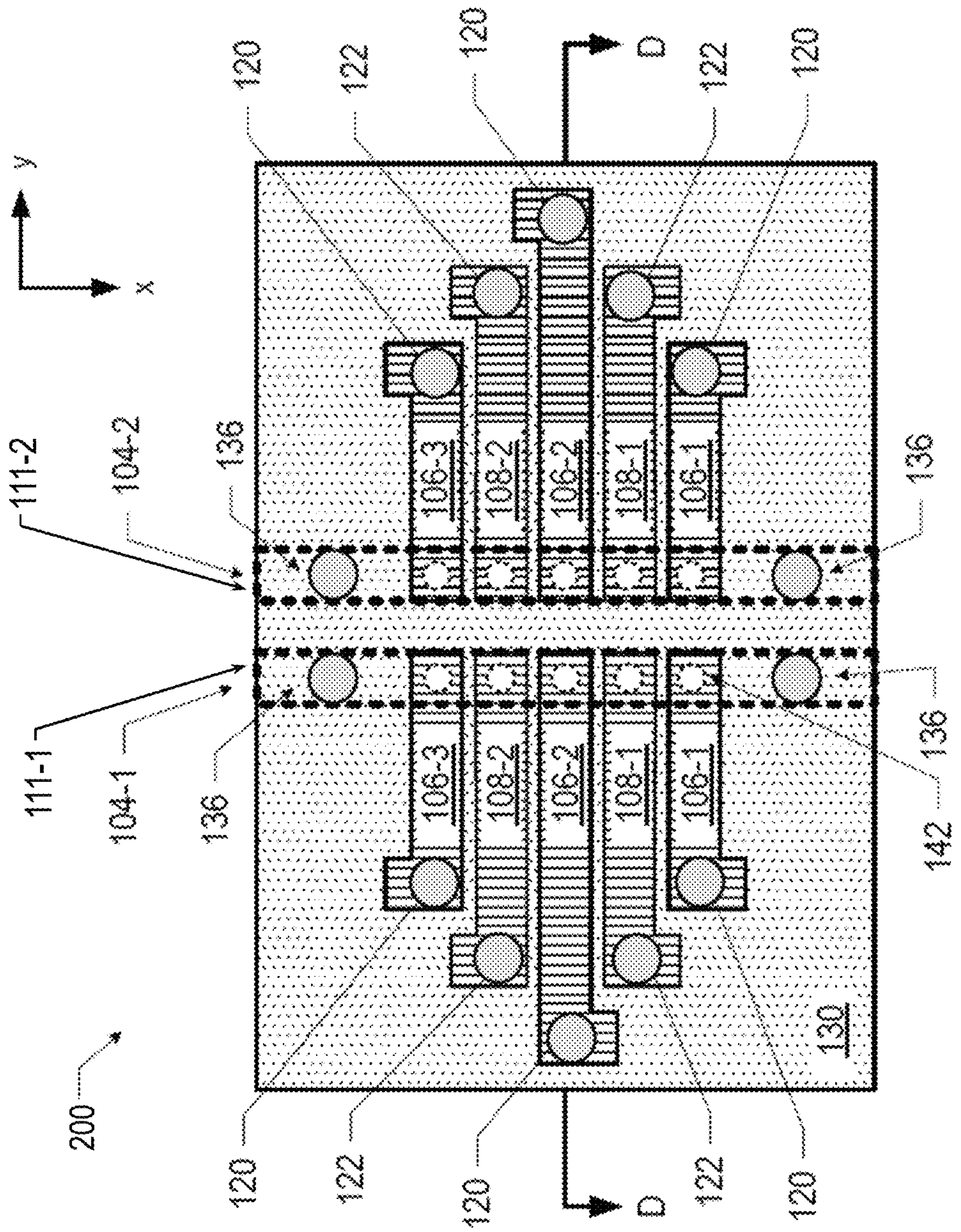

FIGS. 10-12 are cross-sectional views of an example quantum dot device 200 implementing quantum dot qubits, in accordance with various embodiments. In particular, FIG. 11 illustrates the quantum dot device 200 taken along the section A-A of FIG. 10 (while FIG. 10 illustrates the quantum dot device 200 taken along the section C-C of FIG. 11), and FIG. 12 illustrates the quantum dot device 200 taken along the section B-B of FIG. 10 (while FIG. 10 illustrates a quantum dot device 200 taken along the section D-D of FIG. 12). Although FIG. 10 indicates that the cross-section illustrated in FIG. 11 is taken through the fin 104-1, an analogous cross-section taken through the fin 104-2 may be identical, and thus the discussion of FIGS. 10-12 refers generally to the "fin 104."

As shown in FIGS. 10-12, the quantum dot device 200 may include a base 102, similar to the base 102 of the quantum dot device 200 shown in FIGS. 1-4, and multiple fins 104 extending away from the base 102. The base 102 and the fins 104 may include a semiconductor substrate and a quantum well stack (not shown in FIGS. 10-12 but discussed below with reference to the semiconductor substrate 144 and the quantum well stack 146), distributed in any of a number of ways between the base 102 and the fins 104. The base 102 may include at least some of the semiconductor substrate, and the fins 104 may each include a quantum well layer, e.g., a quantum well layer as discussed above with reference to the quantum well layer 152 of FIGS. 5-7. Examples of base/fin arrangements are discussed below with reference to the base fin arrangements 158 of FIGS. 13-19.

Although only two fins, 104-1 and 104-2, are shown in FIGS. 10-12, this is simply for ease of illustration, and more than two fins 104 may be included in the quantum dot device 200. In some embodiments, the total number of fins 104 included in the quantum dot device 200 is an even number, with the fins 104 organized into pairs including one active fin 104 and one read fin 104, as discussed in detail below. When the quantum dot device 200 includes more than two fins 104, the fins 104 may be arranged in pairs in a line (e.g., 2N fins total may be arranged in a 1×2N line, or a 2×N line) or in pairs in a larger array (e.g., 2N fins total may be arranged as a 4×N/2 array, a 6×N/3 array, etc.). As illustrated in FIGS. 10 and 12, in some embodiments, multiple fins 104 may be oriented substantially in parallel. The discussion herein will largely focus on a single pair of fins 104 for ease of illustration, but all the teachings of the present disclosure apply to quantum dot devices 200 with more fins 104.

The quantum dot device 200 of FIGS. 10-12 may include multiple quantum dot formation regions 111 (labeled in FIG. 12), defined by the fins 104. These quantum dot formation regions 111 may be portions of the quantum well stack 146 in which quantum dots 142 may form during operation. The quantum dot formation regions 111 may be arranged as multiple parallel rows defined by the insulating material 188, and the gates 106/108 may each extend over multiple ones of the quantum dot formation regions 111. In the embodiments discussed with reference to FIGS. 10-12, the quantum dot formation regions 111 may be defined by fins 104 separated by portions of insulating material 188; these fins 104 may provide parallel rows of portions of quantum well layers 152 in which quantum dots 142 may form. Thus, the quantum dot formation regions 111 of the quantum dot device 200 of FIGS. 10-12 and of the quantum dot device 100 of FIGS. 1-4 illustrate two different ways of defining the quantum dot formation regions 111.

As noted above, each of the fins 104 may include a quantum well layer (not shown in FIGS. 10-12 but discussed above with reference to the quantum well layer 152). The quantum well layer included in the fins 104 may be arranged normal to the z-direction, and may provide a layer in which a 2DEG may form to enable the generation of a quantum dot during operation of the quantum dot device 200, as discussed in further detail below. The quantum well layer itself may provide a geometric constraint on the z-location of quantum dots in the fins 104, and the limited extent of the fins 104 (and therefore the quantum well layer) in the y-direction may provide a geometric constraint on the y-location of quantum dots in the fins 104. To control the x-location of quantum dots in the fins 104, voltages may be applied to gates disposed on the fins 104 to adjust the energy profile along the fins 104 in the x-direction and thereby constrain the x-location of quantum dots within quantum wells (discussed in detail below with reference to the gates 106/108). The dimensions of the fins 104 may take any suitable values. For example, in some embodiments, the fins 104 may each have a width 180 between about 5 and 80 nanometers. In some embodiments, the fins 104 may each have a height 186 between about 100 and 400 nanometers (e.g., between about 150 and 350 nanometers, or equal to about 300 nanometers).

The fins 104 may be arranged in parallel, as illustrated in FIGS. 10 and 12, and may be spaced apart by an insulating material 188, which may be disposed on opposite faces of the fins 104. The insulating material 188 of the quantum dot device 200 may be a dielectric material, such as silicon oxide, similar to the insulating material 128 of the quantum dot device 100. For example, in some embodiments, the fins 104 may be spaced apart by a distance 190 between about 100 and 250 microns.

Multiple gates may be disposed on each of the fins 104. In the embodiment illustrated in FIG. 11, three gates 106 and two gates 108 are shown as distributed on the top of the fin 104. This particular number of gates is simply illustrative, and any suitable number of gates may be used. Additionally, multiple groups of gates like the gates illustrated in FIG. 11 may be disposed on the fin 104.

Similar to the quantum dot device 100, in the quantum dot device 200, as shown in FIG. 11, the gate 108-1 may be disposed between the gates 106-1 and 106-2, and the gate 108-2 may be disposed between the gates 106-2 and 106-3, and each of the gates 106/108 may include a gate dielectric 114. In the embodiment illustrated in FIG. 11, the gate dielectric 114 for all of the gates 106/108 is provided by a common layer of gate dielectric material. In other embodiments, the gate dielectric 114 for each of the gates 106/108 of the quantum dot device 200 may be provided by separate portions of gate dielectric 114. Descriptions provided with respect to materials of the gate dielectric 114 of the quantum dot device 100 are applicable to the gate dielectric 114 of the quantum dot device 200 and, therefore, are not repeated.

In the quantum dot device 200, each of the gates 106 may include a gate metal 110 and a hardmask 116, similar to those of the quantum dot device 100. The gate metal 110 may be disposed between the hardmask 116 and the gate dielectric 114, and the gate dielectric 114 may be disposed between the gate metal 110 and the fin 104. Only one portion of the hardmask 116 is labeled in FIG. 11 for ease of illustration. In some embodiments, the hardmask 116 may not be present in the quantum dot device 200 (e.g., a hardmask like the hardmask 116 may be removed during processing). In the quantum dot device 200, the sides of the gate metal 110 may be substantially parallel, as shown in FIG. 11, and insulating spacers 134 may be disposed on the sides of the gate metal 110 and the hardmask 116, similar to the insulating spacers 134 of the quantum dot device 100. As illustrated in FIG. 11, the spacers 134 may be thicker closer to the fin 104 and thinner farther away from the fin 104. In some embodiments, the spacers 134 may have a convex shape. Descriptions provided with respect to materials of the gate metal 110, the hardmask 116, and the spacers 134 of the quantum dot device 100 are applicable to those of the quantum dot device 200 and, therefore, are not repeated.

In the quantum dot device 200, each of the gates 108 may include a gate metal 112 and a hardmask 118, similar to those of the quantum dot device 100. The gate metal 112 may be disposed between the hardmask 118 and the gate dielectric 114, and the gate dielectric 114 may be disposed between the gate metal 112 and the fin 104. In the embodiment illustrated in FIG. 11, the hardmask 118 may extend over the hardmask 116 (and over the gate metal 110 of the gates 106), while in other embodiments, the hardmask 118 may not extend over the gate metal 110. In some embodiments, the gate metal 112 may be a different metal from the gate metal 110; in other embodiments, the gate metal 112 and the gate metal 110 may have the same material composition. In some embodiments, the hardmask 118 may not be present in the quantum dot device 200 (e.g., a hardmask like the hardmask 118 may be removed during processing). Descriptions provided with respect to materials of the gate metal 112 and the hardmask 118 of the quantum dot device 100 are applicable to those of the quantum dot device 200 and, therefore, are not repeated.

The gate 108-1 may extend between the proximate spacers 134 on the sides of the gate 106-1 and the gate 106-2 along the longitudinal axis of the fin 104, as shown in FIG. 11. In some embodiments, the gate metal 112 of the gate 108-1 may extend between the spacers 134 on the sides of the gate 106-1 and the gate 106-2 along the longitudinal axis of the fin 104. Thus, the gate metal 112 may have a shape that is substantially complementary to the shape of the spacers 134, as shown in FIG. 11. Similarly, the gate 108-2 may extend between the proximate spacers 134 on the sides of the gate 106-2 and the gate 106-3 along the longitudinal axis of the fin 104. In some embodiments in which the gate dielectric 114 is not a layer shared commonly between the gates 108 and 106, but instead is separately deposited on the fin 104 between the spacers 134, the gate dielectric 114 may extend at least partially up the sides of the spacers 134, and the gate metal 112 may extend between the portions of gate dielectric 114 on the spacers 134. The gate metal 112, like the gate metal 110, may be any suitable metal, such as titanium nitride.

The dimensions of the gates 106/108 in the quantum dot device 200 may take any suitable values. For example, in some embodiments, the z-height 192 of the gate metal 110 may be between about 40 and 75 nanometers (e.g., approximately about 50 nanometers); the z-height of the gate metal 112 may be in the same range. In embodiments like the ones illustrated in FIG. 11, the z-height of the gate metal 112 may be greater than the z-height of the gate metal 110. In some embodiments, the length 168 of the gate metal 110 (i.e., in the x-direction) in the quantum dot device 200 may be substantially the same as in the quantum dot device 100, e.g., between about 20 and 40 nanometers (e.g., about 30 nanometers). In some embodiments, the distance 170 and/or the thickness 172 shown for the quantum dot device 200 of FIG. 11 may be substantially the same as those shown for the quantum dot device 100 of FIG. 2. The length of the gate metal 112 (i.e., in the x-direction) may depend on the dimensions of the gates 106 and the spacers 134, as illustrated in FIG. 11. As indicated in FIG. 10, the gates 106/108 on one fin 104 may extend over the insulating material 188 beyond their respective fins 104 and towards the other fin 104, but may be isolated from their counterpart gates by the intervening insulating material 130.

In the embodiment of the quantum dot device 200 illustrated in FIG. 11, the z-height of the gate metal 112 of the gates 108 may be approximately equal to the sum of the z-height of the gate metal 110 and the z-height of the hardmask 116, as shown. Also, in the embodiment of FIG. 11, the gate metal 112 of the gates 108 may not extend in the x-direction beyond the adjacent spacers 134. In other embodiments, the z-height of the gate metal 112 of the gates 108 may be greater than the sum of the z-height of the gate metal 110 and the z-height of the hardmask 116, and in some such embodiments, the gate metal 112 of the gates may extend beyond the spacers 134 in the x-direction.

As shown in FIG. 11, the gates 106 and 108 may be alternatingly arranged along the fin 104 in the x-direction. During operation of the quantum dot device 200, voltages may be applied to the gates 106/108 to adjust the potential energy in the quantum well layer (not shown) in the fin 104 to create quantum wells of varying depths in which quantum dots 142 may form. Only one quantum dot 142 is labeled with a reference numeral in FIGS. 11 and 12 for ease of illustration, but five are indicated as dotted circles in each fin 104, forming what may be referred to as a "quantum dot array." The location of the quantum dots 142 in FIG. 11 is not intended to indicate a particular geometric positioning of the quantum dots 142. Similar to the quantum dot device 100, in the quantum dot device 200, the spacers 134 may themselves provide "passive" barriers between quantum wells under the gates 106/108 in the quantum well layer, and the voltages applied to different ones of the gates 106/108 may adjust the potential energy under the gates 106/108 in the quantum well layer; decreasing the potential energy may form quantum wells, while increasing the potential energy may form quantum barriers.

The fins 104 may include doped regions 140 that may serve as a reservoir of charge carriers for the quantum dot device 200. Descriptions of the n-type doped region 140, the p-type doped region 140, the interface material 141, how the voltages may be applied to the gates 106/108 to form quantum wells/barriers, how the gates 108 may be used as plunger gates while the gates 106 may be used as barrier gates, and of conductive vias and lines that may make contact with the gates 106/108 and with the doped regions 140, provided with respect to the quantum dot device 100 are applicable to the quantum dot device 200 and, therefore, are not repeated. As shown in FIGS. 10-12, the gates 106 may extend away from the fins 104, and conductive vias 120 may contact the gates 106 (and are drawn in dashed lines in FIG. 11 to indicate their location behind the plane of the drawing). The gates 108 may similarly extend away from the fins 104, and conductive vias 122 may contact the gates 108 (also drawn in dashed lines in FIG. 11 to indicate their location behind the plane of the drawing). The quantum dot device 200 may include further conductive vias and/or lines (not shown) to make electrical contact to the gates 106/108 and/or the doped regions 140, as desired. Descriptions of the bias voltage that may be applied to the doped regions 140 and of the conductive vias 120, 122, and 136, provided with respect to the quantum dot device 100 are applicable to the quantum dot device 200 and, therefore, are not repeated. Furthermore, although not shown in FIGS. 10-12, in some embodiments, the quantum dot device 200 may include one or more magnet lines such as the magnet line 121 described with reference to the quantum dot device 100.

As discussed above, the structure of the fin 104-1 may be the same as the structure of the fin 104-2; similarly, the construction of gates 106/108 on the fin 104-1 may be the same as the construction of gates 106/108 on the fin 104-2. The gates 106/108 on the fin 104-1 may be mirrored by corresponding gates 106/108 on the parallel fin 104-2, and the insulating material 130 may separate the gates 106/108 on the different fins 104-1 and 104-2. In particular, quantum dots 142 formed in the fin 104-1 (under the gates 106/108) may have counterpart quantum dots 142 in the fin 104-2 (under the corresponding gates 106/108). In some embodiments, the quantum dots 142 in the fin 104-1 may be used as "active" quantum dots in the sense that these quantum dots 142 act as qubits and are controlled (e.g., by voltages applied to the gates 106/108 of the fin 104-1) to perform quantum computations. The quantum dots 142 in the fin 104-2 may be used as "read" quantum dots in the sense that these quantum dots 142 may sense the quantum state of the quantum dots 142 in the fin 104-1 by detecting the electric field generated by the charge in the quantum dots 142 in the fin 104-1, and may convert the quantum state of the quantum dots 142 in the fin 104-1 into electrical signals that may be detected by the gates 106/108 on the fin 104-2. Each quantum dot 142 in the fin 104-1 may be read by its corresponding quantum dot 142 in the fin 104-2. Thus, the quantum dot device 200 enables both quantum computation and the ability to read the results of a quantum computation.

As discussed above, the base 102 and the fin 104 of a quantum dot device 200 may be formed from a semiconductor substrate 144 and a quantum well stack 146 disposed on the semiconductor substrate 144. The quantum well stack 146 may include a quantum well layer in which a 2DEG may form during operation of the quantum dot device 200. The quantum well stack 146 may take any of a number of forms, several of which were illustrated in FIGS. 5-7 and were discussed above, which descriptions are, therefore, not repeated here.

The semiconductor substrate 144 and the quantum well stack 146 may be distributed between the base 102 and the fins 104 of the quantum dot device 200, as discussed above. This distribution may occur in any of a number of ways. For example, FIGS. 13-19 illustrate example base/fin arrangements 158 that may be used in a quantum dot device 200, in accordance with various embodiments.

Figures 13, 14, 15:
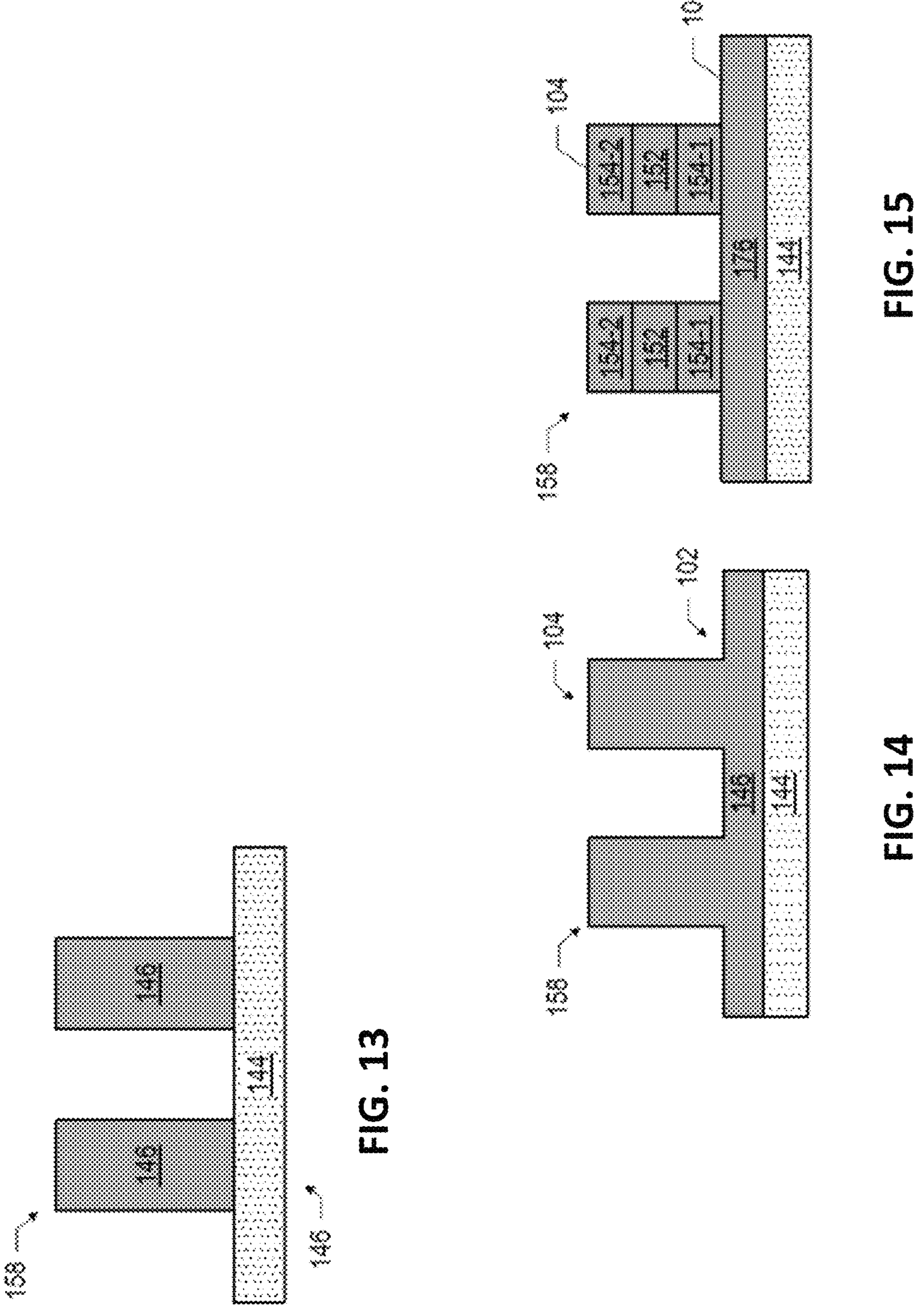
FIGS. 13-19 illustrate example base/fin arrangements that may be used in a quantum dot device with fins, in accordance with various embodiments.

In the base/fin arrangement 158 of FIG. 13, the quantum well stack 146 may be included in the fins 104, but not in the base 102. The semiconductor substrate 144 may be included in the base 102, but not in the fins 104. Manufacturing of the base/fin arrangement 158 of FIG. 13 may include fin etching through the quantum well stack 146, stopping when the semiconductor substrate 144 is reached.

In the base/fin arrangement 158 of FIG. 14, the quantum well stack 146 may be included in the fins 104, as well as in a portion of the base 102. A semiconductor substrate 144 may be included in the base 102 as well, but not in the fins 104. Manufacturing of the base/fin arrangement 158 of FIG. 14 may include fin etching that etches partially through the quantum well stack 146, and stops before the semiconductor substrate 144 is reached. FIG. 15 illustrates a particular embodiment of the base/fin arrangement 158 of FIG. 14. In the embodiment of FIG. 15, the quantum well stack 146 of FIG. 7 is used; the fins 104 include the barrier layer 154-1, the quantum well layer 152, and the barrier layer 154-2, while the base 102 includes the buffer layer 176 and the semiconductor substrate 144.

Figures 16, 17, 18, 19:
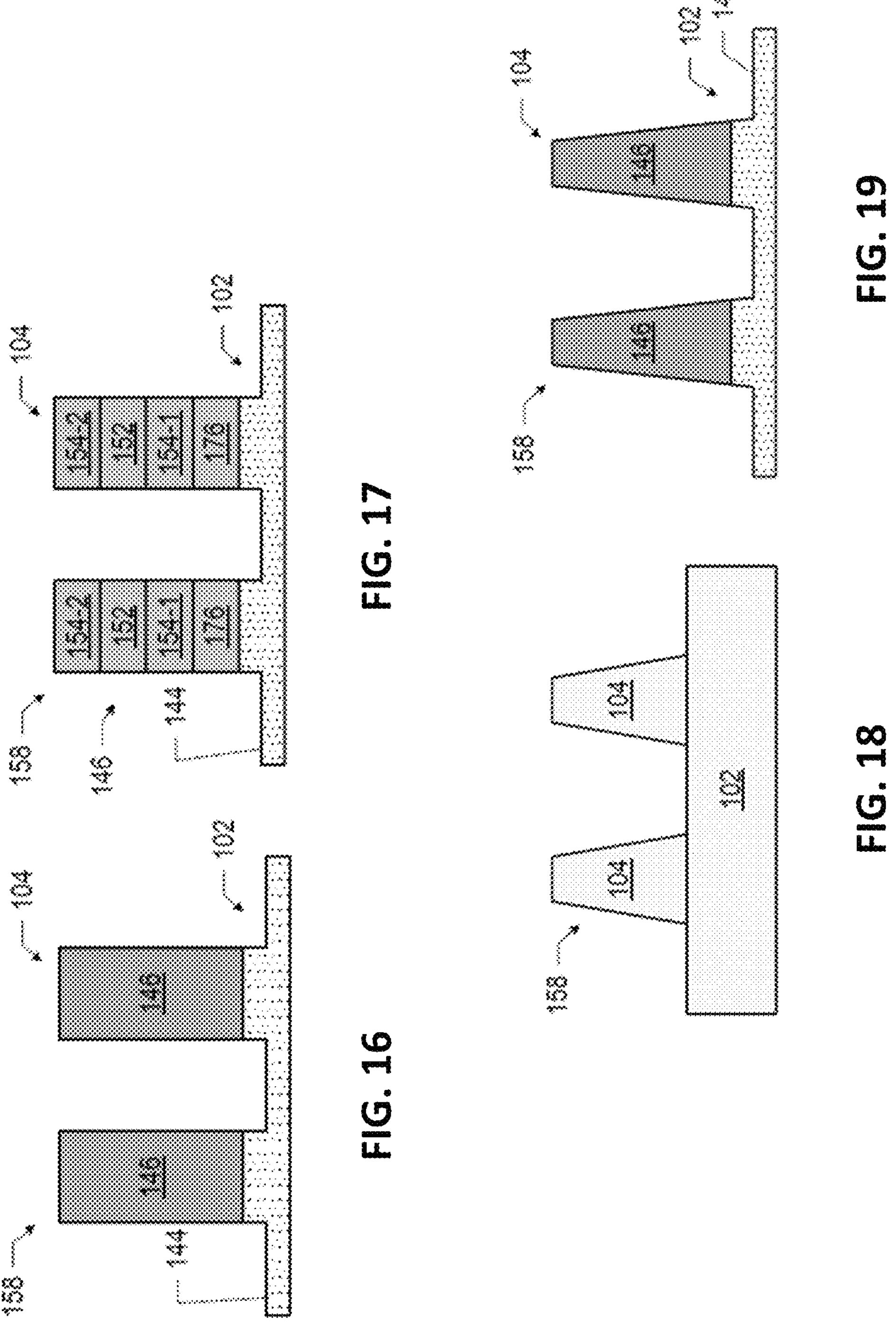

In the base/fin arrangement 158 of FIG. 16, the quantum well stack 146 may be included in the fins 104, but not the base 102. The semiconductor substrate 144 may be partially included in the fins 104, as well as in the base 102. Manufacturing the base/fin arrangement 158 of FIG. 16 may include fin etching that etches through the quantum well stack 146 and into the semiconductor substrate 144 before stopping. FIG. 17 illustrates a particular embodiment of the base/fin arrangement 158 of FIG. 16. In the embodiment of FIG. 17, the quantum well stack 146 of FIG. 7 is used; the fins 104 include the quantum well stack 146 and a portion of the semiconductor substrate 144, while the base 102 includes the remainder of the semiconductor substrate 144.

Although the fins 104 have been illustrated in many of the preceding figures as substantially rectangular with parallel sidewalls, this is simply for ease of illustration, and the fins 104 may have any suitable shape (e.g., shape appropriate to the manufacturing processes used to form the fins 104). For example, as illustrated in the base/fin arrangement 158 of FIG. 18, in some embodiments, the fins 104 may be tapered. In some embodiments, the fins 104 may taper by 3-10 nanometers in x-width for every 100 nanometers in z-height (e.g., 5 nanometers in x-width for every 100 nanometers in z-height). When the fins 104 are tapered, the wider end of the fins 104 may be the end closest to the base 102, as illustrated in FIG. 18. FIG. 19 illustrates a particular embodiment of the base/fin arrangement 158 of FIG. 18. In FIG. 19, the quantum well stack 146 is included in the tapered fins 104 while a portion of the semiconductor substrate 144 is included in the tapered fins and a portion of the semiconductor substrate 144 provides the base 102.

Example Gate Arrangements with Alternating Layouts and Screening Gates

Figure 20A:
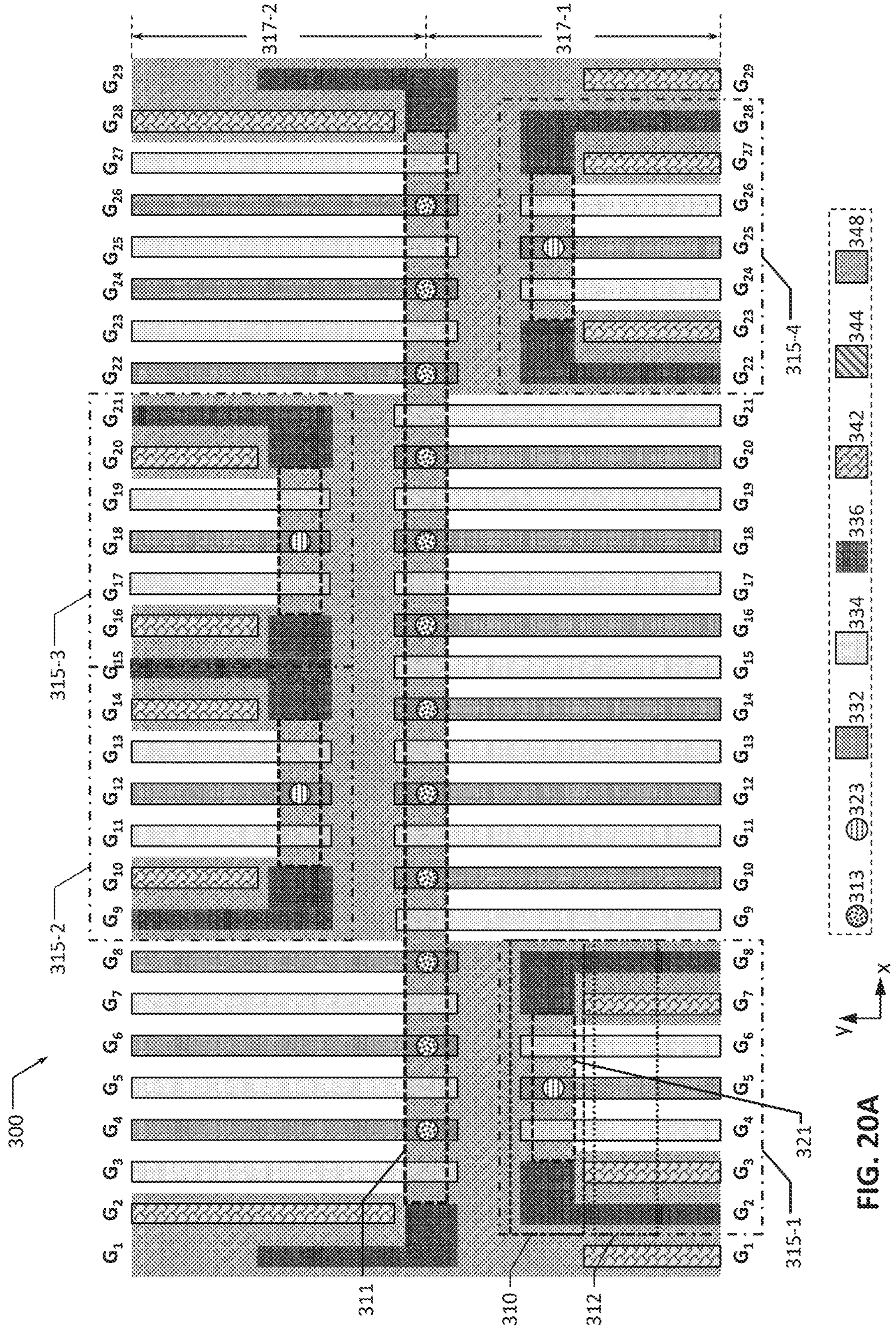
FIGS. 20A-20B are top-down views of a portion of different example quantum dot devices with alternating layouts and side screening gates, in accordance with various embodiments.
Figure 20B:
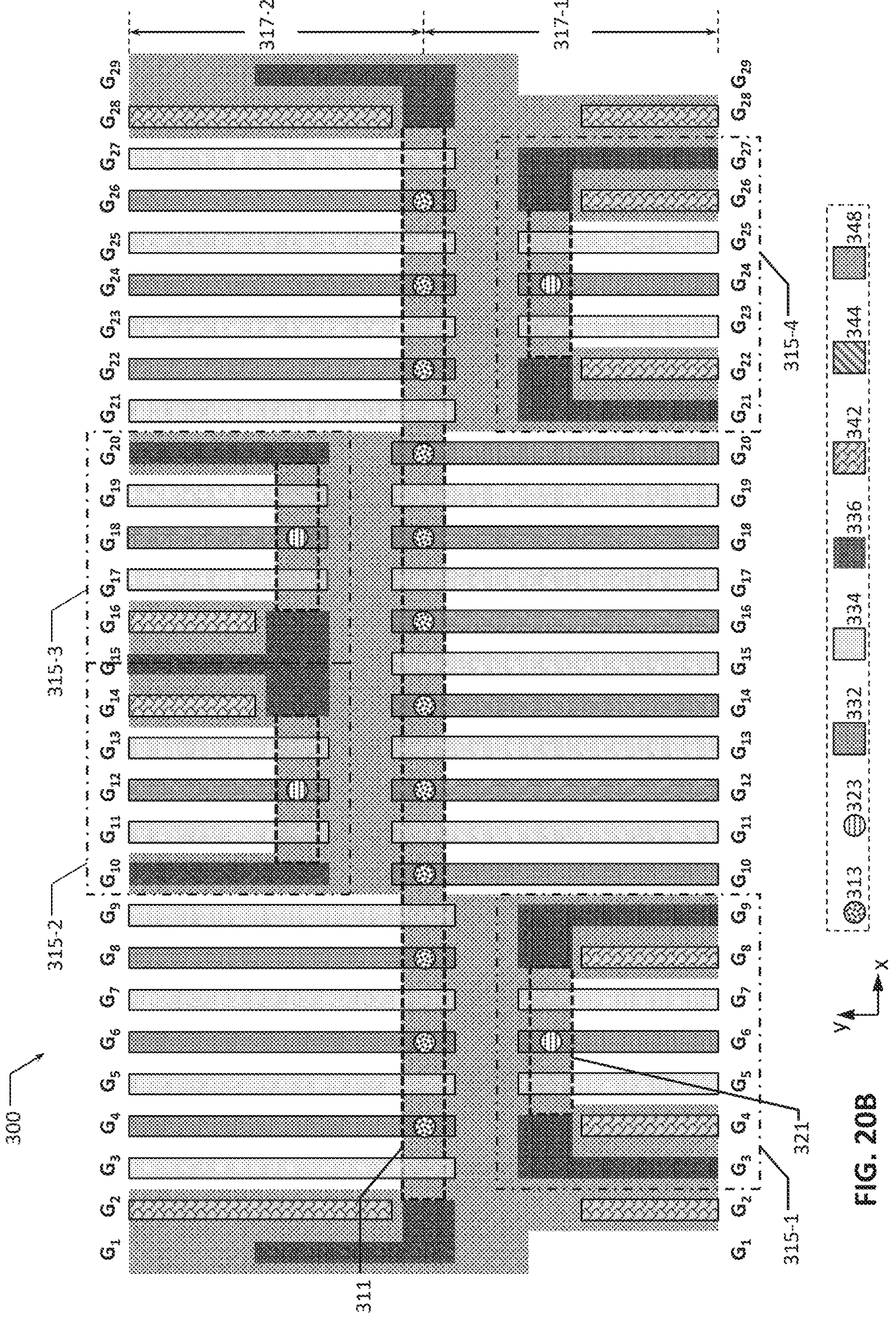

FIGS. 20A-20B are top-down views of a portion of different example quantum dot devices 300, which are examples of the quantum dot devices 100, 200, described above, but with alternating layouts and side screening gates, in accordance with various embodiments. The views of FIGS. 20A-20B are similar to the top-down views of FIGS. 4 and 12, except that they are shown for examples of quantum dot devices with more rows of quantum dot formation regions than the quantum dot formation regions 111 that were shown in FIGS. 4 and 12, and with different number of gates coupled to each of the quantum dot formation regions than what was shown in the examples of FIGS. 4 and 12.

In particular, FIG. 20 illustrates a quantum dot formation region 311 (e.g., a row) where, during operation, a plurality of quantum dots 313 may be formed. Furthermore, FIG. 20 also illustrates a plurality of read devices 315 (e.g., a plurality of SETs), each of which having a quantum dot formation region 321 (e.g., a row) where quantum dots 323 may be formed. Four of the read devices 315 are shown in FIG. 20, individually labeled with reference numerals 1, 2, 3, and 4 after the dash, although in other embodiments, a different number of read devices 315 may be deployed in the quantum dot device 300. In order to not clutter the drawing, only one of the quantum dot formation regions 321 is labeled in FIG. 20 with a reference numeral (the one of the read device 315-1, but analogous quantum dot formation regions 321 are shown within other read devices 315, indicated with a dashed rectangle within which the quantum dots 323 are illustrated). The quantum dot formation regions 311, 321 may be similar to the quantum dot formation regions 111, and the quantum dots 313, 323 may be similar to the quantum dots 142, described above. The quantum dots 313 may be active quantum dots 142, which may be used to perform quantum computing operations, and the quantum dots 323 may be read quantum dots 142, which may be used to detect quantum states of the quantum dots 313.

FIG. 20 further illustrates various gate lines, e.g., gate lines labeled as gate lines $G_1$-$G_{29}$ in the lower portion of FIG. 20, extending downwards from the row 311 in the top-down illustration of FIG. 20 (i.e., extending on the first side 317-1 of the row 311, described below, substantially perpendicular to the row 311 in the x-y view of FIG. 20), and gate lines labeled as gate lines $G_1$-$G_{29}$ in the upper portion of FIG. 20, extending upwards from the row 311 in the top-down illustration of FIG. 20 (i.e., extending on the second side 317-2 of the row 311, described below, substantially perpendicular to the row 311 in the x-y view of FIG. 20). In some embodiments, all of the gate lines G of the quantum dot device 300 may be substantially parallel to one another. In some embodiments, each of the gate lines G of the quantum dot device 300 may be coupled to a different (respective) signal source (e.g., a voltage source) and electrically isolated from one another, so that, in general, each of the gate lines may be controlled individually from the other lines. The notation of gate lines $G_1$-$G_{29}$ is used herein to provide some explanations with reference to individual gate lines of the quantum dot device 300.

Different gate lines G form different gates of the quantum dot device 300 in portions where gate metal of the gate lines G is in proximity to the quantum well stack 146 (e.g., with a gate dielectric 114 in between). As described above, how the gate metal of different gate lines may be in proximity to the quantum well stack 146 depends on whether a quantum dot device is a trench-based or a fin-based device. For the trench-based devices, said proximity is achieved by providing a layer of an insulating material with a trench extending through the insulating material to the quantum well stack, and by having a portion of the gate metal of the gate lines being provided in the trench, possibly with the gate dielectric 114 being at the bottom of the trench, at the interface between the gate metal in the trench and the quantum well stack 146. In such trench-based devices, the remainder of the gate metal of the gate lines extends above the trench, along the upper surface of that layer of the insulating material. For fin-based devices, said proximity is achieved by having a portion of the quantum well stack 146 being shaped as a fin that extends away from a base and extends towards the plane of the gate lines G so that portions of the gate lines may be over the fin, possibly with the gate dielectric 114 being at the top of the fin, at the interface between the gate metal crossing the fin and the quantum well stack 146 in the fin. The descriptions of the gates 106/108 provided with reference to FIGS. 1-19 are applicable to the gates provided by the gate lines G of the quantum dot device 300 and, therefore, in the interest of brevity, are not repeated, and the description of the gate lines G may focus on the differences from the descriptions provided above. In the present description, the terms "gate lines" and "gates" may be used interchangeably.

Similar to the quantum dot devices 100 and 200, the quantum dot device 300 may include gates of different types, such as plunger gates, barrier gates, and accumulation gates. Although these gates (and their corresponding gate lines G) may be implemented substantially similar to one another, in order to differentiate between the different functionality of these gates, FIG. 20 uses different patterns to show gate lines forming gates of different types. In particular, as shown within the legend at the bottom of FIG. 20, the quantum dot device 300 may include plunger gate lines 332, barrier gate lines 334, and accumulation gate lines 336. As used herein, the gate lines 332, 334, and 336 extending to the active quantum dot formation region 311 are referred to as "active" gate lines, while the gate lines 332, 334, and 336 extending to the read quantum dot formation regions 321 are referred to as "read" gate lines. As also shown within the legend at the bottom of FIG. 20, in some embodiments, the quantum dot device 300 may further include side screening gate lines 342 (which may also be referred to as isolation screening, or flanking, gates), and center screening gate lines 344. The legend at the bottom of FIG. 20 further illustrates that a pattern 348 may be used to illustrate a location and geometry of a trench/fin, depending on whether the quantum dot device 300 is implemented using trenches (e.g., as described with reference to FIGS. 1-4) or using fins (e.g., as described with reference to FIGS. 10-19). Portions of various gate lines of the quantum dot device 300 interfacing with portions of the quantum well stack 146, e.g., with a gate dielectric 114 in between, are where the gate lines form gates of the quantum dot device 300.

The legend illustrated at the bottom of FIG. 20 also shows different patterns used to show active quantum dots 313 and read quantum dots 323 that may be formed during operation of the quantum dot device 300.

FIG. 20 illustrates an embodiment where a single trench/fin of the pattern 348 may be continuous across various portions of the quantum dot device 300. For trench embodiments of the quantum dot device 300, the pattern 348 represents a trench, similar to the trench 103, described above. For fin embodiments of the quantum dot device 300, the pattern 348 represents a fin, similar to the fin 104, described above.

Besides schematically illustrating the various gates and various quantum dot formation regions 311, 321, the views of FIG. 20 do not show various materials or other elements shown in the views of FIGS. 4 and 12 in order to not clutter the drawing. However, any of the quantum dot devices 300, shown in FIGS. 20A-20B may be implemented as the quantum dot device 100, shown in FIGS. 1-4, or the quantum dot device 200, shown in FIGS. 10-12, except for the differences described herein.

Turning to the details of the gate arrangement shown in FIG. 20A, FIG. 20A illustrates that, in stark contrast to conventional implementations where only a single read device, with a single quantum dot formation region 321, was used to detect quantum states of a plurality of active quantum dots 313, the quantum dot device 300 includes a plurality of read devices 315, where different read devices 315 may be used to detect quantum states of a different subset of active quantum dots 313. Furthermore, FIG. 20A also illustrates an alternating layout in that, with respect to the active row of the quantum dot formation region 311, some read devices 315 may be provided on one side of the row, while other read devices 315 may be provided on the other side of the row. For example, everything shown in the top-down view of FIG. 20A below the row 311 may be considered to be a first side 317-1 of the row 311, while everything shown above the row 311 may be considered to be a second side 317-2 of the row 311. The example of FIG. 20A illustrates that the read devices 315-1 and 315-4 may be provided on the first side 317-1 of the row 311, while the read devices 315-2 and 315-3 may be provided on the second side 317-2 of the row 311.

Different read devices 315 of the quantum dot device 300 may be configured to detect quantum states of the quantum dots 313 formed in different portions of the row 311. For example, as shown in FIG. 20A, a first read device 315-1 may be proximate a first portion of the row 311, which may be a portion where active plunger gates are formed by gate lines $G_4$, $G_6$, and $G_8$ extending to the quantum dot formation region 311 (i.e., a first set of active plunger gate lines 332, coupled to a first portion of the quantum dot formation region 311), and where active barrier gates are formed by gate lines $G_3$, $G_5$, and $G_7$ extending to the quantum dot formation region 311 (i.e., a first set of active barrier gate lines 334, coupled to the first portion of the quantum dot formation region 311). The first read device 315-1 may include a read plunger gate formed by the gate line $G_5$ extending to the quantum dot formation region 321 of the first read device 315-1 (i.e., a read plunger gate line 332 coupled to the quantum dot formation region 321 of the first read device 315-1), and read barrier gates formed by the gate lines $G_4$ and $G_6$ extending to the quantum dot formation region 321 of the first read device 315-1 (i.e., read barrier gate lines 334 coupled to the quantum dot formation region 321 of the first read device 315-1). As a result, the read quantum dot 323 formed under the plunger gate formed by the read gate line $G_5$ may be used to detect quantum states of the active quantum dots 313 formed under the plunger gates formed by the active gate lines $G_4$, $G_6$, and $G_8$.

Similarly, as further shown in FIG. 20A, a second read device 315-2 may be proximate a second portion of the row 311, which may be a portion where active plunger gates are formed by gate lines $G_{10}$, $G_{12}$, and $G_{14}$ extending to the quantum dot formation region 311 (i.e., a second set of active plunger gate lines 332, coupled to a second portion of the quantum dot formation region 311), and where active barrier gates are formed by gate lines $G_9$, $G_{11}$, $G_{13}$, and $G_{15}$ extending to the quantum dot formation region 311 (i.e., a second set of active barrier gate lines 334, coupled to the second portion of the quantum dot formation region 311). The second read device 315-2 may include a read plunger gate formed by the gate line $G_{12}$ extending to the quantum dot formation region 321 of the second read device 315-2 (i.e., a read plunger gate line 332 coupled to the quantum dot formation region 321 of the second read device 315-2), and read barrier gates formed by the gate lines $G_{11}$ and $G_{13}$ extending to the quantum dot formation region 321 of the second read device 315-2 (i.e., read barrier gate lines 334 coupled to the quantum dot formation region 321 of the read device 315-2). As a result, the read quantum dot 323 formed under the plunger gate formed by the read gate line $G_{12}$ may be used to detect quantum states of the active quantum dots 313 formed under the plunger gates formed by the active gate lines $G_{10}$, $G_{12}$, and $G_{14}$.

As also shown in FIG. 20A, a third read device 315-3 may be proximate a third portion of the row 311, which may be a portion where active plunger gates are formed by gate lines $G_{16}$, $G_{18}$, and $G_{20}$ extending to the quantum dot formation region 311 (i.e., a third set of active plunger gate lines 332, coupled to a third portion of the quantum dot formation region 311), and where active barrier gates are formed by gate lines $G_{15}$, $G_{17}$, $G_{19}$, and $G_{21}$ extending to the quantum dot formation region 311 (i.e., a third set of active barrier gate lines 334, coupled to the third portion of the quantum dot formation region 311). The third read device 315-3 may include a read plunger gate formed by the gate line $G_{18}$ extending to the quantum dot formation region 321 of the third read device 315-3 (i.e., a read plunger gate line 332 coupled to the quantum dot formation region 321 of the third read device 315-3), and read barrier gates formed by the gate lines $G_{17}$ and $G_{19}$ extending to the quantum dot formation region 321 of the third read device 315-3 (i.e., read barrier gate lines 334 coupled to the quantum dot formation region 321 of the read device 315-3). As a result, the read quantum dot 323 formed under the plunger gate formed by the read gate line $G_{18}$ may be used to detect quantum states of the active quantum dots 313 formed under the plunger gates formed by the active gate lines $G_{16}$, $G_{18}$, and $G_{20}$.

Finally, a fourth read device 315-4, shown in FIG. 20A, may be proximate a fourth portion of the row 311, which may be a portion where active plunger gates are formed by gate lines $G_{22}$, $G_{24}$, and $G_{26}$ extending to the quantum dot formation region 311 (i.e., a fourth set of active plunger gate lines 332, coupled to a fourth portion of the quantum dot formation region 311), and where active barrier gates are formed by gate lines $G_{23}$, $G_{25}$, and $G_{27}$ extending to the quantum dot formation region 311 (i.e., a fourth set of active barrier gate lines 334, coupled to the fourth portion of the quantum dot formation region 311). The fourth read device 315-4 may include a read plunger gate formed by the gate line $G_{25}$ extending to the quantum dot formation region 321 of the fourth read device 315-4 (i.e., a read plunger gate line 332 coupled to the quantum dot formation region 321 of the fourth read device 315-4), and read barrier gates formed by the gate lines $G_{24}$ and $G_{26}$ extending to the quantum dot formation region 321 of the fourth read device 315-4 (i.e., read barrier gate lines 334 coupled to the quantum dot formation region 321 of the read device 315-4). As a result, the read quantum dot 323 formed under the plunger gate formed by the read gate line $G_{25}$ may be used to detect quantum states of the active quantum dots 313 formed under the plunger gates formed by the active gate lines $G_{22}$, $G_{24}$, and $G_{26}$.

As can be seen in FIG. 20A, when read devices 315 are formed on different sides 317 of the active row 311, various plunger and barrier gate lines may be oriented to extend away from the row 311 in different sides 317. For example, when the first read device 315-1 is on the first side 317-1 of the row 311, various gate lines coupled to the first read device 315-1 may start at the quantum dot formation region 321 of the first read device 315-1 and extend away from the row 311 (e.g., be oriented substantially perpendicular to the row 311) on the first side 317-1 of the row 311. Various active gate lines coupled to a portion of the row 311 that corresponds to (i.e., to be read by) the first read device 315-1 may start at the quantum dot formation region 311 and extend away from the first read device 315-1 (e.g., be oriented substantially perpendicular to the row 311) on the second side 317-2 of the row 311. In another example, when the second read device 315-2 is on the second side 317-2 of the row 311, various gate lines coupled to the second read device 315-2 may start at the quantum dot formation region 321 of the second read device 315-2 and extend away from the row 311 (e.g., be oriented substantially perpendicular to the row 311) on the second side 317-2 of the row 311. Various active gate lines coupled to a portion of the row 311 that corresponds to (i.e., to be read by) the second read device 315-2 may start at the quantum dot formation region 311 and extend away from the second read device 315-2 (e.g., be oriented substantially perpendicular to the row 311) on the first side 317-1 of the row 311. Such alternating layouts of the read devices 315 (i.e., providing read devices 315 associated with the active row 311 on different sides of the row 311) may be advantageous in terms of patterning and processing (e.g., may provide a more uniform distribution of features in the quantum dot device 300).

Also shown in FIG. 20A is that each read device 315 may include a pair of accumulation gates coupled to either side of the quantum dot formation region 321. For example, as shown in FIG. 20A, the first read device 315-1 may include a first accumulation gate formed by a read accumulation gate line $G_2$, coupled to one end of the quantum dot formation region 321 of the first read device 315-1, and may further include a second accumulation gate formed by a read accumulation gate line $G_8$, coupled to the other end of the quantum dot formation region 321 of the first read device 315-1; and the second read device 315-2 may include a first accumulation gate formed by a read accumulation gate line $G_9$, coupled to one end of the quantum dot formation region 321 of the second read device 315-2, and may further include a second accumulation gate formed by a read accumulation gate line $G_{15}$, coupled to the other end of the quantum dot formation region 321 of the second read device 315-2. FIG. 20A illustrates that, in some embodiments, a single accumulation gate line may be shared between two read devices 315 on the same side 317 of the row 311. For example, as shown in FIG. 20A, the third read device 315-3 may include a first accumulation gate formed by a read accumulation gate line $G_{15}$, coupled to one end of the quantum dot formation region 321 of the third read device 315-3, and may further include a second accumulation gate formed by a read accumulation gate line $G_{21}$, coupled to the other end of the quantum dot formation region 321 of the third read device 315-3. Thus, the accumulation gate formed by the read accumulation gate line $G_{15}$ may be shared between the first read device 315-2 and 315-3. FIG. 20A further illustrates that the fourth read device 315-4 may include a first accumulation gate formed by a read accumulation gate line $G_{22}$, coupled to one end of the quantum dot formation region 321 of the fourth read device 315-4, and may further include a second accumulation gate formed by a read accumulation gate line $G_{28}$, coupled to the other end of the quantum dot formation region 321 of the fourth read device 315-4. Thus, first and second read accumulation gate lines may be provided on either side of the read quantum dot formation region 321 of a given read device 315. Similarly, first and second read accumulation gate lines may be provided on either side of the active quantum dot formation region 311 (e.g., as shown in FIG. 20A, a first active accumulation gate may be formed by an active accumulation gate line $G_1$, coupled to one end of the quantum dot formation region 311, and a second active accumulation gate formed by an active accumulation gate line $G_{29}$ on the other end of the quantum dot formation region 311).

Thus, multiple read devices (e.g., multiple SETs), with their respective sets of read accumulation gates, may be used to detect quantum states of the quantum dots 313 of the row 311. Furthermore, the association between the read quantum dots 323 and the active quantum dots 313 in the quantum dot device 300 may be different than that in the quantum dot device 100. For example, the quantum dot 323 of the first read device 315-1 of the quantum dot device 300 (i.e., the quantum dot 323 under the read plunger gate formed by the read plunger gate line $G_5$ in the illustration of FIG. 20A) may be used as a read quantum dot not only for a single active quantum dot 313 closest to it, but for a group of plurality of active quantum dots 313 that may include, e.g., three quantum dots under, respectively, active plunger gates $G_4$, $G_6$, and $G_8$. Thus, the quantum dot 323 of the first read device 315-1 of the quantum dot device 300 may be used as a read quantum dot in the sense that this quantum dot 323 of the first read device 315-1 may sense the quantum state of the quantum dots 313 under the active plunger gates $G_4$, $G_6$, and $G_8$ in the row 311 by detecting the electric field generated by the charge(s) of these active quantum dots 313, and may convert the quantum state of the quantum dots 313 under the active plunger gates $G_4$, $G_6$, and $G_8$ in the row 311 into electrical signals that may be detected by the first read device 315-1. Analogous applies to reading of the states of other subsets of the active quantum dots 313 in the row 311. In this manner, the quantum dot device 300 enables both quantum computation and the ability to read the results of a quantum computation.

Similar to how it was described above for the outermost gates 106-1 and 106-3 of the embodiment illustrated in FIG. 2, FIG. 20A illustrates that, in some embodiments, the active accumulation gates and the read accumulation gates may have a greater length (a dimension measured along the x-axis of FIG. 20A) than the inner active gates and the inner passive gates of the quantum dot device 300. The inner active gates for the quantum dot device 300 are all of the barrier and plunger gates between the outmost accumulation gates formed by the active accumulation gate lines $G_1$ and $G_{29}$. Similar to how it was described above for the outermost gates 106-1 and 106-3 of the embodiment illustrated in FIG. 2, the active accumulation gates of the quantum dot device 300 may be adjacent to respective doped regions 140 (not specifically shown in FIG. 20A in order to not clutter the drawing) at the opposite ends of the row 311. In other words, the active accumulation gates of the quantum dot device 300 may be over respective portions of the quantum well stack 146 adjacent to respective doped regions 140. The same applies to the read accumulation gates of the quantum dot device 300: for each of the read devices 315, they are the outermost gates, and may be adjacent to respective doped regions 140 (also not specifically shown in FIG. 20A in order to not clutter the drawing), and may have a greater length than at least some of the inner read gates of the read devices 315 of the quantum dot device 300.

FIG. 20A further illustrates that, in some embodiments, for each of the read devices 315, a side screening gate line 342 may be provided on the internal side of one or both of the read accumulation gate lines of that read device 315), where a side of a read accumulation gate line is referred to as "internal" if the side faces the read plunger gate line of the read device 315. Although not specifically shown in FIG. 20A, in some embodiments of the quantum dot device 300, side screening gate lines 342 may be provided on both internal sides and external sides of at least some of the active or read accumulation gate lines 336. As shown in FIG. 20A, in some embodiments, all of the gate lines of the quantum dot device 300 may be substantially parallel to one another, but provided on different sides of the row 311, as described herein. When an alternating layout of the different read devices 315 is implemented, the read accumulation gate lines 336 of various read devices 315, and their associated side screening gate lines 342 may be provided on the same side 317 where the read plunger gate lines 332 and read barrier gate lines 334 of those read devices 315 are provided, as shown in FIG. 20A.

For trench implementations of the quantum dot devices 300, the side screening gate lines 342 may be provided within a single trench with the associated accumulation gate lines 336, both extending to the bottom of the trench (e.g., the trench following the pattern 348, as shown in FIG. 20A). Thus, gate metal of the side screening gate lines 342 of the quantum dot device 300 may be at least partially within the respective trench of the pattern 348. Further details of the various gate lines of the quantum dot device 300 are provided by FIGS. 21A-21B, illustrating cross-sectional views of a portion of an example quantum dot device with trenches (e.g., the quantum dot device 300 with the trenches following the pattern 348 of FIG. 20A), with a cross-section of FIG. 21A taken along a portion of the trench defining a quantum dot formation region and a cross-section of FIG. 21B taken across side screening gate lines 342, in accordance with various embodiments. In particular, FIG. 21A illustrates a cross-sectional side view corresponding to the middle (in the y-axis direction) of a portion 310 of FIG. 20A, while FIG. 21B illustrates a cross-sectional side view corresponding to the middle of a portion 312 of FIG. 20A.

As shown in FIG. 21A, along the trench defined by the pattern 348 as shown in FIG. 20A, the read accumulation gate formed by the read accumulation gate lines $G_2$ and $G_8$ may be wider than each of the plunger gate formed by the read plunger gate line $G_5$, and the barrier gates formed by the read barrier gate lines $G_4$ and $G_6$. As also shown in FIG. 21A, within the trench defined by the pattern 348, gate metals of each of the read gates formed by the read gate lines $G_2$, $G_4$, $G_5$, $G_6$, and $G_8$ may extend down to the quantum well stack 146, possibly with a gate dielectric 114 between the bottoms of these gates in the trench and the quantum well stack 146. Similar to the illustrations of the quantum dot device 100 shown in FIGS. 1-4, portions of the gate metals of the read gates formed by the read gate lines $G_2$, $G_4$, $G_5$, $G_6$, and $G_8$ within the trench may be at least partially enclosed with an insulating material 128 (i.e., the trench defined by the pattern 348 is a trench within the insulating material 128), disposed above the quantum well stack 146. Furthermore, the intervening insulating material 130 may provide electrical isolation between various gate lines, e.g., between each pair of the adjacent ones of the read gate lines $G_2$, $G_4$, $G_5$, $G_6$, and $G_8$, similar to how it was described above with reference to FIGS. 1 and 3. Although not specifically shown in FIG. 21 in order to not clutter the drawings, spacers 134, described above, may also be present and help provide electrical isolation between various gates within a single trench, e.g., to provide electrical isolation between the read gates of the read device 315-1 formed by the read gate lines $G_2$, $G_4$, $G_5$, $G_6$, and $G_8$.

The cross-sectional side view of FIG. 21A does not show any of the side screening gate lines 342 because they do not reach and do not extend into the portion of the trench where the read gates formed by the read gate lines $G_2$, $G_4$, $G_5$, $G_6$, and $G_8$ are. Such side screening gate lines are, however, shown in the cross-sectional side view of FIG. 21B. As shown in FIG. 21B, outside of the trench defining the quantum dot formation region 321 of the read device 315-1, gate metals of various barrier and plunger gate lines do not extend down to the quantum well stack 146, but, rather, are isolated from the quantum well stack 146 by the intervening isolation material 130. In contrast, gate metals of the read accumulation gate lines $G_2$, $G_8$, and of the corresponding internal side screening gate lines $G_3$, $G_7$, may extend down to the quantum well stack 146, enclosed by the insulating material 128 within the trench. FIG. 21B further illustrates that the intervening isolation material 130 also provides electrical isolation between gate metals of various gate lines above the trench, similar to how it is described for FIG. 21A.

Various side screening gate lines may be electrically isolated from their respective accumulation gate lines and other gate lines of the device 300, e.g., as shown in FIGS. 21A-21B. That can also be seen in FIG. 20A in that the side screening gate lines do not overlap with the read accumulation gate lines or other gate lines, or with the rows of the quantum dot formation regions 321, 311. Various side screening gate lines of the quantum dot device 300 may be coupled to one or more DC sources (e.g., voltage sources). Applying DC signals (e.g., DC voltages) to the side screening gate lines may help with improving the electrostatics so that every accumulation region (i.e., a portion of the quantum well stack 146 under read accumulation gate within a respective the trench 103) is electrically isolated from other accumulation regions. In this manner, multiple SET detectors (or, simply, SETs) may be formed in the quantum dot device 300. For example, the read accumulation gate formed by the read accumulation gate line $G_2$ may be a first source or drain (S/D) terminal and the read accumulation gate formed by the read accumulation gate line $G_8$ may be a second S/D terminal of a first SET (i.e., of the first read device 315-1), the read accumulation gate formed by the read accumulation gate line $G_9$ of the quantum dot device 300 shown in FIG. 20A may serve as a first S/D terminal and the read accumulation gate formed by the read accumulation gate line $G_{15}$ of the quantum dot device 300 shown in FIG. 20A may serve as a second S/D terminal of a second SET (i.e., of the second read device 315-2), and so on. Furthermore, at least some of the different read devices 315 on one side 317 of the row 311 may share one of their S/D terminals. For example, the read accumulation gate formed by the read accumulation gate line $G_{15}$ of the quantum dot device 300 shown in FIG. 20A may serve as a S/D terminal shared between the read device 315-2 and the read device 315-3. Employing different SETs to detect quantum states of the quantum dots 313 formed along different portions of the quantum dot formation region 311 may increase flexibility for independent qubit readout in the quantum dot device 300.

Various embodiments of the quantum dot device 300 may be described herein with reference to the trench embodiments as those described with reference to the quantum dot device 100 of FIGS. 1-4. However, descriptions provided with respect to the quantum dot device 300 are equally applicable to the fin embodiments as those described with reference to the quantum dot device 200 of FIGS. 10-12. FIGS. 22A-22B are cross-sectional views of a portion of an example quantum dot device 300 similar to the cross-sectional views of FIGS. 21A-21B, but if the pattern 348 of the portions 310 and 312 of FIG. 20A represents fins, such as a fin 104, described above, instead of trenches 103, as were shown in FIGS. 21A-21B. As further shown in FIG. 22, the fin 104 below the read accumulation gate line $G_2$ and the side screening gate line $G_3$ may be separated from the fin 104 below the read accumulation gate line $G_8$ and the side screening gate line $G_7$ by the isolation material 188, as described above, while the bottoms of the read plunger and barrier gate lines $G_4$-$G_6$ may be aligned with the top of the fins 104, and, above the fins 104, various gates may be enclosed by the insulating material 130, described above. The intervening isolation material 130 provides electrical isolation between gate metals of various gates, e.g., between the read accumulation gate and the adjacent barrier and plunger gates. Thus, for the embodiments of the quantum dot device 300 with fins, various side screening gates may be electrically isolated from their respective accumulation gates and other gates of the device 300, e.g., as shown in FIGS. 22A-22B.

FIG. 20B illustrates a further variation of the quantum dot device 300 as described above. Comparison of FIG. 20A and FIG. 20B reveals that they are similar to one another and, therefore, even though some elements labeled in FIG. 20A may not be labeled in FIG. 20B in order to not clutter the drawings, descriptions provided with reference to the quantum dot device 300 of FIG. 20A are applicable to FIG. 20B except for the differences described below.

FIG. 20B illustrates an embodiment of the quantum dot device 300 where some of the side screening gate lines 342 associated with some of the read accumulation gate lines 336 may be omitted, which may allow aligning the read quantum dots 323 with some of the active quantum dots 313. Such an alignment may enable a more symmetric structure, and easier detection of the quantum states of the active quantum dots 313 (symmetry may be advantageous for sensing and sensitivity). For example, as shown in FIG. 20B, in some embodiments, for the read device 315-1, the read quantum dot 323 under the gate formed by the read plunger gate line $G_6$ may be used to detect quantum states of the active quantum dot 313 under the gates formed by the active plunger gate lines $G_4$, $G_6$, and $G_8$ (i.e., the quantum dot 323 under the gate formed by the read gate line $G_6$ is aligned with the quantum dot 313 under the gate formed by the active gate line $G_6$); for the read device 315-2, the read quantum dot 323 under the gate formed by the read plunger gate line $G_{12}$ may be used to detect quantum states of the active quantum dot 313 under the gates formed by the active plunger gate lines $G_{10}$, $G_{12}$, and $G_{14}$ (i.e., the quantum dot 323 under the gate formed by the read gate line $G_{12}$ is aligned with the quantum dot 313 under the gate formed by the active gate line $G_{12}$); and so on.

Figure 23A:
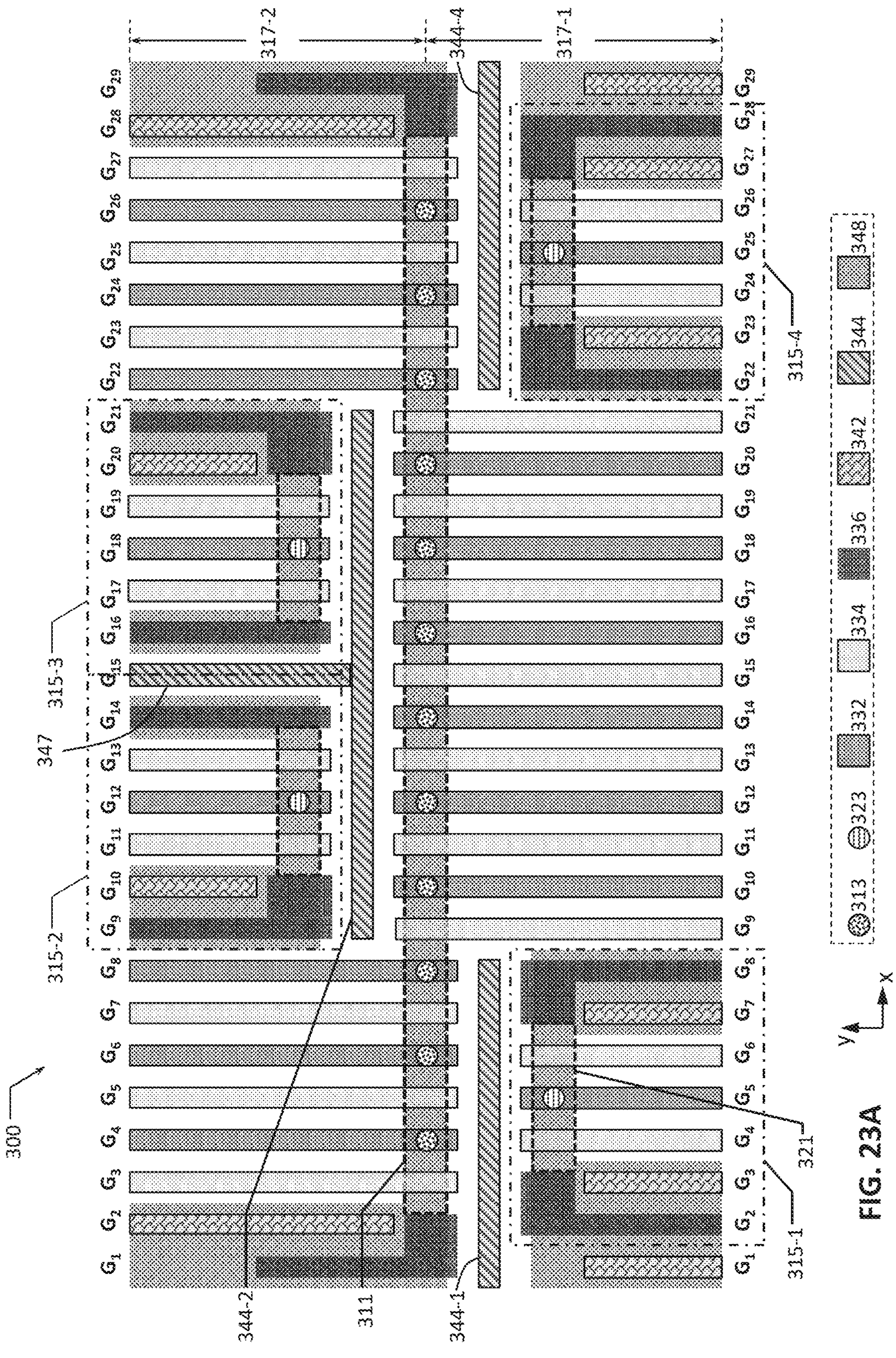
FIGS. 23A-23J are top-down views of a portion of different example quantum dot devices with alternating layouts and side and central screening gates, in accordance with various embodiments.
Figure 23B:
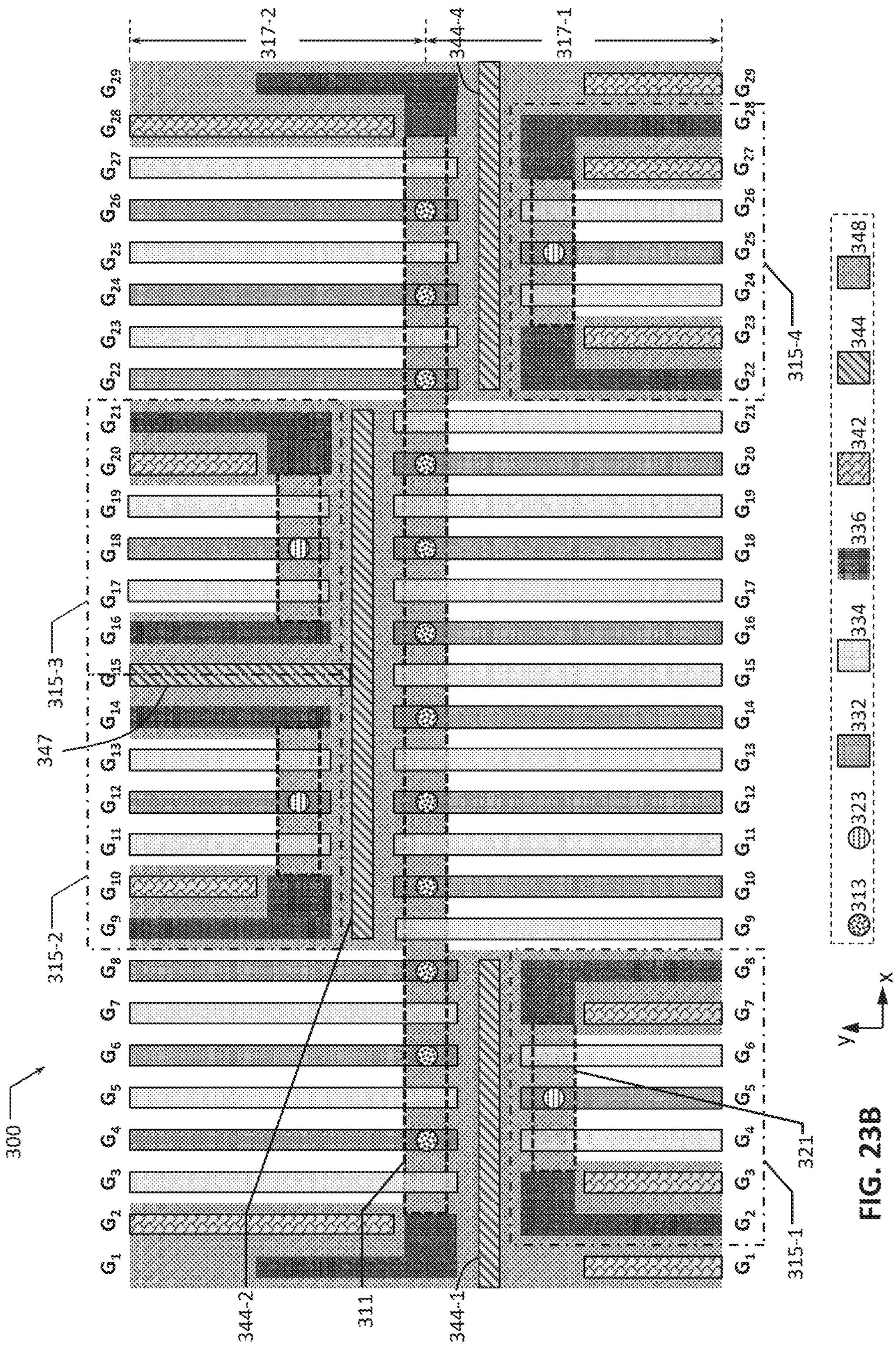
Figure 23C:
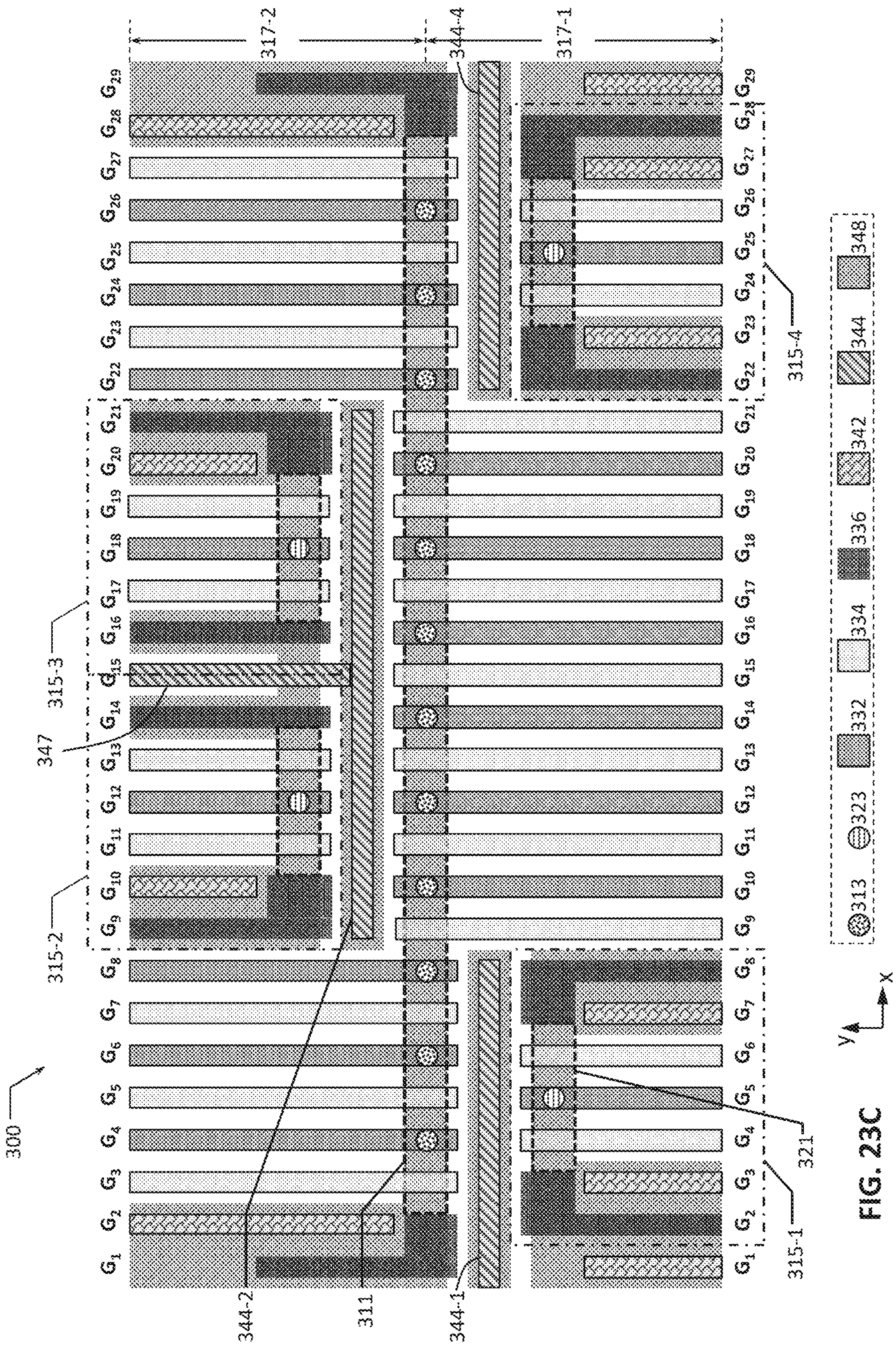
Figure 23D:
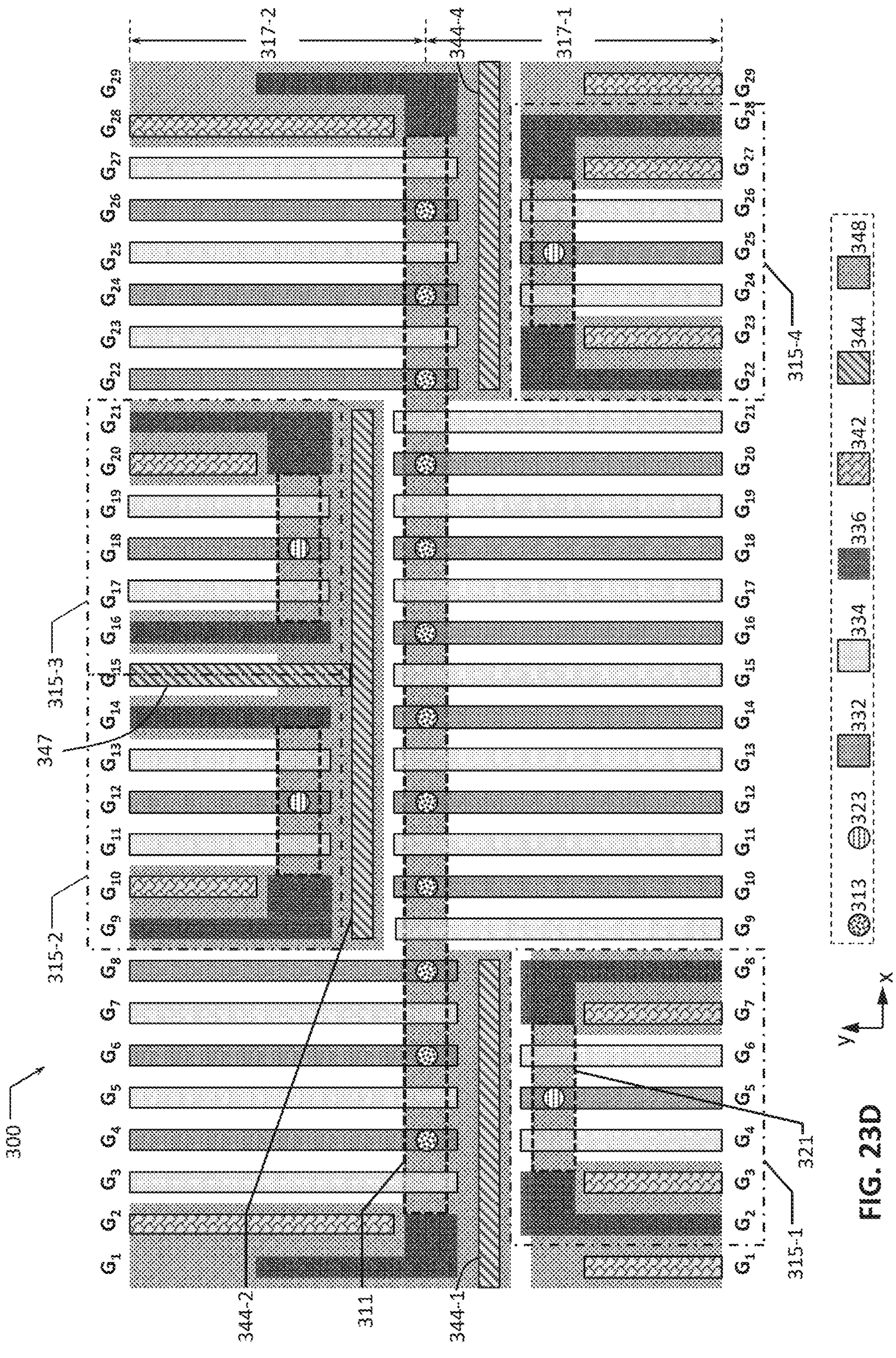
Figure 23E:
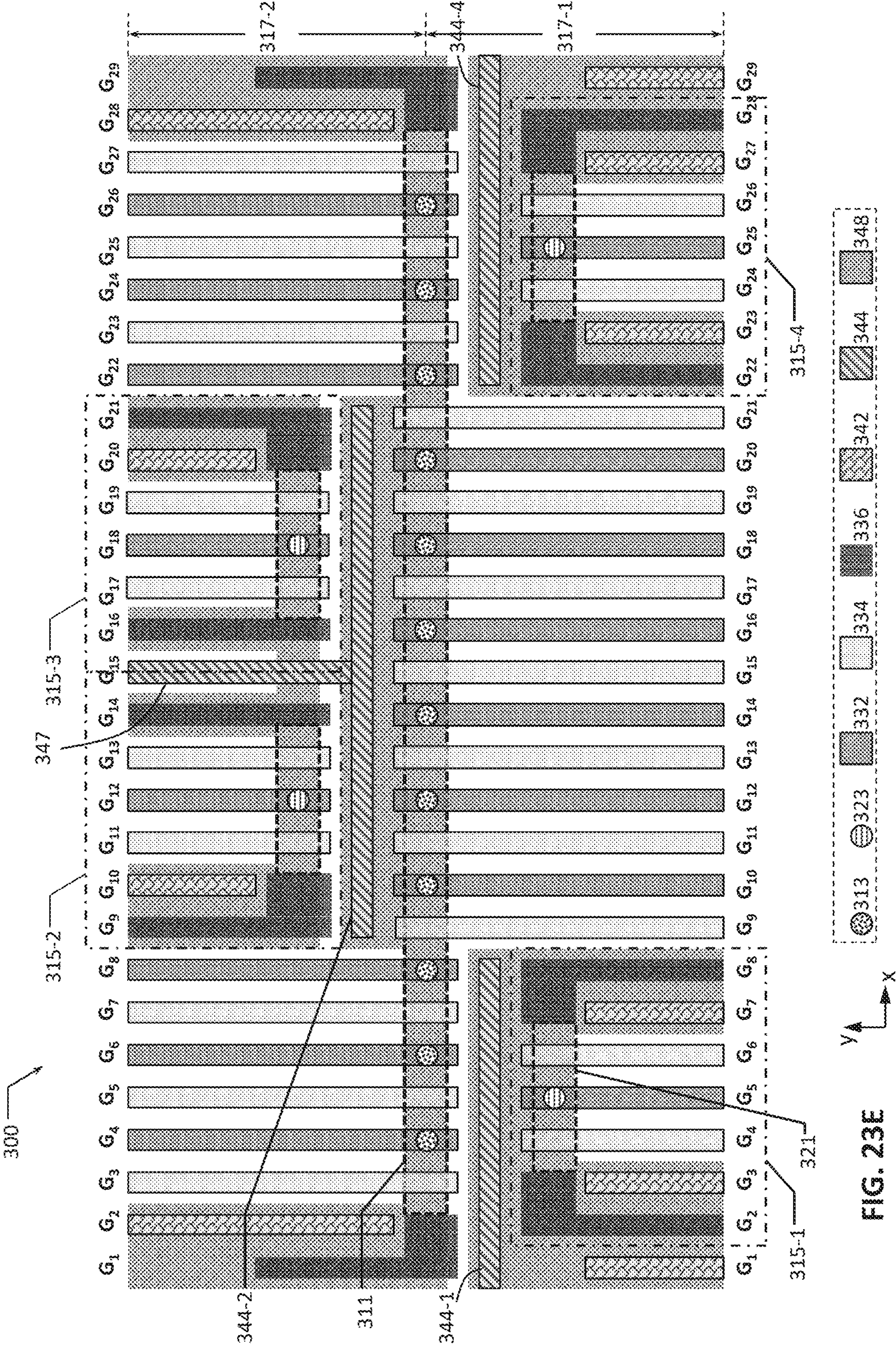
Figure 23F:
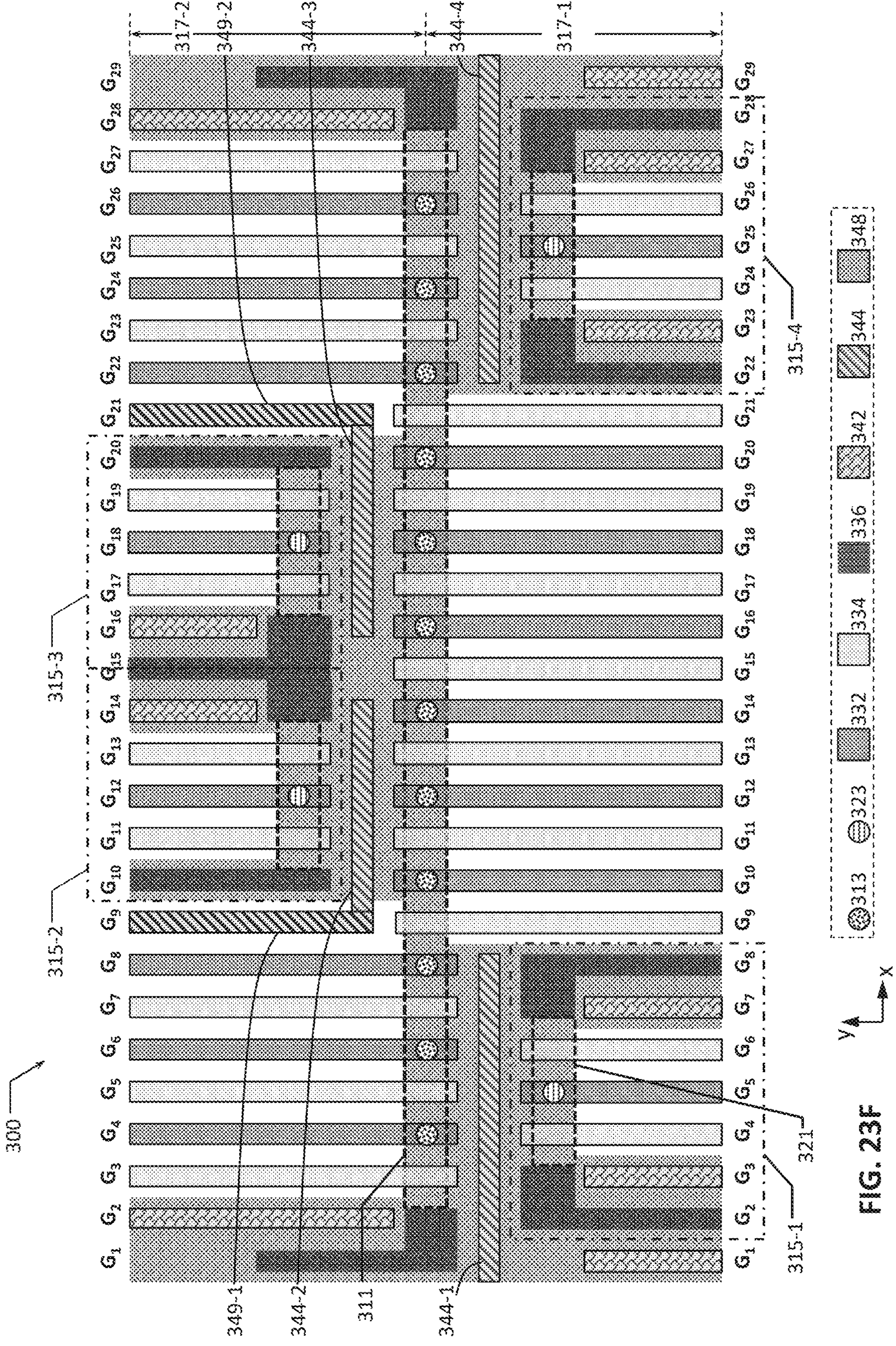
Figure 23G:
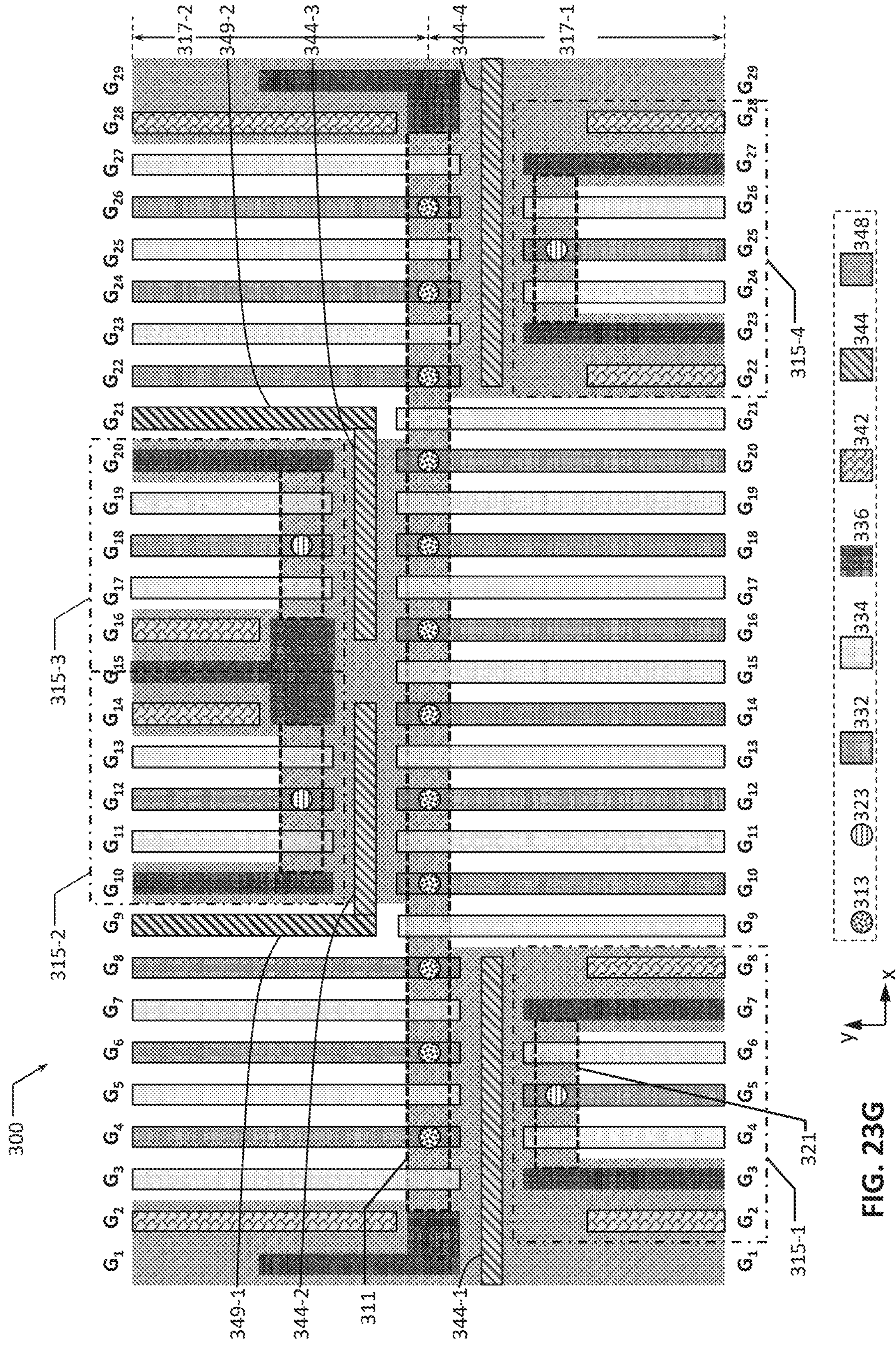
Figure 23H:
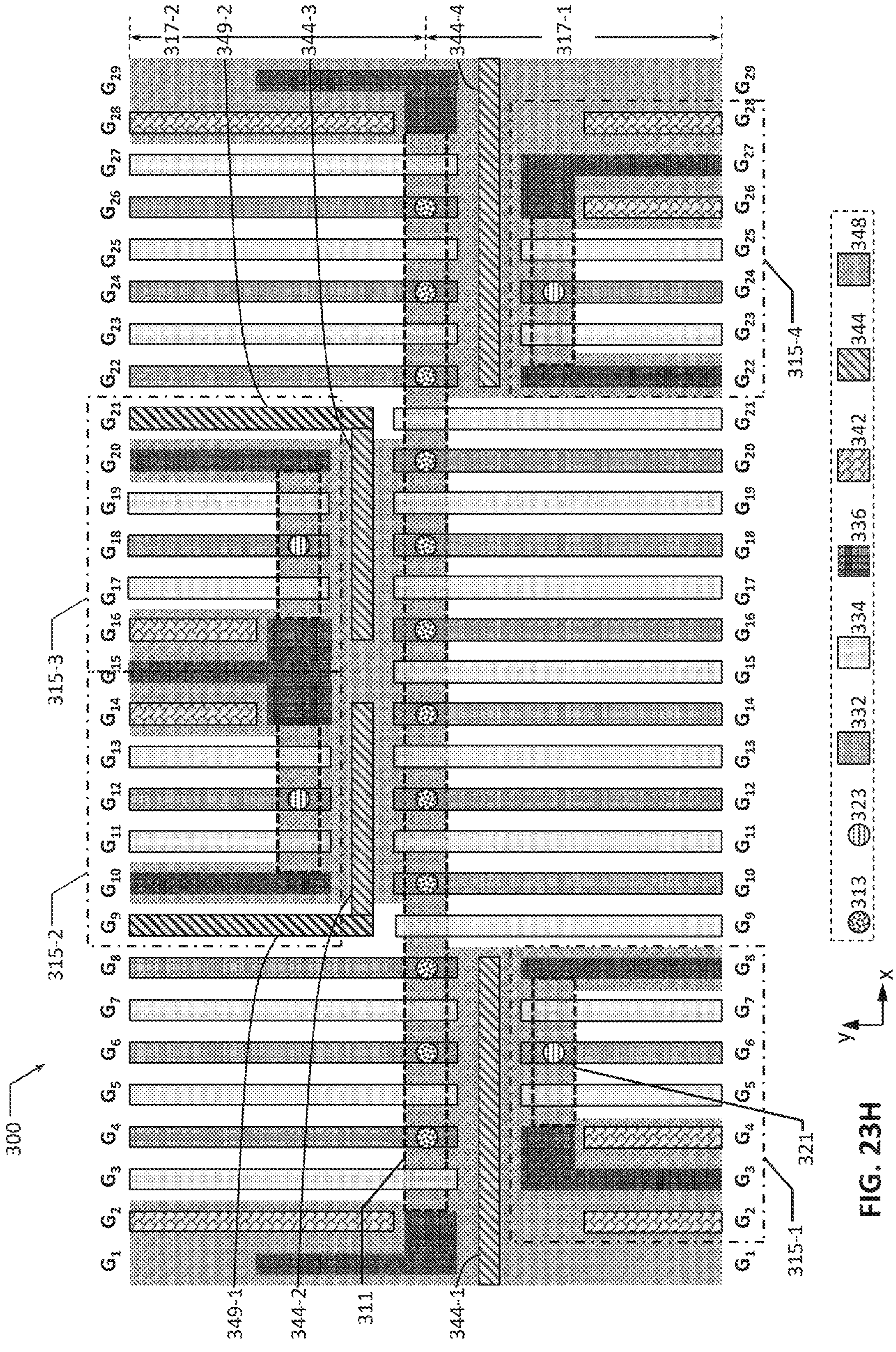
Figure 23I:
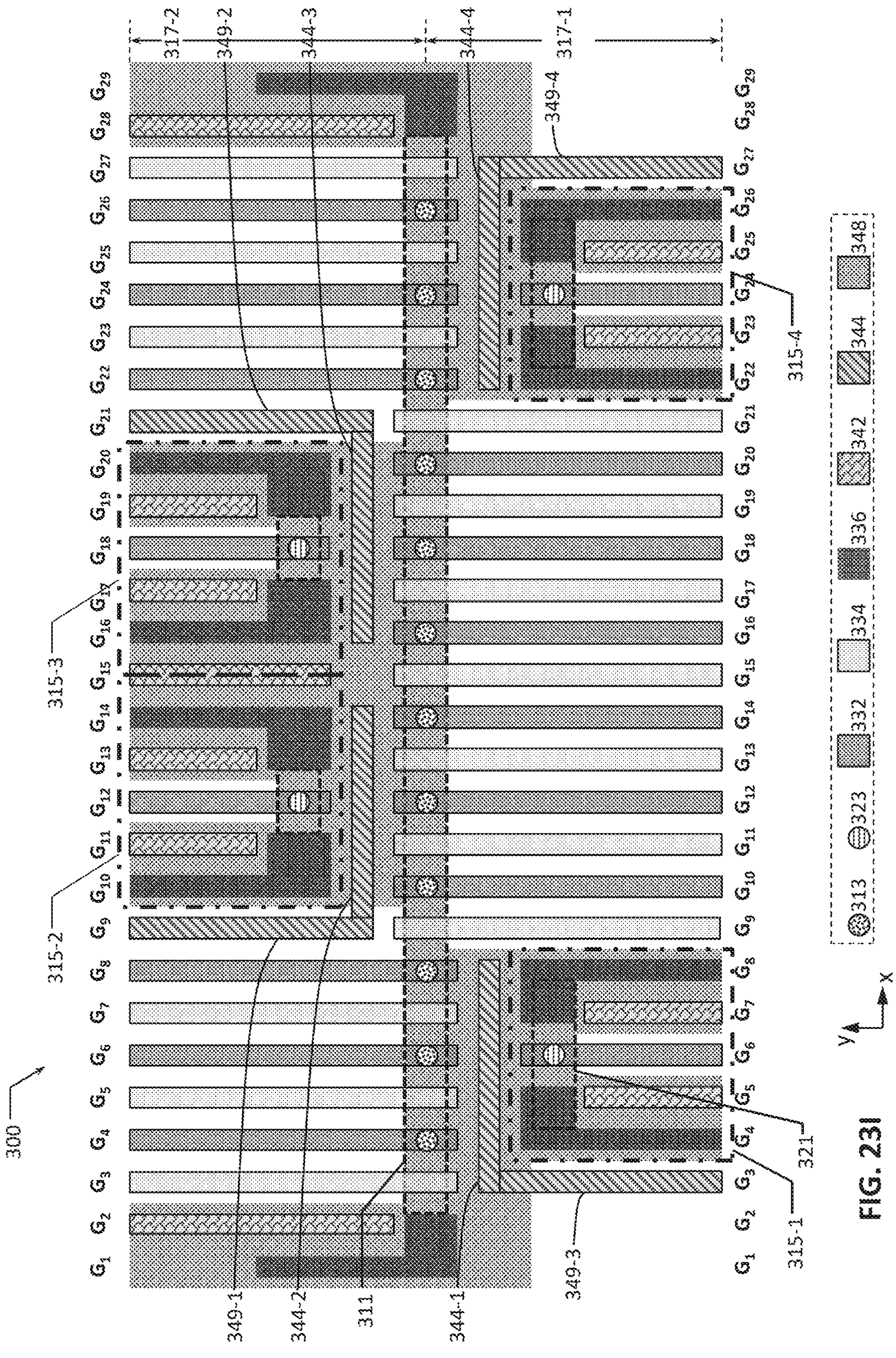
Figure 23J:
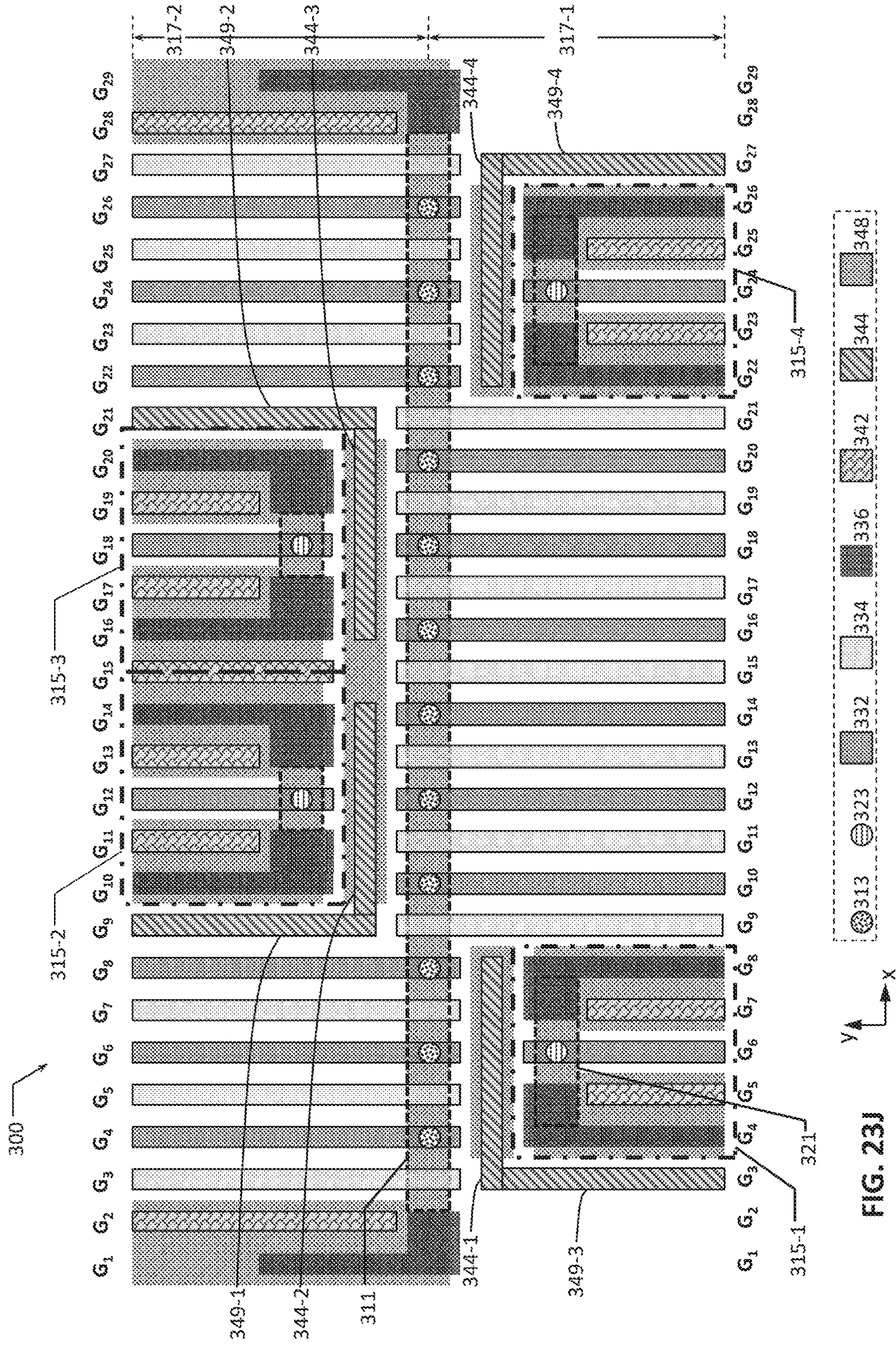

In the most general case, just having a plunger gate between each pair of adjacent read accumulation gates, without any barrier gates in the read devices 315 (e.g., as shown in FIG. 23I and FIG. 23J) over the read quantum dot formation region 321 could be sufficient for the quantum dot 323 formed under that plunger gate to sense the states of a corresponding subset of the active quantum dots 313 in a proximate portion of the row 311. Therefore, although not specifically illustrated in the present drawings, such embodiments of the quantum dot device 300 are also within the scope of the present disclosure. However, one or more barrier gates provided next to such a plunger gate could improve localization of the read quantum dots 323. Therefore, even though FIGS. 20A-20B illustrate two read barrier gates per a read plunger gate (i.e., one barrier gate on each side), further embodiments of the quantum dot device 300 may include only one of the two read barrier gates per read plunger gate.

In further embodiments, any of the embodiments of the quantum dot device 300, described above, may be combined with any embodiment of one or more central screening gates as described with reference to FIGS. 23A-23J.

FIGS. 23A-23J are top-down views of a portion of different example quantum dot devices 300 with alternating layouts and side and central screening gates, in accordance with various embodiments. The quantum dot devices 300 shown in FIGS. 23A-23J illustrate alternating layouts and side screening gates 342 as described above, using the notation and the patterns for different elements identified in the legend at the bottom of each of FIGS. 23A-23J similar to the notation and the patterns used for the previous drawings. In addition, FIGS. 23A-23J illustrate some example embodiments of how various central screening gates 344 may be implemented, as well as illustrate how different patterns 348 may be used to define locations and geometries of the trenches or fins as described herein.

FIG. 23A illustrates an embodiment of the quantum dot device 300 where a center screening gate 344 may be used between any of the read devices 315 and the corresponding proximate portions of the active row 311. For example, as shown in FIG. 23A, a center screening gate 344-1 may be implemented on the first side 317-1 of the active row 311, between the read device 315-1 and a portion of the active row 311 with the active gate lines $G_1$-$G_8$. As further shown in FIG. 23A, a center screening gate 344-2 may be implemented on the second side 317-2 of the active row 311, having a portion between the read device 315-2 and a portion of the active row 311 with the active gate lines $G_9$-$G_{15}$. Furthermore, because the read device 315-2 is adjacent to the read device 315-3 in the embodiment shown in FIG. 23A, the portion of the center screening gate 344-2 that is between the read device 315-2 and a portion of the active row 311 with the active gate lines $G_9$-$G_{15}$ may continue further to be between the read device 315-3 and a portion of the active row 311 with the active gate lines $G_{15}$-$G_{21}$ (e.g., that entire portion of the center screening gate 344-2 being substantially parallel to the active row 311). FIG. 23A further illustrates that a center screening gate 344-4 may be implemented on the first side 317-1 of the active row 311, between the read device 315-4 and a portion of the active row 311 with the active gate lines $G_{22}$-$G_{29}$. Thus, FIG. 23A illustrates three independent center screening gates 344, one for each of the read devices 315 on the first side 317-1 and one shared center screening gate 344 for two of the read devices 315 on the second side 317-2, where the center screening gates 344-1 and 344-4 flank the row 311 (i.e., provide on the side of the row 311, parallel to the row 311) on the first side 317-1, and where the shared center screening gate 344-2 flanks the row 311 on the second side 317-2 of the row 311. In various embodiments, different ones of the center screening gates 344 may be coupled to respective signal sources so that, e.g., an appropriate DC voltage, or a microwave pulse, may be applied to each of the center screening gates 344 to control the electrostatics of the array of active quantum dots 313 and/or read quantum dots 323.

FIG. 23A further illustrates that, in some embodiments, a center screening gate 344 that may extend along multiple adjacent read devices on one side 317 of the row 311 (i.e., the center screening gate 344-2 for the illustration of FIG. 23A) may also have a portion that extends between the adjacent read devices. Such a portion is illustrated as a portion 347 that is between the read accumulation gate line $G_{14}$ of the read device 315-2 and the read accumulation gate line $G_{16}$ of the read device 315-3 (e.g., the portion 347 of the center screening gate 344-2 may occupy place reserved for a gate line $G_{15}$). As shown in FIG. 23A, the portion 347 is electrically continuous with the portion of the center screening gate 344-2 that is parallel to the row 311, thus forming a single center screening gate with two different portions.

When the quantum dot device 300 is implemented with trenches as described with reference to FIGS. 1-4, there are several ways in how the center screening gate 344 may be implemented. In some embodiments, the center screening gate 344 may be implemented as a metal gate line above the level of the trenches 103, e.g., similar to the gate metal portions of the plunger and barrier gates shown in FIG. 21B. This may be advantageous in terms of easier manufacturing at the cost of less control/effect in the center screening gate 344 controlling the electrostatics of the array of active and/or read quantum dots 323. In other embodiments, the center screening gate 344 may be implemented in a trench that extends down to the quantum well stack 146 (similar to how the read accumulation gates extend to the quantum well stack 146, e.g., as is shown in FIG. 21B). Such an embodiment is shown in FIG. 23B, providing an illustration substantially the same as that of FIG. 23A, but further illustrating the pattern 348 overlapping with the center screening gates 344, meaning that the center screening gates 344 are within trenches defined by the pattern 348. Descriptions of the read accumulation gates provided in trenches defined by the pattern 348 are applicable to the center screening gate 344 provided in analogous trenches and, therefore, in the interests of brevity, are not repeated. Providing the center screening gate 344 within a trench may be advantageous in terms of improved control of the electrostatics of the array of active and/or read quantum dots 313, 323.

The embodiment shown in FIG. 23B illustrates a single continuous trench for various parts of the quantum dot device 300, the continuous trench defined by a continuous pattern 348. In further embodiments, the quantum dot device 300 with the center screening gates 344 as shown in FIG. 23B may include separate trenches, defined by islands of the pattern 348 as shown in FIG. 23C. In still further embodiments, some of the separate trenches as shown in FIG. 23C may be widened to join with some other trenches, as shown in FIG. 23D and FIG. 23E. Further variations of implementing the center screening gates 344 are possible and are within the scope of the present disclosure.

FIG. 23F illustrates an embodiment of the quantum dot device 300 with the center screening gates 344-1 and 344-4 as described above, and further illustrating that the center screening gate 344-2 of FIGS. 23A-23E may be split into individual center screening gates 344-2 and 344-3 as shown in FIG. 23F. Thus, as further shown in FIG. 23F, a portion of a center screening gate 344-2 may be implemented on the second side 317-2 of the active row 311, between the read device 315-2 and a portion of the active row 311 with the active gate lines $G_{10}$-$G_{14}$ (i.e., that portion of the center screening gate 344-2 may be substantially parallel to the active row 311); and a portion of a center screening gate 344-3, electrically isolated from the center screening gate 344-2, may be implemented on the second side 317-2 of the active row 311, between the read device 315-3 and a portion of the active row 311 with the active gate lines $G_{16}$-$G_{20}$ (i.e., that portion of the center screening gate 344-3 may be substantially parallel to the active row 311). Thus, FIG. 23F illustrates four independent center screening gates 344, one for each of the read devices 315, where the center screening gates 344-1 and 344-4 flank the row 311 on the first side 317-1, and where the center screening gates 344-2 and 344-3 flank the row 311 on the second side 317-2 of the row 311. Having more center screening gates 344 that may be independently controlled (i.e., that may be coupled to their respective signal sources), e.g., compared to the embodiment shown in FIG. 23A where only three center screening gates 344 were implemented for four read devices 315, allows finer control of the electrostatics of the array of active quantum dots 313 and/or read quantum dots 323.

Again, in some embodiments, some of the center screening gates 344 may have portions extending substantially perpendicular to the active row 311 (similar to the portion 347 of the center screening gate 344-2 of FIG. 23A). For the embodiment shown in FIG. 23F, such portions are shown as a portion 349-1 that is a part of the center screening gate 344-2 and as a portion 349-2 that is a part of the center screening gate 344-3. In particular, as shown in FIG. 23F, the portion 349-1 is an extension of a portion of the center screening gate 344-2 between the read device 315-2 and the row 311, where the portion 349-1 may be implemented between the read accumulation gate line $G_{10}$ of the read device 315-2 and the active gate line $G_8$ (e.g., the portion 349-1 of the center screening gate 344-2 may occupy place reserved for a gate line $G_9$). On the other hand, the portion 349-2 is an extension of a portion of the center screening gate 344-3 between the read device 315-3 and the row 311, where the portion 349-2 may be implemented between the read accumulation gate line $G_{20}$ of the read device 315-3 and the active gate line $G_{22}$ (e.g., the portion 349-2 of the center screening gate 344-3 may occupy place reserved for a gate line $G_{21}$). As shown in FIG. 23F, the portion 349-1 is electrically continuous with the portion of the center screening gate 344-2 that is parallel to the row 311, thus forming a single center screening gate with two different portions. Similarly, as also shown in FIG. 23F, the portion 349-2 is electrically continuous with the portion of the center screening gate 344-3 that is parallel to the row 311, thus forming another single center screening gate with two different portions.

FIG. 23F illustrates an embodiment where the read devices 315-1 and 315-4 include side screening gate line 342 provided on the internal sides of the read accumulation gate lines of these read devices 315. In other embodiments, such side screening gate lines 342 may be provided on the external sides of the read accumulation gate lines of the read devices 315-1 and 315-4, e.g., as shown in FIG. 23G.

FIG. 23H illustrates an embodiment of the quantum dot device 300 similar to that of FIG. 23F, except that it illustrates that one of the inner side screening gates 342 of the read devices 315-1 and 315-4 may be omitted, e.g., if it is desirable to align the read quantum dots 323 of these read devices with corresponding active quantum dots 313 in the row 311.

FIG. 23I illustrates an embodiment of the quantum dot device similar to that of FIG. 23H, but further trimmed to remove the barrier gate lines from various read devices 315. For the read devices 315-2 and 315-3, the center screening gates 344-2 and 344-3 may be used to control electrostatics in the read devices 315-2 and 315-3, while for the read devices 315-1 and 315-4, the center screening gates 344-1 and 344-4 may be used to control electrostatics in the read devices 315-1 and 315-4. As shown in FIG. 23I, the center screening gate 344-1 may also have a portion that is substantially perpendicular to the row 311 (similar to the portions 349-1 and 349-2 described herein), such a portion shown as a portion 349-3 of the center screening gate 344-1, implemented as a gate line external to the read accumulation gate line $G_4$ of the read device 315-1 (e.g., the portion 349-3 of the center screening gate 344-1 may occupy place reserved for a gate line $G_3$). Similarly, the center screening gate 344-4 may have a portion 349-4 that may also be implemented as a gate line external to the read accumulation gate line $G_{26}$ of the read device 315-4 (e.g., the portion 349-4 of the screening gate 344-4 may occupy place reserved for a gate line $G_{27}$). As shown in FIG. 23I, the portion 349-3 is electrically continuous with the portion of the center screening gate 344-1 that is parallel to the row 311, thus forming a single center screening gate with two different portions. Similarly, as also shown in FIG. 23I, the portion 349-4 is electrically continuous with the portion of the center screening gate 344-4 that is parallel to the row 311, thus forming another single center screening gate with two different portions.

FIG. 23J illustrates an embodiment of the quantum dot device similar to that of FIG. 23I, but further illustrating the pattern 348 having separate trenches, similar to how it was described with reference to FIGS. 23B-23E.

Further variations of the alternating layouts and screening gates as described herein are possible. In general, any embodiments described with reference to FIGS. 20-23 may be combined with any other embodiments described herein and are within the scope of the present disclosure. The exact arrangement of alternating layouts and side and center screening gates may be selected for a particular design of a quantum dot device 300 based on considerations such as fabrication processes required to fabricate the device, the desired isolation between various gates, the desired control of the electrostatics in the device, complexity of routing signals to various gates, the desired accuracy of reading the states of different active quantum dots 313, etc.

Example Devices and Systems

Quantum dot devices with alternating layouts and screening gates as described above may be implemented using any kind of qubit devices or be included in any kind of quantum processing devices/structures. Some examples of such devices/structures are illustrated in FIGS. 24A-24B, 25, and 26.

Figures 24A, 24B:
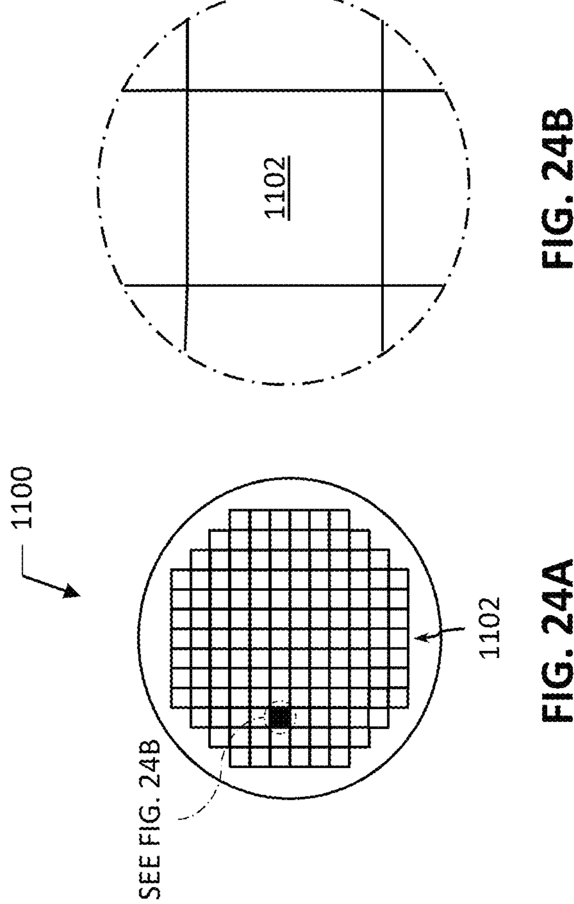
FIGS. 24A and 24B are top-down views of a wafer and dies that may include one or more of quantum dot devices disclosed herein.

FIGS. 24A-24B are top views of a wafer 1100 and dies 1102 that may be formed from the wafer 1100, according to some embodiments of the present disclosure. Dies 1102 may include any of the quantum dot devices with alternating layouts and screening gates as disclosed herein, e.g., the quantum dot devices 300 with alternating layouts and screening gates, any further embodiments of such quantum dot devices as described herein, or any combinations of such quantum dot devices. The wafer 1100 may include semiconductor material and may include one or more dies 1102 having conventional and quantum circuit device elements formed on a surface of the wafer 1100. Each of the dies 1102 may be a repeating unit of a semiconductor product that includes any suitable conventional and/or quantum circuit qubit device. After the fabrication of the semiconductor product is complete, the wafer 1100 may undergo a singulation process in which each of the dies 1102 is separated from one another to provide discrete "chips" of the semiconductor product. A die 1102 may include, or be included in, a quantum circuit component. In some embodiments, the wafer 1100 or the die 1102 may include a memory device (e.g., a static random-access memory (SRAM) device), a logic device (e.g., AND, OR, NAND, or NOR gate), or any other suitable circuit element. Multiple ones of these devices may be combined on a single die 1102. For example, a memory array formed by multiple memory devices may be formed on a same die 1102 as a processing device (e.g., the processing device 2002 of FIG. 26) or other logic that is configured to store information in the memory devices or execute instructions stored in the memory array.

Figure 25:
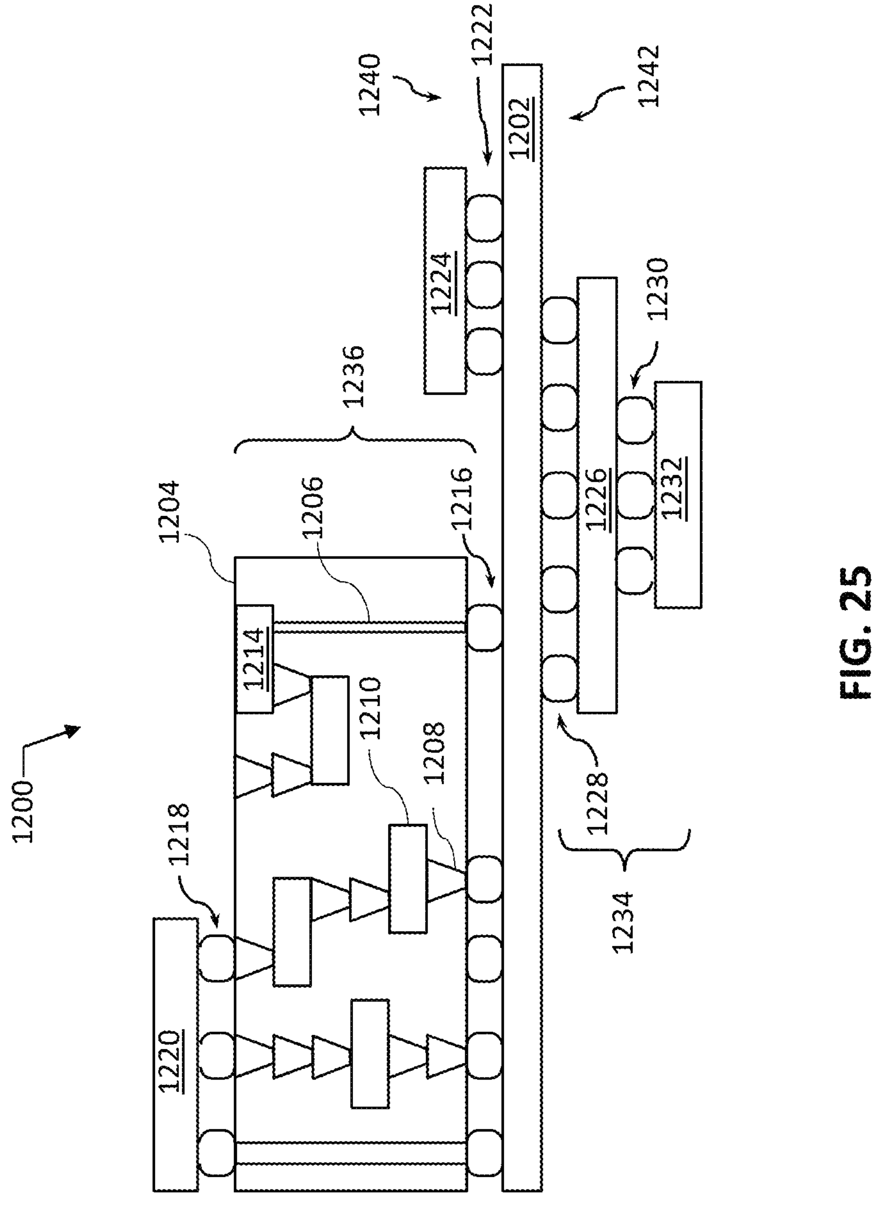
FIG. 25 is a cross-sectional side view of a device assembly that may include one or more of quantum dot devices disclosed herein.

FIG. 25 is a cross-sectional side view of a device assembly 1200 that may include any of the embodiments of the quantum dot devices with side and center screening gates as disclosed herein. The device assembly 1200 includes a number of components disposed on a circuit board 1202. The device assembly 1200 may include components disposed on a first face 1240 of the circuit board 1202 and an opposing second face 1242 of the circuit board 1202; generally, components may be disposed on one or both faces 1240 and 1242.

In some embodiments, the circuit board 1202 may be a printed circuit board (PCB) including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 1202. In other embodiments, the circuit board 1202 may be a package substrate or flexible board.

The IC device assembly 1200 illustrated in FIG. 25 may include a package-on-interposer structure 1236 coupled to the first face 1240 of the circuit board 1202 by coupling components 1216. The coupling components 1216 may electrically and mechanically couple the package-on-interposer structure 1236 to the circuit board 1202, and may include solder balls (as shown in FIG. 25), male and female portions of a socket, an adhesive, an underfill material, and/or any other suitable electrical and/or mechanical coupling structure.

The package-on-interposer structure 1236 may include a package 1220 coupled to an interposer 1204 by coupling components 1218. The coupling components 1218 may take any suitable form for the application, such as the forms discussed above with reference to the coupling components 1216. Although a single package 1220 is shown in FIG. 25, multiple packages may be coupled to the interposer 1204; indeed, additional interposers may be coupled to the interposer 1204. The interposer 1204 may provide an intervening substrate used to bridge the circuit board 1202 and the package 1220. The package 1220 may be a quantum circuit device package as described herein, e.g., a package including any of the quantum dot devices with alternating layouts and screening gates as described herein; or may be a conventional IC package, for example. Generally, the interposer 1204 may spread a connection to a wider pitch or reroute a connection to a different connection. For example, the interposer 1204 may couple the package 1220 (e.g., a die) to a ball grid array (BGA) of the coupling components 1216 for coupling to the circuit board 1202. In the embodiment illustrated in FIG. 25, the package 1220 and the circuit board 1202 are attached to opposing sides of the interposer 1204; in other embodiments, the package 1220 and the circuit board 1202 may be attached to a same side of the interposer 1204. In some embodiments, three or more components may be interconnected by way of the interposer 1204.

The interposer 1204 may be formed of an epoxy resin, a fiberglass-reinforced epoxy resin, a ceramic material, or a polymer material such as polyimide. In some embodiments, the interposer 1204 may be formed of alternate rigid or flexible materials that may include the same materials described above for use in a semiconductor substrate, such as silicon, germanium, and other group III-V and group IV materials. The interposer 1204 may include metal interconnects 1208 and vias 1210, including but not limited to through-silicon vias (TSVs) 1206. The interposer 1204 may further include embedded devices 1214, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency (RF) devices, power amplifiers, power management devices, antennas, arrays, sensors, and microelectromechanical systems (MEMS) devices may also be formed on the interposer 1204. The package-on-interposer structure 1236 may take the form of any of the package-on-interposer structures known in the art.

The device assembly 1200 may include a package 1224 coupled to the first face 1240 of the circuit board 1202 by coupling components 1222. The coupling components 1222 may take the form of any of the embodiments discussed above with reference to the coupling components 1216, and the package 1224 may take the form of any of the embodiments discussed above with reference to the package 1220. The package 1224 may be a package including any quantum dot devices with alternating layouts and screening gates as disclosed herein; or may be a conventional IC package, for example.

The device assembly 1200 illustrated in FIG. 25 includes a package-on-package structure 1234 coupled to the second face 1242 of the circuit board 1202 by coupling components 1228. The package-on-package structure 1234 may include a package 1226 and a package 1232 coupled together by coupling components 1230 such that the package 1226 is disposed between the circuit board 1202 and the package 1232. The coupling components 1228 and 1230 may take the form of any of the embodiments of the coupling components 1216 discussed above, and the packages 1226 and 1232 may take the form of any of the embodiments of the package 1220 discussed above. Each of the packages 1226 and 1232 may be a qubit device package as described herein or may be a conventional IC package, for example.

Figure 26:
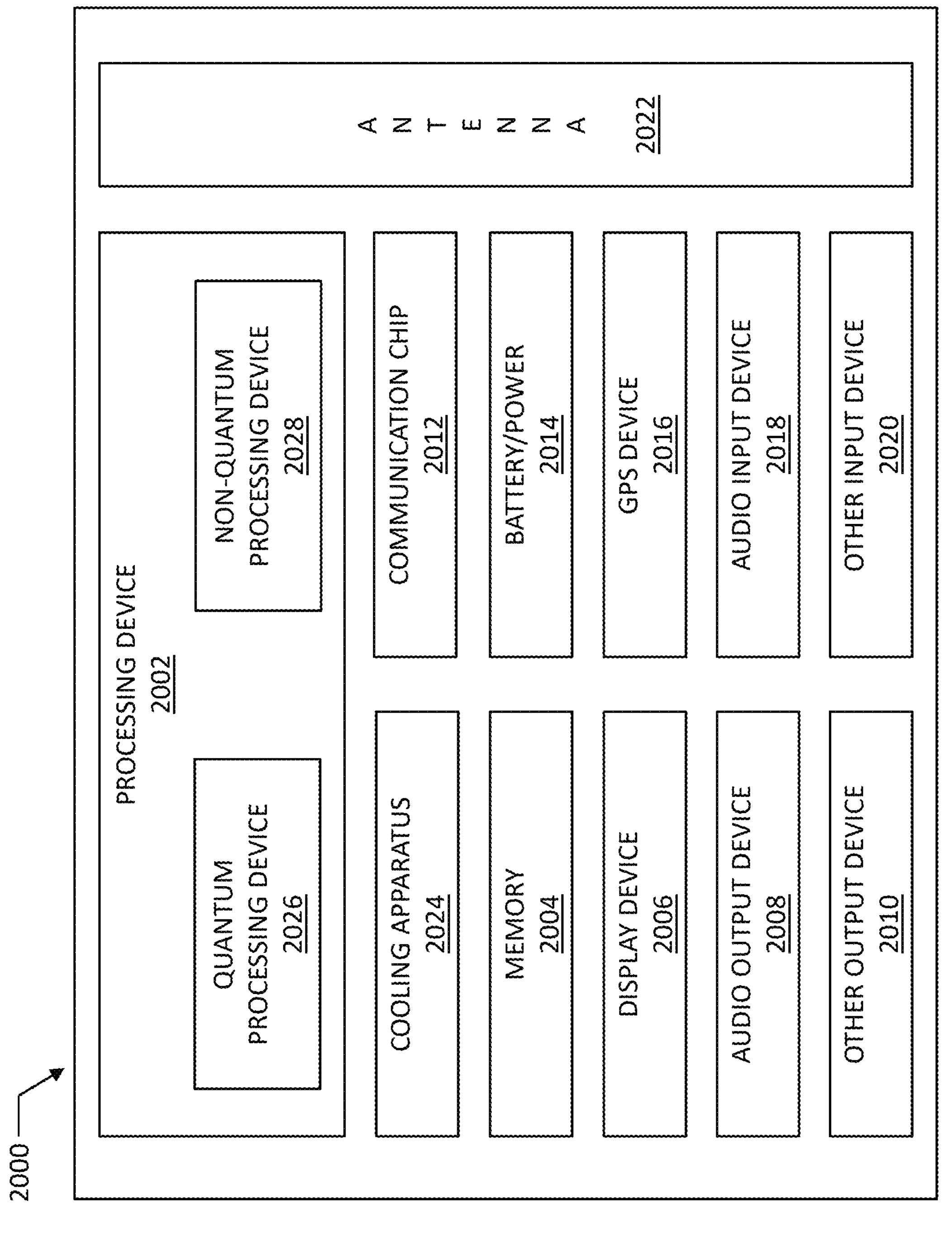
FIG. 26 is a block diagram of an example quantum computing device that may include one or more of quantum dot devices disclosed herein, in accordance with various embodiments.

FIG. 26 is a block diagram of an example quantum computing device 2000 that may include any of the quantum dot devices with alternating layouts and screening gates as disclosed herein, or any combinations of such quantum dot devices. Several components are illustrated in FIG. 26 as included in the quantum computing device 2000, but any one or more of these components may be omitted or duplicated, as suitable for the application. In some embodiments, some or all of the components included in the quantum computing device 2000 may be attached to one or more PCBs (e.g., a motherboard), and may be included in, or include, any of the quantum circuits with any of the quantum dot devices with alternating layouts and screening gates as described herein. In some embodiments, various ones of these components may be fabricated onto a single system-on-a-chip (SoC) die. Additionally, in various embodiments, the quantum computing device 2000 may not include one or more of the components illustrated in FIG. 26, but the quantum computing device 2000 may include interface circuitry for coupling to the one or more components. For example, the quantum computing device 2000 may not include a display device 2006, but may include display device interface circuitry (e.g., a connector and driver circuitry) to which a display device 2006 may be coupled. In another set of examples, the quantum computing device 2000 may not include an audio input device 2018 or an audio output device 2008, but may include audio input or output device interface circuitry (e.g., connectors and supporting circuitry) to which an audio input device 2018 or audio output device 2008 may be coupled.

The quantum computing device 2000 may include a cooling apparatus 2024. The cooling apparatus 2024 may maintain a quantum processing device 2026 of the quantum computing device 2000, in particular the qubit devices as described herein, at a predetermined low temperature during operation to avoid qubit decoherence and to reduce the effects of scattering in the quantum processing device 2026. In some embodiments, a non-quantum processing device 2028 of the quantum computing device 2000 (and various other components of the quantum computing device 2000) may not be cooled by the cooling apparatus 2030 and may instead operate at room temperature.

The quantum computing device 2000 may include a processing device 2002 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 2002 may include a quantum processing device 2026 (e.g., one or more quantum processing devices), and a non-quantum processing device 2028 (e.g., one or more non-quantum processing devices). The quantum processing device 2026 may include any of the quantum dot devices with alternating layouts and screening gates as disclosed herein, and may perform data processing by performing operations on the qubits that may be generated in the quantum dot devices 300, and monitoring the result of those operations. For example, as discussed above, different qubits may be allowed to interact, the quantum states of different qubits may be set or transformed, and the quantum states of different qubits may be read. The quantum processing device 2026 may be a universal quantum processor, or specialized quantum processor configured to run one or more quantum algorithms. In some embodiments, the quantum processing device 2026 may execute algorithms that are particularly suitable for quantum computers, such as cryptographic algorithms that utilize prime factorization, encryption/decryption, algorithms to optimize chemical reactions, algorithms to model protein folding, etc. The quantum processing device 2026 may also include support circuitry to support the processing capability of the quantum processing device 2026, such as input/output channels, multiplexers, signal mixers, quantum amplifiers, and analog-to-digital converters.

As noted above, the processing device 2002 may include a non-quantum processing device 2028. In some embodiments, the non-quantum processing device 2028 may provide peripheral logic to support the operation of the quantum processing device 2026. For example, the non-quantum processing device 2028 may control the performance of a read operation, control the performance of a write operation, control the clearing of quantum bits, etc. The non-quantum processing device 2028 may also perform conventional computing functions to supplement the computing functions provided by the quantum processing device 2026. For example, the non-quantum processing device 2028 may interface with one or more of the other components of the quantum computing device 2000 (e.g., the communication chip 2012 discussed below, the display device 2006 discussed below, etc.) in a conventional manner, and may serve as an interface between the quantum processing device 2026 and conventional components. The non-quantum processing device 2028 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices.

The quantum computing device 2000 may include a memory 2004, which may itself include one or more memory devices such as volatile memory (e.g., dynamic random-access memory (DRAM)), nonvolatile memory (e.g., read-only memory (ROM)), flash memory, solid-state memory, and/or a hard drive. In some embodiments, the states of qubits in the quantum processing device 2026 may be read and stored in the memory 2004. In some embodiments, the memory 2004 may include memory that shares a die with the non-quantum processing device 2028. This memory may be used as cache memory and may include embedded dynamic random-access memory (eDRAM) or spin transfer torque magnetic random-access memory (STT-MRAM).

In some embodiments, the quantum computing device 2000 may include a communication chip 2012 (e.g., one or more communication chips). For example, the communication chip 2012 may be configured for managing wireless communications for the transfer of data to and from the quantum computing device 2000. The term "wireless" and its derivatives may be used to describe circuits, devices, systems, methods, techniques, communications channels, etc., that may communicate data using modulated electromagnetic radiation through a nonsolid medium. The term does not imply that the associated devices do not contain any wires, although in some embodiments they might not.

The communication chip 2012 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 2012 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 2012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 2012 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 2012 may operate in accordance with other wireless protocols in other embodiments. The quantum computing device 2000 may include an antenna 2022 to facilitate wireless communications and/or to receive other wireless communications (such as AM or FM radio transmissions).

In some embodiments, the communication chip 2012 may manage wired communications, such as electrical, optical, or any other suitable communication protocols (e.g., the Ethernet). As noted above, the communication chip 2012 may include multiple communication chips. For instance, a first communication chip 2012 may be dedicated to shorter-range wireless communications such as Wi-Fi or Bluetooth, and a second communication chip 2012 may be dedicated to longer-range wireless communications such as global positioning system (GPS), EDGE, GPRS, CDMA, WiMAX, LTE, EV-DO, or others. In some embodiments, a first communication chip 2012 may be dedicated to wireless communications, and a second communication chip 2012 may be dedicated to wired communications.

The quantum computing device 2000 may include battery/power circuitry 2014. The battery/power circuitry 2014 may include one or more energy storage devices (e.g., batteries or capacitors) and/or circuitry for coupling components of the quantum computing device 2000 to an energy source separate from the quantum computing device 2000 (e.g., AC line power).

The quantum computing device 2000 may include a display device 2006 (or corresponding interface circuitry, as discussed above). The display device 2006 may include any visual indicators, such as a heads-up display, a computer monitor, a projector, a touchscreen display, a liquid crystal display (LCD), a light-emitting diode display, or a flat panel display, for example.

The quantum computing device 2000 may include an audio output device 2008 (or corresponding interface circuitry, as discussed above). The audio output device 2008 may include any device that generates an audible indicator, such as speakers, headsets, or earbuds, for example.

The quantum computing device 2000 may include an audio input device 2018 (or corresponding interface circuitry, as discussed above). The audio input device 2018 may include any device that generates a signal representative of a sound, such as microphones, microphone arrays, or digital instruments (e.g., instruments having a musical instrument digital interface (MIDI) output).

The quantum computing device 2000 may include a GPS device 2016 (or corresponding interface circuitry, as discussed above). The GPS device 2016 may be in communication with a satellite-based system and may receive a location of the quantum computing device 2000, as known in the art.

The quantum computing device 2000 may include an other output device 2010 (or corresponding interface circuitry, as discussed above). Examples of the other output device 2010 may include an audio codec, a video codec, a printer, a wired or wireless transmitter for providing information to other devices, or an additional storage device.

The quantum computing device 2000 may include an other input device 2020 (or corresponding interface circuitry, as discussed above). Examples of the other input device 2020 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The quantum computing device 2000, or a subset of its components, may have any appropriate form factor, such as a hand-held or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device.

Select Examples

The following paragraphs provide examples of various ones of the embodiments disclosed herein.

Example 1 provides a quantum dot device that includes a quantum well stack with a row of a quantum dot formation region where a plurality of quantum dots are to form during operation of the quantum dot device; a first read device on a first side of the row; and a second read device on a second side of the row, where the first read device is to detect quantum states of one or more of first quantum dots of the plurality of quantum dots, and the second read device is to detect quantum states of one or more of second quantum dots of the plurality of quantum dots.

Example 2 provides the quantum dot device according to example 1, where each of the first read device and the second read device is a read SET device.

Example 3 provides the quantum dot device according to examples 1 or 2, where the row has a first portion and a second portion (different from the first portion), the first read device is proximate the first portion, and the second read device is proximate the second portion.

Example 4 provides the quantum dot device according to example 3, further including a first screening gate between the first portion of the row and the first read device.

Example 5 provides the quantum dot device according to any one of examples 3-4, further including a second screening gate between the second portion of the row and the second read device.

Example 6 provides the quantum dot device according to any one of examples 3-5, further including a plurality of first gate lines coupled to a quantum dot formation region of the first read device, a plurality of second gate lines coupled to a quantum dot formation region of the second read device, and a plurality of third gate lines coupled to the row.

Example 7 provides the quantum dot device according to example 6, further including a support structure (e.g., a substrate, a die, a wafer, or a chip), where the quantum well stack is provided over the support structure, and where, in a projection onto a plane parallel to the support structure, the first gate lines start at the first read device and extend substantially perpendicular to the row, in a direction away from the row, on the first side of the row, and the second gate lines start at the second read device and extend substantially perpendicular to the row, in a direction away from the row, on the second side of the row.

Example 8 provides the quantum dot device according to example 7, where, in the projection onto the plane parallel to the support structure, a first subset of the third gate lines starts at the first portion of the row and extends substantially perpendicular to the row, in a direction away from the row, on the second side of the row, and a second subset of the third gate lines starts at the second portion of the row and extends substantially perpendicular to the row, in a direction away from the row, on the first side of the row.

Example 9 provides the quantum dot device according to any one of examples 6-8, where the first gate lines are on the first side of the row, and the second gate lines are on the second side of the row.

Example 10 provides the quantum dot device according to any one of examples 6-9, where a first subset of the third gate lines is on the second side of the row, and a second subset of the third gate lines is on the first side of the row.

Example 11 provides the quantum dot device according to any one of examples 6-10, where the row has a first end and a second end, one of the third gate lines is coupled to the first end of the row and also coupled to a first doped region, another one of the third gate lines is coupled to the second end of the row and also coupled to a second doped region, and a dopant concentration in the row is smaller than a dopant concentration in the first doped region and smaller than a dopant concentration in the second doped region.

Example 12 provides the quantum dot device according to any one of examples 6-11, further including an insulating material over the quantum well stack, where the insulating material includes a trench through the insulating material, extending down to the quantum well stack, the trench is between a first portion of the insulating material and a second portion of the insulating material, and a gate metal of at least one of the third gate lines (i.e., one of the active plunger or barrier gate lines) is partially above the first portion of the insulating material and partially extends into the trench.

Example 13 provides the quantum dot device according to example 12, further including a gate dielectric at a bottom of the trench, between the quantum well stack and the gate metal of the at least one of the third gate lines.

Example 14 provides the quantum dot device according to examples 12 or 13, where a gate metal of at least one of the first gate lines is partially above the second portion of the insulating material and partially extends into the trench.

Example 15 provides the quantum dot device according to any one of examples 12-14, where a gate metal of at least another one of the third gate lines (i.e., one of the accumulation gate lines) extends along a bottom of the trench.

Example 16 provides the quantum dot device according to any one of the preceding examples, further including a third read device on the first side of the row, where the third read device is to detect quantum states of one or more of third quantum dots of the plurality of quantum dots.

Example 17 provides a quantum dot device that includes a support structure (e.g., a substrate, a die, a wafer, or a chip); a quantum well stack provided over the support structure, the quantum well stack including first, second, and third rows of quantum dot formation regions, where the third row has a first portion and a second portion (the second portion different from the first portion), the first row flanks the first portion of the third row at a first side of the third row (i.e., the first row is situated at the first side of the third row, proximate to the first portion of the third row), and the second row flanks the second portion of the third row at a second side of the third row (i.e., the second row is situated at the second side of the third row, proximate to the second portion of the third row; the second side of the third row is opposite the first side of the third row); a plurality of first gate lines coupled to the first row; a plurality of second gate lines coupled to the second row; and a plurality of third gate lines coupled to the third row. In such a device, in a projection onto a plane parallel to the support structure, the first gate lines start at the first row and extend substantially perpendicular to the first row in a direction away from the third row, the second gate lines start at the second row and extend substantially perpendicular to the second row in a direction away from the third row, a first subset of the third gate lines starts at the first portion of the third row and extends substantially perpendicular to the third row in a direction away from the first row, and a second subset of the third gate lines starts at the second portion of the third row and extends substantially perpendicular to the third row in a direction away from the second row.

Example 18 provides the quantum dot device according to example 17, further including an insulating material, where the quantum well stack is between the support structure and the insulating material, one or more trenches extend through the insulating material, at least one of the first gate lines is coupled to the first row by having a first gate metal being partially above the insulating material and partially extending into one of the one or more trenches; at least one of the second gate lines is coupled to the second row by having a second gate metal being partially above the insulating material and partially extending into one of the one or more trenches (in some embodiments, this trench may be the same trench where the first gate metal of some of the first gate lines is, or it may be a different trench); and at least one of the third gate lines is coupled to the third row by having a third gate metal being partially above the insulating material and partially extending into one of the one or more trenches (in some embodiments, this trench may be the same trench where the first gate metal of some of the first gate lines is, where the second gate metal of some of the second gate lines is, or it may be a different trench).

Example 19 provides a quantum computing device that includes a quantum processing device, where the quantum processing device includes a quantum dot device according to any one of the preceding examples; a non-quantum processing device, coupled to the quantum processing device, to control voltages applied to a plurality of gates of the quantum processing device; and a memory device to store data generated during operation of the quantum processing device.

Example 20 provides the quantum computing device according to example 19, where the memory device is configured to store instructions for a quantum computing algorithm to be executed by the quantum processing device.

Example 21 provides the quantum computing device according to examples 19 or 20, further including a cooling apparatus configured to maintain the temperature of the quantum processing device below 5 degrees Kelvin.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A quantum dot device, comprising:
- a substrate;
- a quantum well stack over or at least partially in the substrate, wherein the quantum well stack includes a row of a quantum dot formation region for a plurality of quantum dots;
- a first read device on a first side of the row;
- a second read device on a second side of the row;
- a plurality of conductive lines coupled to the row; and
- an insulating material over the quantum well stack, wherein the insulating material includes a trench between a first portion of the insulating material and a second portion of the insulating material, and a metal of at least one of the conductive lines is partially above the first portion of the insulating material and partially extends into the trench,
- wherein, in a projection onto a plane parallel to the substrate:
  - conductive lines of a first subset of the conductive lines start at the row and extend in a direction away from the row on the second side of the row, and
  - conductive lines of a second subset of the conductive lines start at the row and extend in a direction away from the row on the first side of the row.

2. The quantum dot device according to claim 1, wherein the first read device is a first single electron transistor device, and the second read device is a second single electron transistor device.

3. The quantum dot device according to claim 1, wherein:
- the row has a first portion and a second portion,
- the first read device is proximate the first portion, and
- the second read device is proximate the second portion.

4. The quantum dot device according to claim 3, further comprising a first screening gate between the first portion of the row and the first read device.

5. The quantum dot device according to claim 1, further comprising:
- a plurality of first conductive lines coupled to a quantum dot formation region of the first read device; and
- a plurality of second conductive lines coupled to a quantum dot formation region of the second read device, wherein the conductive lines are third conductive lines,
- wherein, in the projection onto the plane parallel to the substrate:
  - the first conductive lines start at the first read device and extend substantially perpendicular to the row in the direction away from the row on the first side of the row, and
  - the second conductive lines start at the second read device and extend substantially perpendicular to the row in the direction away from the row on the second side of the row.

6. The quantum dot device according to claim 5, wherein the row has a first portion and a second portion, the first read device is proximate the first portion, and the second read device is proximate the second portion, and wherein, in the projection onto the plane parallel to the substrate:
- a first subset of the third conductive lines starts at the first portion of the row and extends substantially perpendicular to the row in the direction away from the row on the second side of the row, and a second subset of the third conductive lines starts at the second portion of the row and extends substantially perpendicular to the row in the direction away from the row on the first side of the row.

7. The quantum dot device according to claim 1, wherein:

the row has a first end and a second end, one of the conductive lines is coupled to the first end of the row and also coupled to a first doped region, another one of the conductive lines is coupled to the second end of the row and also coupled to a second doped region, and a dopant concentration in the row is smaller than a dopant concentration in the first doped region and smaller than a dopant concentration in the second doped region.

8. The quantum dot device according to claim 1, further comprising a gate dielectric at a bottom of the trench, between the quantum well stack and the metal of the at least one of the conductive lines.

9. The quantum dot device according to claim 1, wherein:

a metal of at least one of the first conductive lines is partially above the second portion of the insulating material and partially extends into the trench.

10. The quantum dot device according to claim 1, wherein a metal of at least another one of the conductive lines extends along a bottom of the trench.

11. The quantum dot device according to claim 1, wherein:

the first read device is to detect quantum states of one or more of first quantum dots of the plurality of quantum dots, and the second read device is to detect quantum states of one or more of second quantum dots of the plurality of quantum dots.

12. The quantum dot device according to claim 1, wherein, in the projection onto the plane parallel to the substrate:

the first subset of the conductive lines is opposite, with respect to the row, to the first read device, and the second subset of the conductive lines is opposite, with respect to the row, to the second read device.

13. The quantum dot device according to claim 12, further comprising:

a plurality of first conductive lines coupled to a quantum dot formation region of the first read device; and a plurality of second conductive lines coupled to a quantum dot formation region of the second read device, wherein the conductive lines are third conductive lines.

14. The quantum dot device according to claim 13, wherein:

the first conductive lines are on the first side of the row, and the second conductive lines are on the second side of the row.

15. The quantum dot device according to claim 1, wherein:

the quantum dot device is a quantum computing device comprising a quantum processing device and a non-quantum processing device coupled to the quantum processing device, and the quantum processing device includes the substrate, the quantum well stack, the first read device, the second read device, and the plurality of conductive lines.

16. The quantum dot device according to claim 15, wherein:

the quantum computing device further includes a memory device to store data generated by the first read device and the second read device during operation of the quantum processing device.

17. The quantum dot device according to claim 16, wherein:

the memory device is to further store instructions for a quantum computing algorithm to be executed by the quantum processing device.

18. A quantum dot device, comprising:

a quantum well stack including a row of a quantum dot formation region for a plurality of quantum dots;

a first read device on a first side of the row;

a second read device on a second side of the row; and a plurality of conductive lines coupled to the row, wherein:

the row has a first end and a second end, one of the conductive lines is coupled to the first end of the row and also coupled to a first doped region, another one of the conductive lines is coupled to the second end of the row and also coupled to a second doped region, and a dopant concentration in the row is smaller than a dopant concentration in the first doped region and smaller than a dopant concentration in the second doped region.

19. The quantum dot device according to claim 18, further comprising an insulator material over the quantum well stack, wherein:

the insulating material includes a trench between a first portion of the insulating material and a second portion of the insulating material, and a gate metal of at least one of the conductive lines is partially above the first portion of the insulating material and partially extends into the trench.

20. The quantum dot device according to claim 18, wherein the first read device is a first single electron transistor device, and the second read device is a second single electron transistor device.

21. The quantum dot device according to claim 18, further comprising:

a plurality of first conductive lines coupled to a quantum dot formation region of the first read device; and a plurality of second conductive lines coupled to a quantum dot formation region of the second read device, wherein the conductive lines are third conductive lines, wherein, in a projection onto a plane parallel to the quantum well stack:

the first conductive lines start at the first read device and extend substantially perpendicular to the row in a direction away from the row on the first side of the row, and the second conductive lines start at the second read device and extend substantially perpendicular to the row in a direction away from the row on the second side of the row.

22. A quantum dot device, comprising:

a substrate;

a quantum well stack over or at least partially in the substrate;

gates arranged along a line above the quantum well stack, wherein the line is substantially straight and has a first end and a second end;

a first read device;

a second read device; and conductive lines coupled to the gates in a one-to-one correspondence, the conductive lines including first conductive lines and second conductive lines, wherein one of the conductive lines is coupled to the first end of the line and also coupled to a first doped region, another one of the conductive lines is coupled to the second end of the line and also coupled to a second doped region, and a dopant concentration in a portion of the quantum well stack under the line is smaller than a dopant concentration in the first doped region and smaller than a dopant concentration in the second doped region, and wherein, in a projection onto a plane parallel to the substrate:

the first read device is on a first side of the line, the second read device is on a second side of the line, the first conductive lines start at the line and extend in a direction away from the line on the second side of the line, and the second conductive lines start at the line and extend in a direction away from the line on the first side of the line.

23. The quantum dot device according to claim 22, wherein, in the projection onto the plane parallel to the substrate:

the first conductive lines are opposite the first read device across the line, and the second conductive lines are opposite the second read device across the line.

24. The quantum dot device according to claim 22, wherein the first read device is a first single electron transistor device, and the second read device is a second single electron transistor device.

25. The quantum dot device according to claim 22, wherein:

the quantum dot device is a quantum computing device comprising a quantum processing device and a non-quantum processing device coupled to the quantum processing device, and the quantum processing device includes the substrate, the quantum well stack, the gates, the first read device, the second read device, and the conductive lines.

26. The quantum dot device according to claim 25, wherein:

the quantum computing device further includes a memory device to store data generated by the first read device and the second read device during operation of the quantum processing device.

* * * * *